US006955484B2

(12) United States Patent
Woodman

(10) Patent No.: US 6,955,484 B2
(45) Date of Patent: Oct. 18, 2005

(54) HARNESS SYSTEM FOR ATTACHING CAMERA TO USER

(76) Inventor: Nicholas D. Woodman, 6 Josephine St., Sausalito, CA (US) 94965

( * ) Notice: Subject to any disclaimer, the term of this patent is extended or adjusted under 35 U.S.C. 154(b) by 0 days.

(21) Appl. No.: 10/777,287

(22) Filed: Feb. 11, 2004

(65) Prior Publication Data

US 2004/0200868 A1 Oct. 14, 2004

Related U.S. Application Data

(60) Provisional application No. 60/462,548, filed on Apr. 10, 2003, provisional application No. 60/468,368, filed on May 3, 2003, and provisional application No. 60/473,367, filed on May 23, 2003.

(51) Int. Cl.[7] .......... G03B 17/02

(52) U.S. Cl. .......... 396/423; 396/424; 224/267; 224/586

(58) Field of Search .......... 224/575, 585, 224/586, 183, 267; 396/419, 420, 423, 424

(56) References Cited

U.S. PATENT DOCUMENTS

| | | | | |
|---|---|---|---|---|
| 817,207 | A | | 4/1906 | Wheeler |
| 1,318,850 | A | | 10/1919 | Yong |
| 1,407,239 | A | | 2/1922 | Weiss |
| 2,187,449 | A | | 1/1940 | French |
| 2,771,014 | A | | 11/1956 | Tolcher |
| 3,273,766 | A | | 9/1966 | Cosentino |
| 3,938,166 | A | | 2/1976 | Sloop |
| 3,966,101 | A | | 6/1976 | Taylor, III |
| 4,091,974 | A | | 5/1978 | McClintock |
| 4,320,863 | A | * | 3/1982 | Lyer et al. .......... 224/259 |
| 4,509,667 | A | | 4/1985 | Meldrum |
| 5,064,109 | A | | 11/1991 | Caster |
| 5,307,966 | A | | 5/1994 | Inaba et al. |
| 5,323,195 | A | | 6/1994 | Phillips |
| 5,644,794 | A | * | 7/1997 | Hull et al. .......... 2/102 |
| 5,828,917 | A | * | 10/1998 | Stephenson .......... 396/424 |
| 5,904,280 | A | | 5/1999 | Chan |
| 5,927,579 | A | | 7/1999 | Schwabe |
| 6,109,490 | A | | 8/2000 | Caluori |
| 6,330,961 | B1 | * | 12/2001 | Borja .......... 224/222 |
| 6,796,467 | B2 | * | 9/2004 | Caldana .......... 224/219 |
| 2003/0044180 | A1 | * | 3/2003 | Lindberg .......... 396/420 |

FOREIGN PATENT DOCUMENTS

| | | |
|---|---|---|
| JP | 10-225315 | 8/1998 |
| JP | H11-183659 | 7/1999 |

OTHER PUBLICATIONS

"Eye Link Communicators and Other Spy Gear!", Spy Gear, Spy Toys by Wild Planet [online], 1998–2004 [retrieved on Feb. 5, 2004] Retrieved from <URL:http://www.spygear-.net/spyflash.php?toyid=10020> (1 page).

"Help for your Toy", Wild Planet Toys®, Help Center [online], 1998–2004 [retrieved on Feb. 5, 2004] Retrieved from <URL:http://www.wildplanet.com/helpcenter/wp__help1up.php?toyid=10020> (2 pages).

"Wild Planet Toys Partners Exclusively with Kodak to Offer Film and Savings in New Fall Products," Wild Planet Toys®, About Wild Planet, Press and Media Information [online], 1998–2004 [retrieved on Feb. 5, 2004] Retrieved from <URL:http://www.wildplanet.com/aboutus/wp__release__single.php?prid=38 > (2 pages).

* cited by examiner

*Primary Examiner*—David M. Gray
(74) *Attorney, Agent, or Firm*—Fenwick & West LLP

(57) ABSTRACT

A configurable wrist or arm worn camera harness (1*a*) that facilitates convenient carry, access, and secure use of a camera during participation in a physical activity. Camera harness (1*a*) is comprised of an adjustable strap system for attaching harness (1*a*) to operator wrist or arm and a coupling system for attaching, one at a time, cameras of various shapes and sizes to aforementioned harness (1*a*) in a either a manner that allows camera to be moved pivotably while attached to harness (1*a*) and operator or in a manner that secures camera in a fixed, non-pivoting position. A clasping system is incorporated to harness (1*a*) to secure camera in a first secure flat carry position on operator wrist or arm. Clasping system can be released by operator to allow camera to be pivotably moved upright into a second secure position for the purpose of taking a photograph. Regardless of pivotal orientation of camera or closure state of clasping system or manner of camera attachment to user, harness (1*a*) maintains attachment of camera to operator in any event.

17 Claims, 48 Drawing Sheets

HARNESS SYSTEM FOR ATTACHING CAMERA TO USER

RELATED APPLICATIONS

The present application is related to, and claims priority to under 35 USC §119(e), U.S. patent application Ser. No. 60/462,548, entitled "Harness for Attaching Camera to User," by Nicholas D. Woodman, filed on Apr. 10, 2003, U.S. patent application Ser. No. 60/468,368, also entitled "Harness for Attaching Camera to User," by Nicholas D. Woodman, filed on May 5, 2003, and U.S. patent application Ser. No. 60/473,367 also entitled "Harness for Attaching Camera to User," by Nicholas D. Woodman, filed on May 23, 2003, which the contents of each are incorporated by reference.

BACKGROUND OF THE INVENTION

1. Field of Invention

This invention relates to mechanisms for securing devices such as a camera strap, and more specifically, to an improved harness system for attaching a device such as a camera to a human for use during periods of physical activity.

2. Description of the Related Arts

The problem of conveniently carrying, accessing, and using a camera under various operating conditions has existed since the beginning of hand-held photography. It has become even more of a problem in recent years as a growing number of photographers attempt to take action photographs while participating in fast-paced physical activities such as surfing, snorkeling, skiing, mountain biking, kayaking, rafting and so on. Activities such as these often leave a photographer without pockets, purses, or even enough time to fetch a camera from such a place if he or she hopes to get a photo of the action while it is occurring.

Even in the event that a photographer is able to quickly access a camera during such an activity, an accidental fall or change of circumstances could make it difficult for the photographer to hold on to the camera. The camera could be damaged, broken or lost altogether in the event that the photographer might quickly need both of his or her hands free to ensure his or her safety. It is possible that people would take more photographs, and even better photographs, during their favorite physical activities if there was a convenient way for them to carry, quickly access, and then securely use a camera at such a time.

Another problem with taking photographs during fast-paced physical activities is the question of what to do with the camera after a photograph has been taken. For example, a surfing photographer taking a photograph of a breaking wave might quickly need his or her hands free to push their surfboard under the wave after taking the photograph. Perhaps a rafting photographer wants to photograph the harrowing view of the rapids just before entering them, but he or she might immediately thereafter need both hands free to brace themselves or to steer the raft. In either case, the photographer may not have enough time to securely store the camera after taking a photograph.

Additionally, the photographer might just prefer to have the camera immediately out of the way so that he or she can enjoy the given activity without the hassle of stowing their camera. Whatever the circumstance, there is currently no solution that solves the problems associated with conveniently carrying, quickly accessing, securely using and then quickly stowing a camera during periods of physical activity such as surfing, snorkeling, kayaking, rafting, etc.

There have been attempts to provide a solution to these problems. For years, rubber bands and wrist or neck ropes have been included with new cameras in an effort to provide the photographer with a convenient way to carry the camera. While this may suffice for a walk in the park, surfing a wave or rafting the rapids with a camera swinging wildly from one's wrist or neck is a less than ideal or safe way to carry a camera while participating in such an activity. Either the photographer, the camera, or people nearby may be harmed by the swinging camera.

The camera could be easily lost if the photographer is unable to adequately clutch the rubber band or nylon strap draped around their wrist. And while this method of carrying a camera does provide for immediate access to the camera, it unfortunately does not allow the user to have both hands free for participating in the given activity when the camera is not needed. In this way, a simple rubber band or nylon strap solution handicaps the photographer's participation in and enjoyment of the given activity and to a certain extent sacrifices their own safety and the safety of the camera.

Hence, conventional devices or solutions fail to provide adequate means for a photographer to conveniently carry, access, securely hold and use, and then quickly stow away a camera while participating in a physical activity. Therefore, there is a need for a solution that allows for carrying a camera in a further secured position, provides quick access to for holding and using the camera while still remaining secured to the user, and then quickly stowing the camera into the aforementioned further secured position.

SUMMARY OF THE INVENTION

The present invention includes a harness for attaching a camera to a user's body, for example, an appendage (or portion thereof) such as an arm, wrist, leg, or angle, in a manner that allows for the camera to be moved pivotably into various positions for the purpose of convenient carrying and/or taking a photograph while engaged in a physical activity. Moreover, in one embodiment of the present invention, as the camera is moved in any pivoted orientation it remains coupled to the harness. Hence, the present invention beneficially allows the camera to remain secured to the appendage of the user even in the event that the user is unable to use a hand to hold the camera.

In accordance with the present invention, the camera harness allows a user to comfortably, conveniently, and securely carry a camera while participating in a physical activity in a manner which does not handicap their participation in the aforementioned activity. The camera harness also allows a user to quickly access a camera for use while participating in a physical activity.

In further embodiments of the present invention, the camera harness may be configured to allow a user to securely hold and pivot a camera into an upright position which allows them to easily and clearly look through the camera's viewfinder or see an LCD screen, while participating in a physical activity. It is noted that the camera harness allows a user to retain possession of a camera even in the event of an accident or change of events which forces the user to let go of the camera, while participating in a physical activity. Moreover, the camera harness allows a user to pivot and quickly re-secure a camera into a further secured flat carry position on his or her wrist after taking a photo. In yet another embodiment of the present invention, the camera harness is also configured to be small enough to fit in a user's clothing pocket, purse, or other enclosure when it is not being worn or attached to a camera or camera housing. Hence, the camera harness is beneficially simple to use, carry, and otherwise transport.

In yet another embodiment, the camera harness maybe configured to be adjustable so that it can be comfortably worn by people of all sizes. The camera harness may also be configured to adapt to, fit and secure a wide range of cameras that may range in shape, size, and even type. The present invention may also be configured to have at least a portion of the harness system or element thereof be incorporated into a camera body or camera housing. In yet another embodiment, the camera harness, including any portion or element of the harness system that may be incorporated into a camera body or camera housing, and may be configured to attach a camera to a user in either a fixed flat, fixed upright, or fixed partially-upright, non-pivoting position.

In another embodiment, the camera harness, including any portion or element of the harness system that may be incorporated into a camera body or camera housing, may be configured to attach a camera to a user in a manner that secures the camera in a first secured position flat to their arm or wrist, but also allows the user to stretch or pull the camera into a second secured upright position for the purpose of taking a photograph. Upon the user's release of tension on the camera, the camera returns to the first secured position flat against the arm or wrist of the user.

The present invention may be configured from a variety of materials. In one embodiment the camera harness may be configured from commercially available lightweight structural components including but not limited to, e.g., nylon, plastic, foam, polypropylene, webbing, rubber, neoprene, rubber, elastic cord, elastic fabric, single or double sided tape, laminated adhesive, and/or VELCRO®, that can be configured in a manner that limits the total number of parts needed to construct the harness, while improving reliability, durability, simplicity, and lowering the cost of manufacturing. Thus, the camera advantageously can be used in a wide range of activities and environments. Moreover, the camera harness can be beneficially produced in an economical and rapid mariner. This should allow the present invention to be appealing to all types of consumers, manufacturers and retailers involved in photography. Moreover, the present invention allows photographers to become active participants in the activities or along side the subject matter that they are photographing, rather than having to take photographs from the sidelines or from a distance.

BRIEF DESCRIPTIONS OF THE DRAWINGS

The invention has other advantages and features which will be more readily apparent from the following detailed description of the invention and the appended claims, when taken in conjunction with the accompanying drawings, in which:

FIG. ("FIG.") 1 shows a perspective view of the invention in an open and extended position.

FIG. 1*b* shows a perspective view of a first alternative embodiment of the invention.

FIG. 1*c* shows a perspective view of a second alternative embodiment of the invention with a spring loaded coupling plate.

FIG. 1*d* shows a perspective view of a third alternative embodiment of the invention with a tongue of hook material extending from the invention.

FIG. 1*e* shows a perspective view of a fourth alternative embodiment of the invention with a male clip attached to the invention.

FIG. 1*f* shows a perspective view of a fifth alternative embodiment of the invention with a spring loaded coupling plate and no catch, hook, or hook ring.

FIG. 1*g* shows a perspective view of a sixth alternative embodiment of the invention with a spring-loaded clip attached to the invention.

FIG. 1*h* shows a perspective view of a seventh alternative embodiment of the invention with a static clip attached to the invention.

FIG. 1*i* shows a perspective view of an eighth alternative embodiment of the invention with a tongue of hook material attached to the invention.

FIG. 1*j* shows a perspective view of a ninth alternative embodiment of the invention with a tongue of hook material attached to the invention.

FIG. 1*k* shows a perspective view of a tenth alternative embodiment of the invention with a viewing hole integrated into it.

FIG. 1*l* shows a perspective view of an eleventh alternative embodiment of the invention with an attachment pad fastened to it.

FIG. 1*m* shows a perspective view of a twelfth alternative embodiment of the invention.

Figure 3:
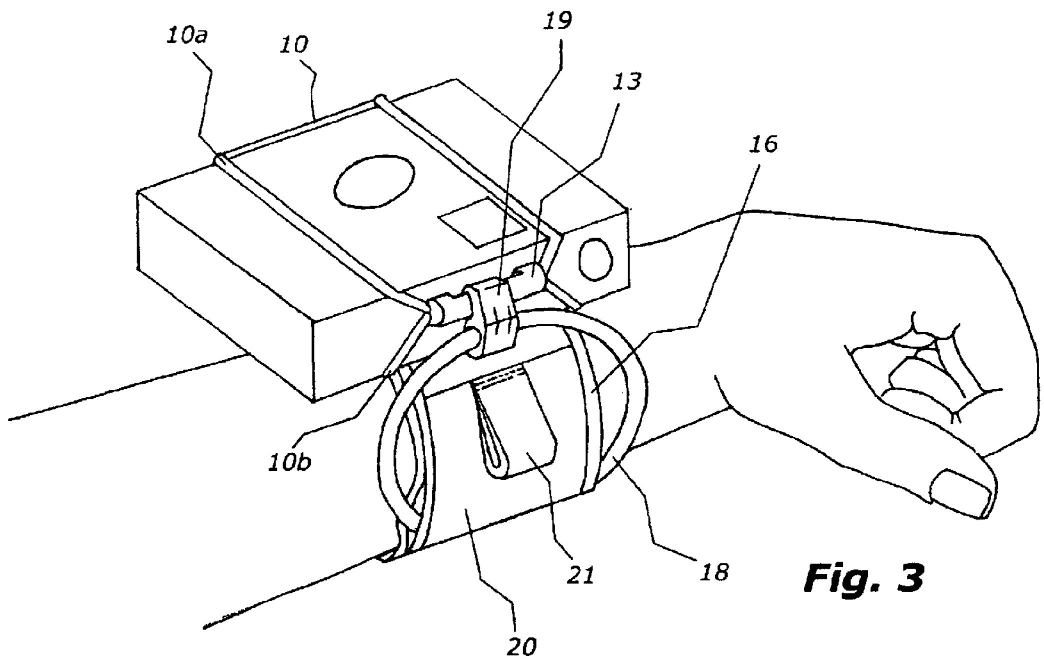
FIG. 3 shows a perspective view of the invention being worn on the left wrist of a user.
Figure 3A:
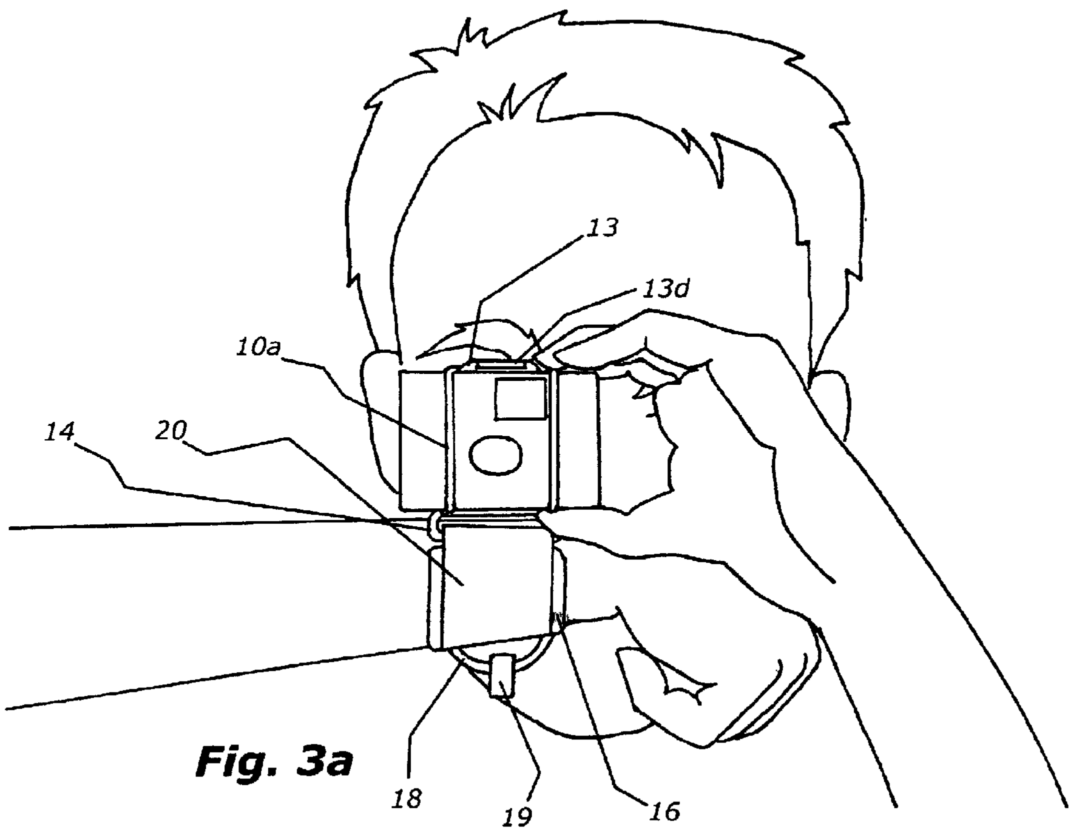

FIG. 3*a* shows a perspective view of a user taking a photo while wearing the invention.

Figure 3B:
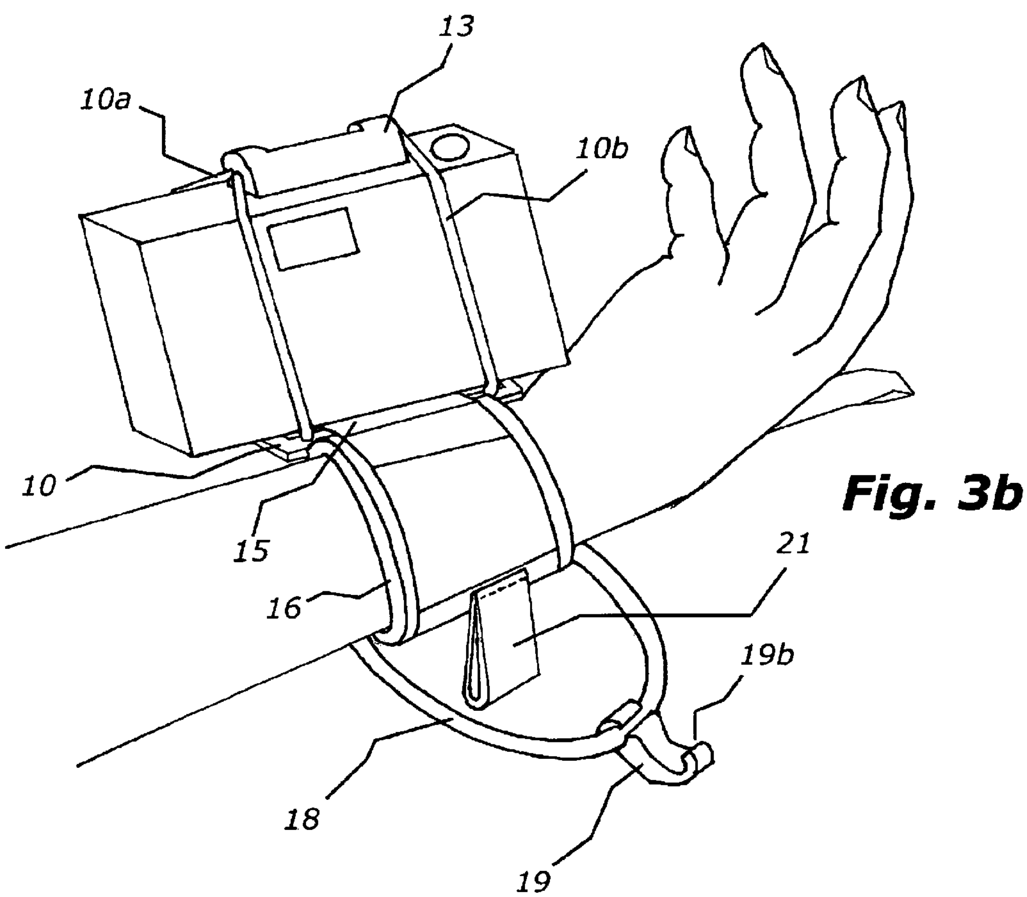

FIG. 3*b* shows a perspective view of the invention on the wrist of a user with the camera attached to the invention in an upright position and not being held by the user.

Figure 4:
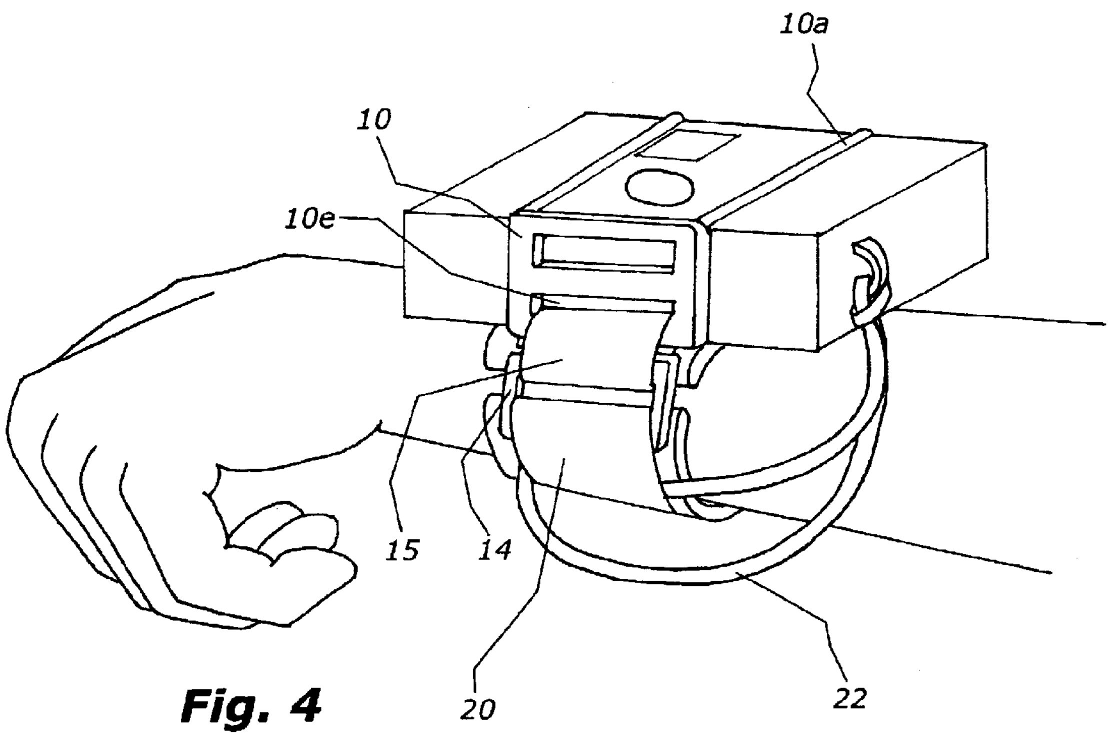

FIG. 4 shows a bottom perspective view of the harness being worn on the left wrist of a user.

Figure 5:
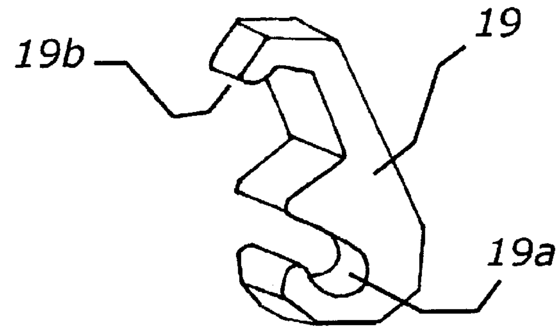

FIG. 5 shows a perspective view of the hook piece.

Figure 6:
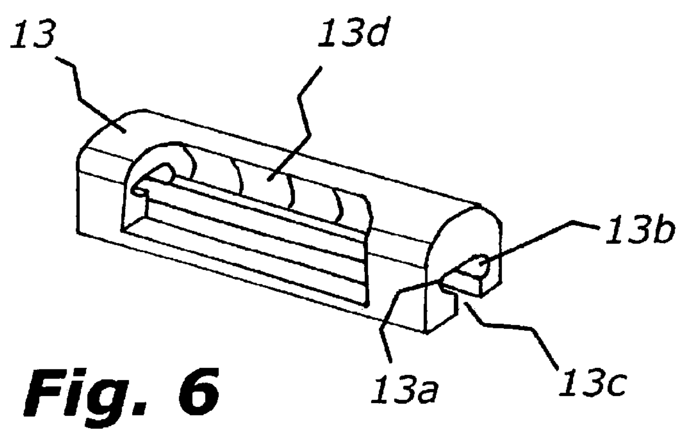

FIG. 6 shows a perspective view of the catch piece.

Figure 7:
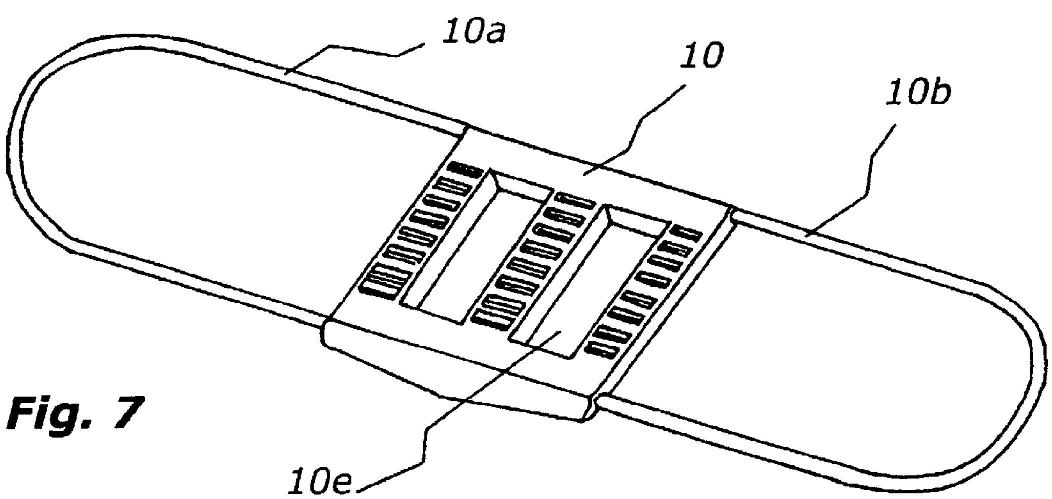

FIG. 7 shows a perspective view of the coupling plate.

Figure 8A:
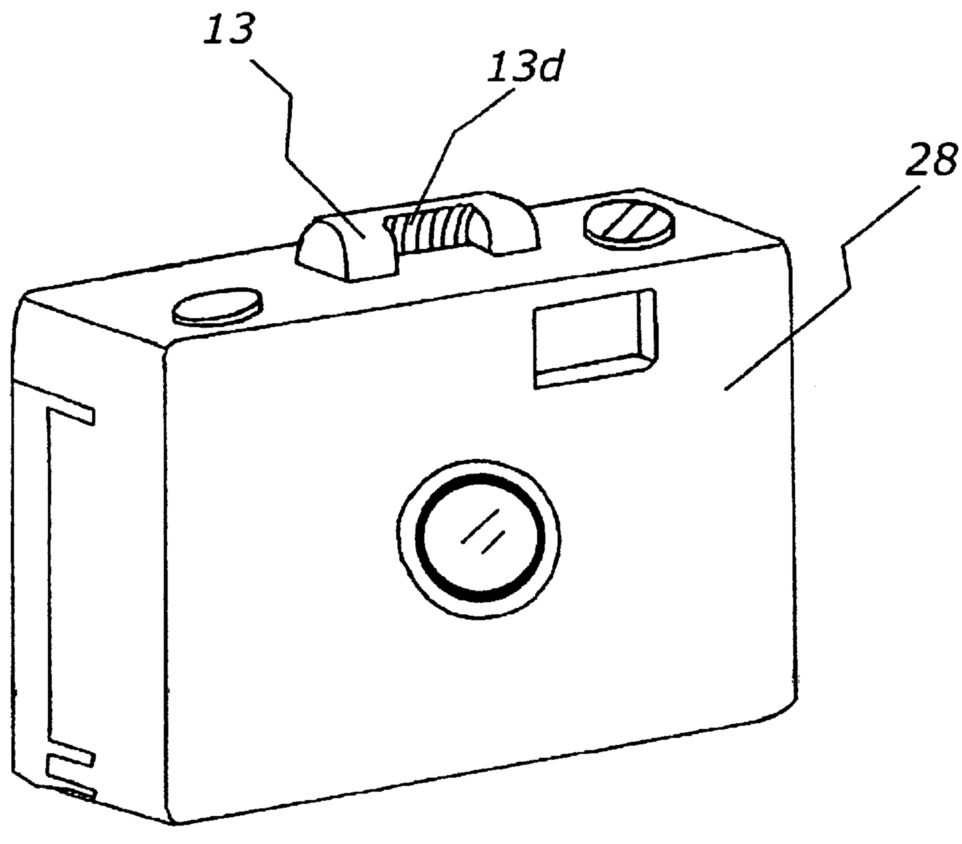

FIG. 8*a* shows a perspective view of a camera body with a catch piece integrated on the top of the camera.

Figure 8B:
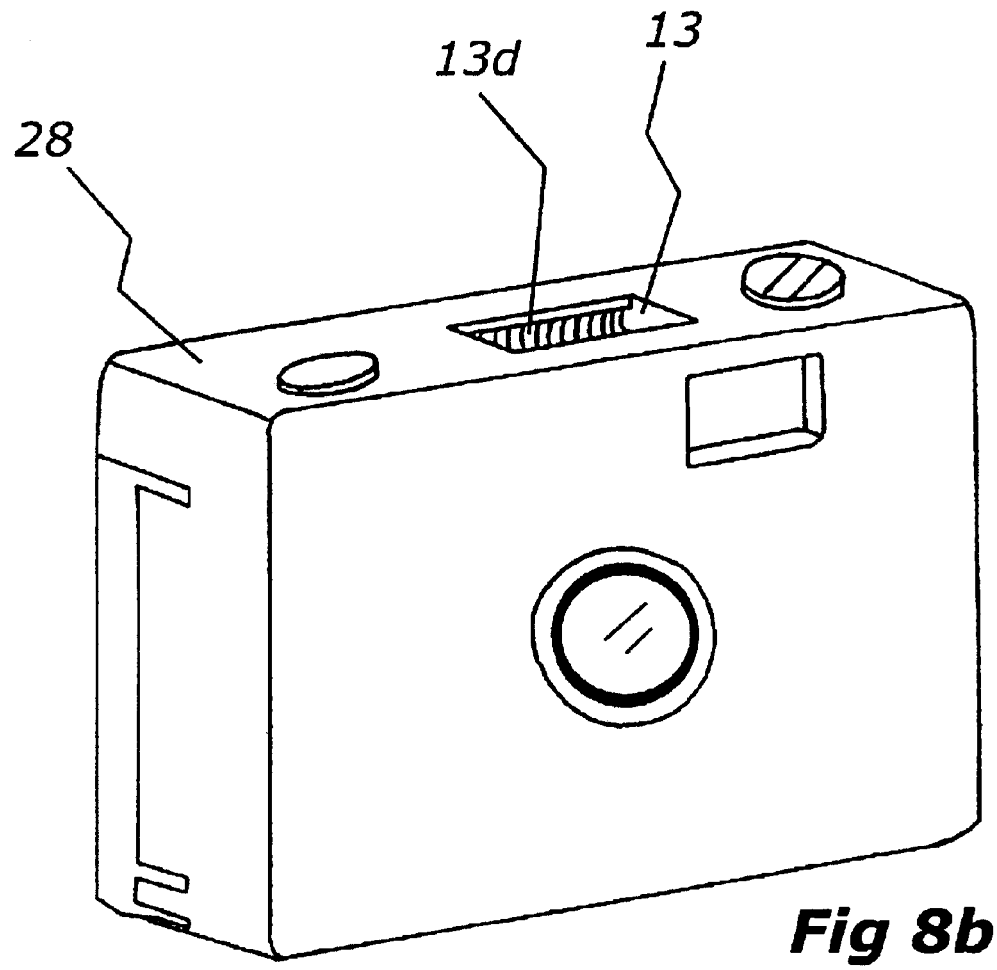

FIG. 8*b* shows a perspective view of a camera body with a catch piece integrated into the top of the camera body.

Figure 8C:
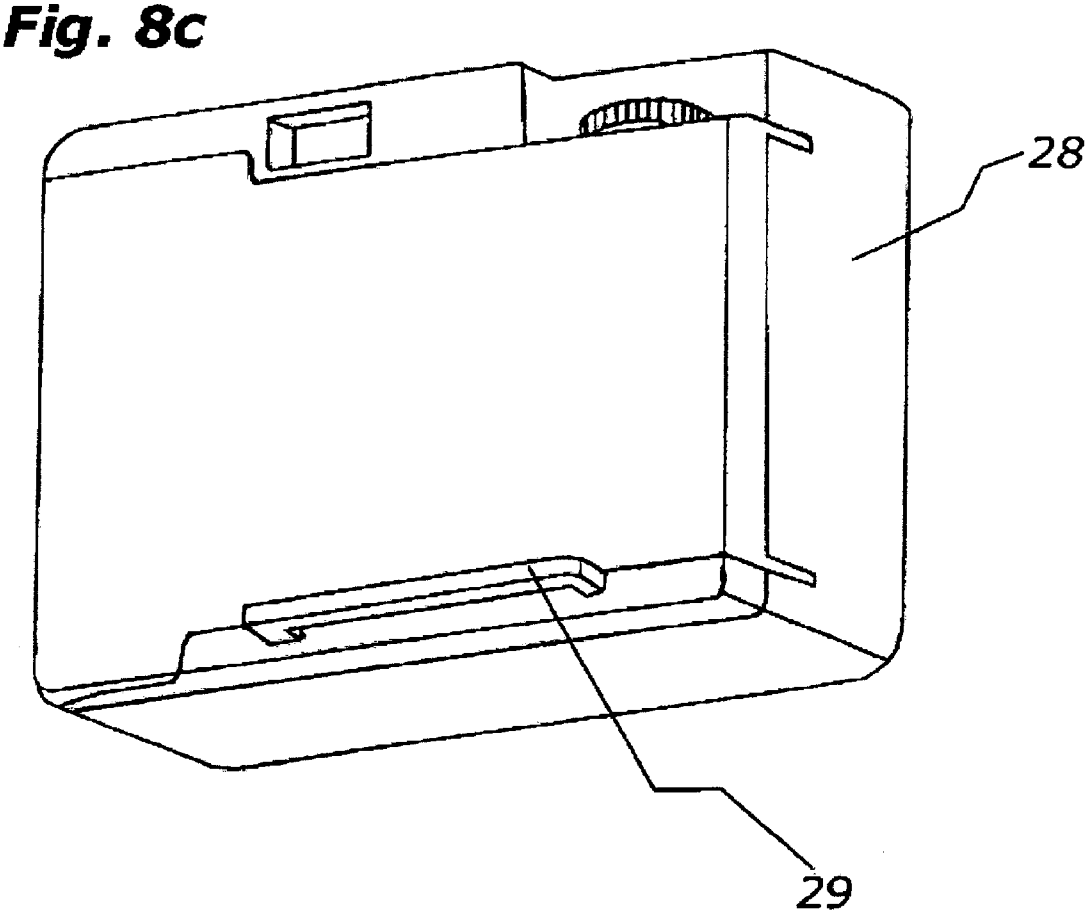

FIG. 8*c* shows a perspective view of a camera body with an extended bar integrated on the back of the camera body.

Figure 8D:
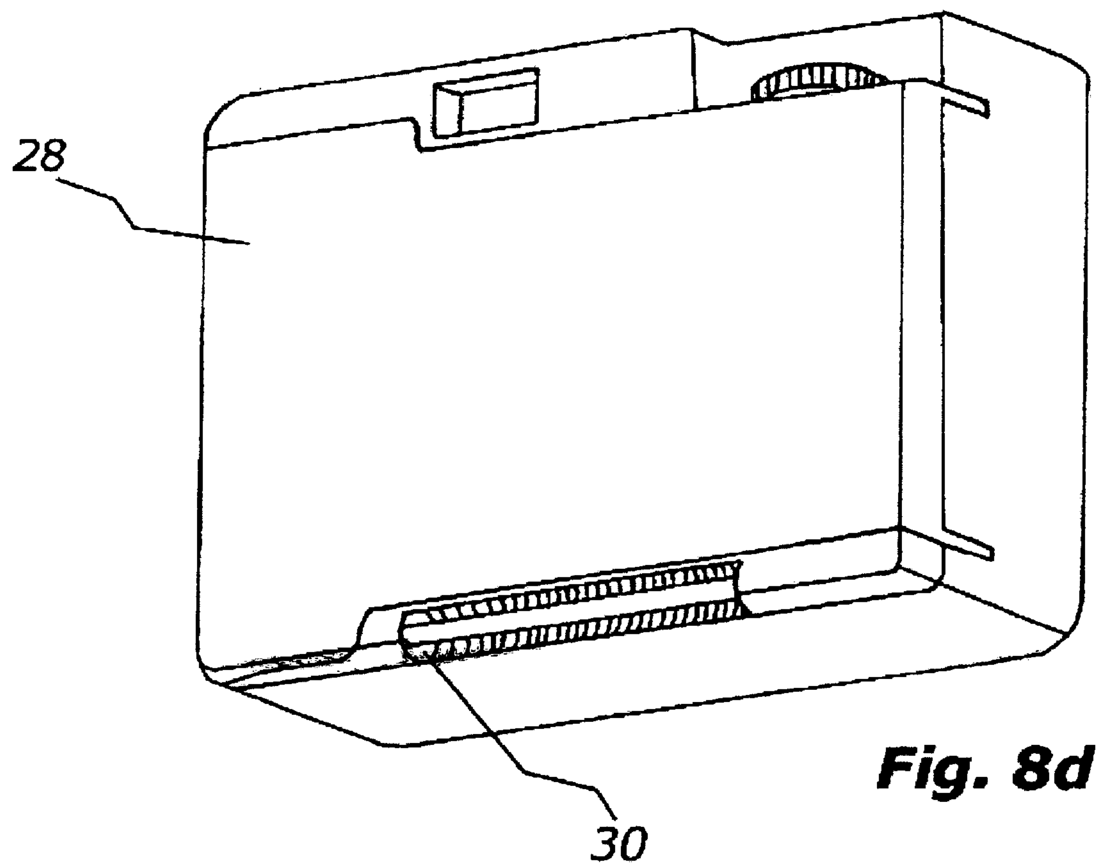

FIG. 8*d* shows a perspective view of a camera body with a recessed groove and bar integrated into the back of the camera body.

Figure 8E:
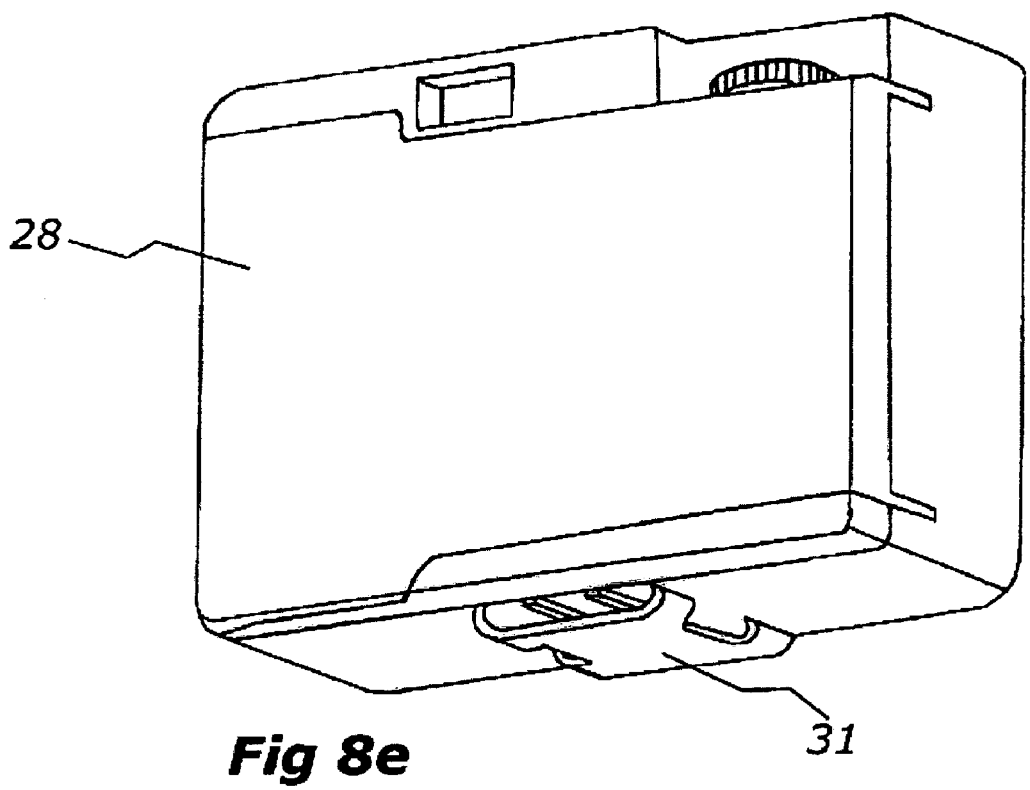

FIG. 8*e* shows a perspective view of a camera body with a female clip integrated onto the bottom of the camera body.

Figure 8F:
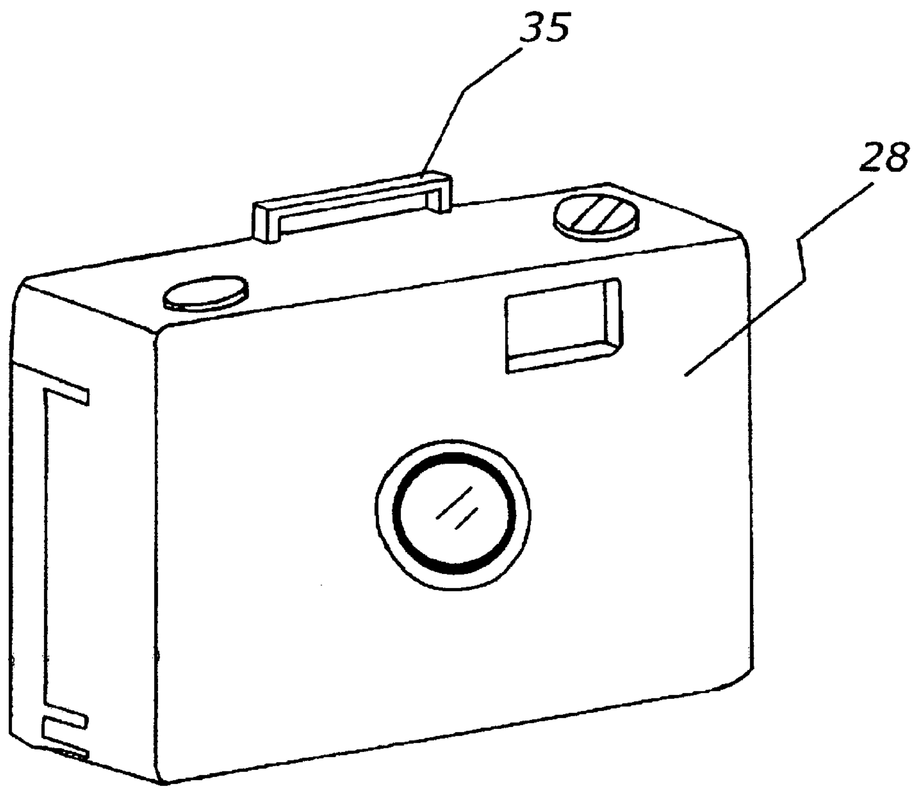

FIG. 8*f* shows a perspective view of a camera body with an extended bar integrated with the camera body.

Figure 8G:
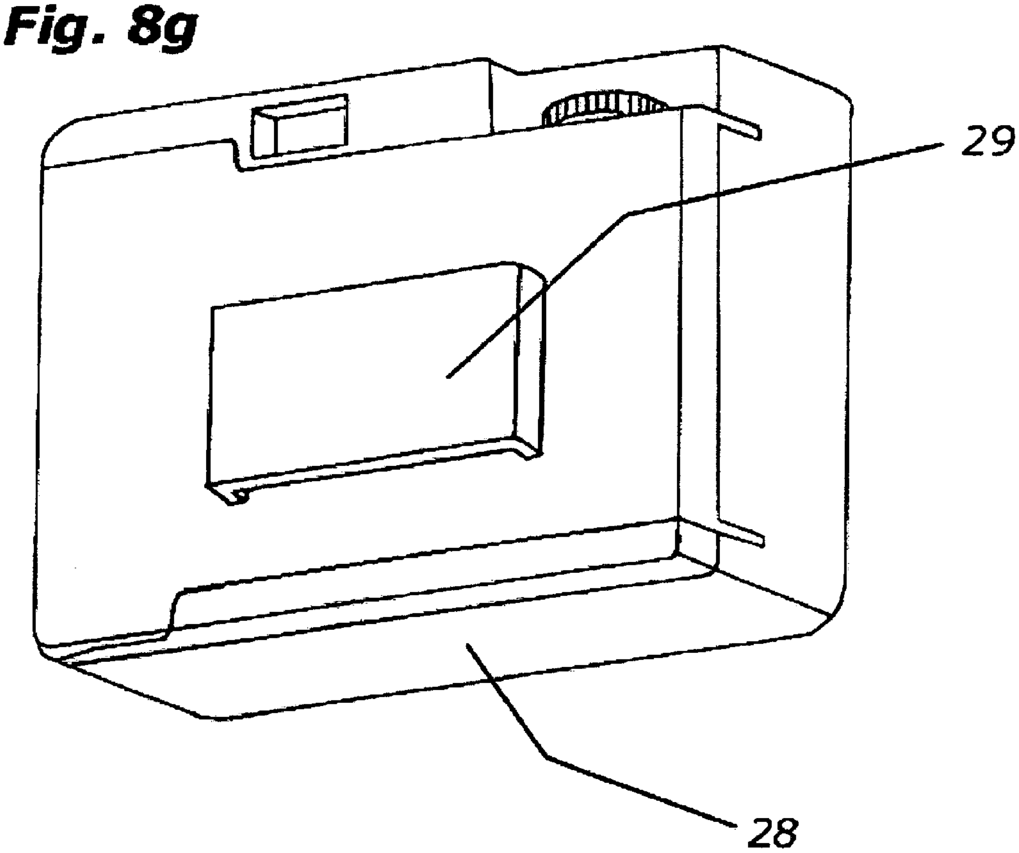

FIG. 8*g* shows a perspective view of a camera body with an extended bar integrated onto the back of the camera body.

Figure 8H:
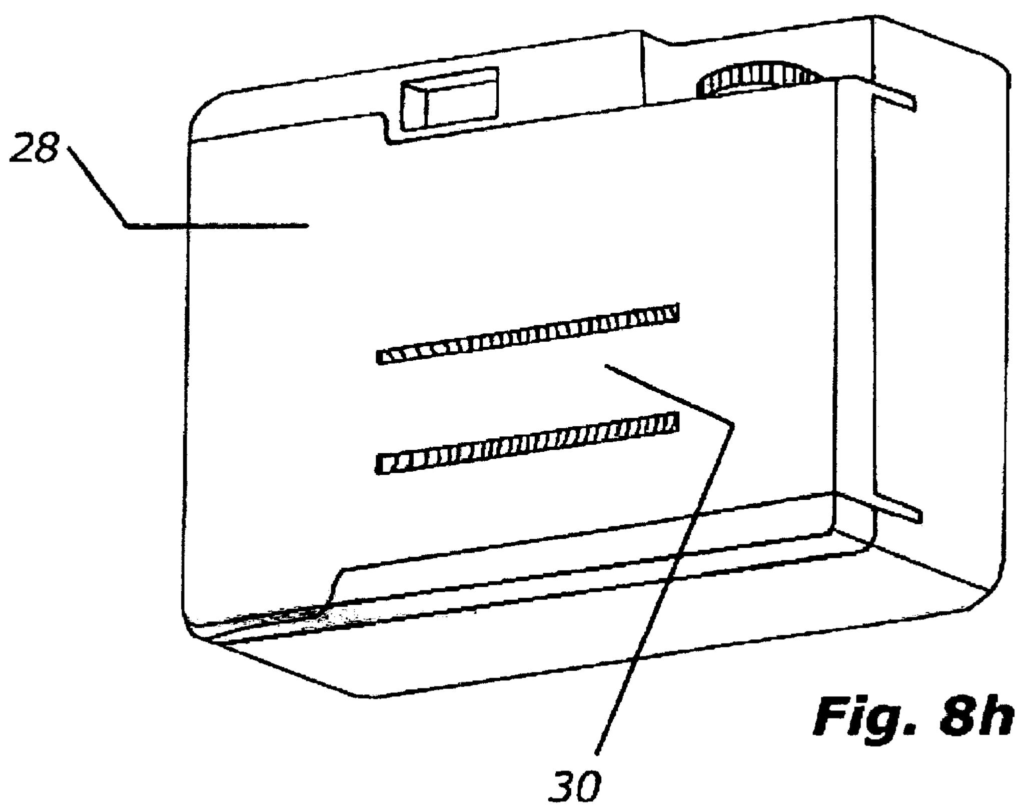

FIG. 8*h* shows a perspective view of a camera body with a recessed groove and bar integrated into or onto the back of the camera body.

Figure 8I:
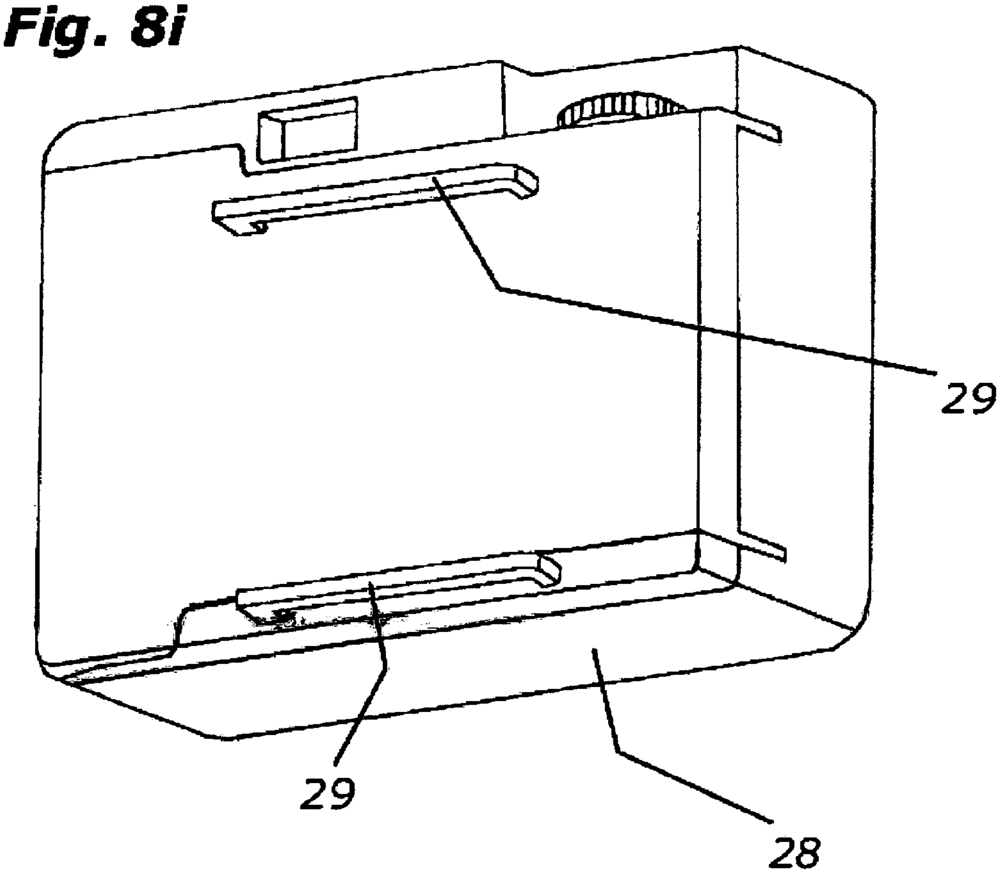

FIG. 8*i* shows a perspective view of a camera body with two extended bars on the back of the camera body.

Figure 8J:
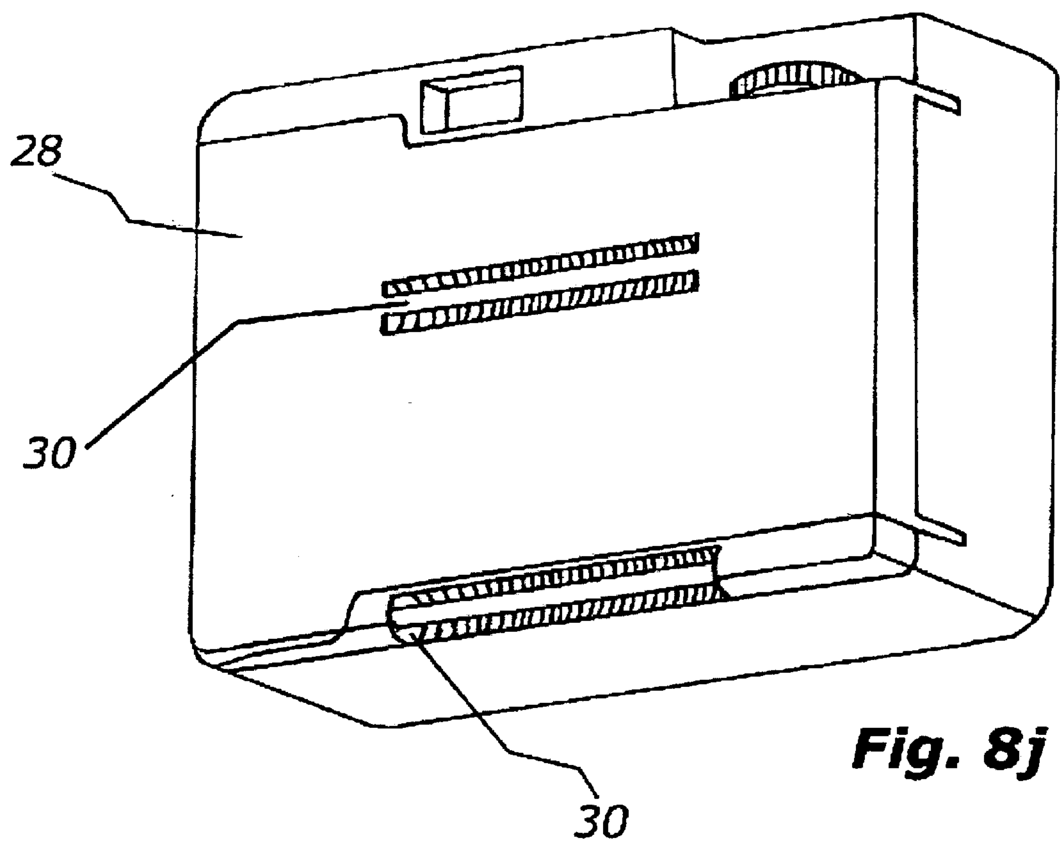

FIG. 8*j* shows a perspective view of two recessed groove and bars integrated into or onto the back of the camera body.

Figure 8K:
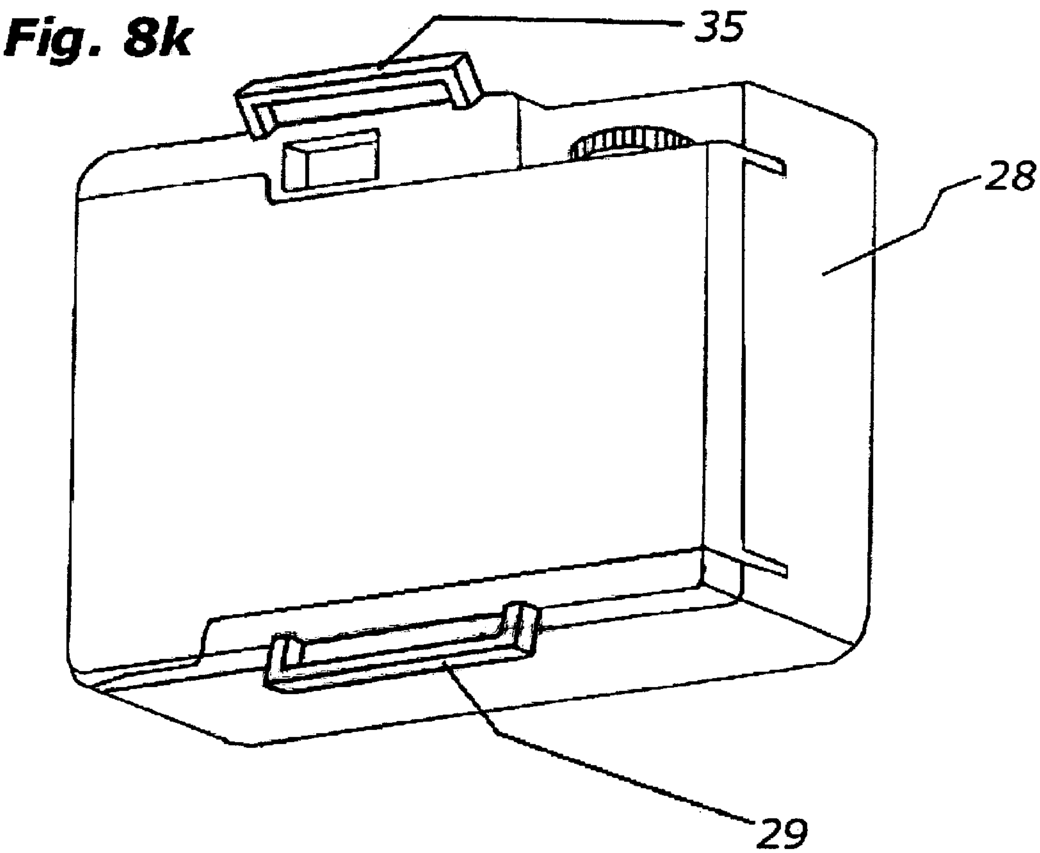
Figure 8I:
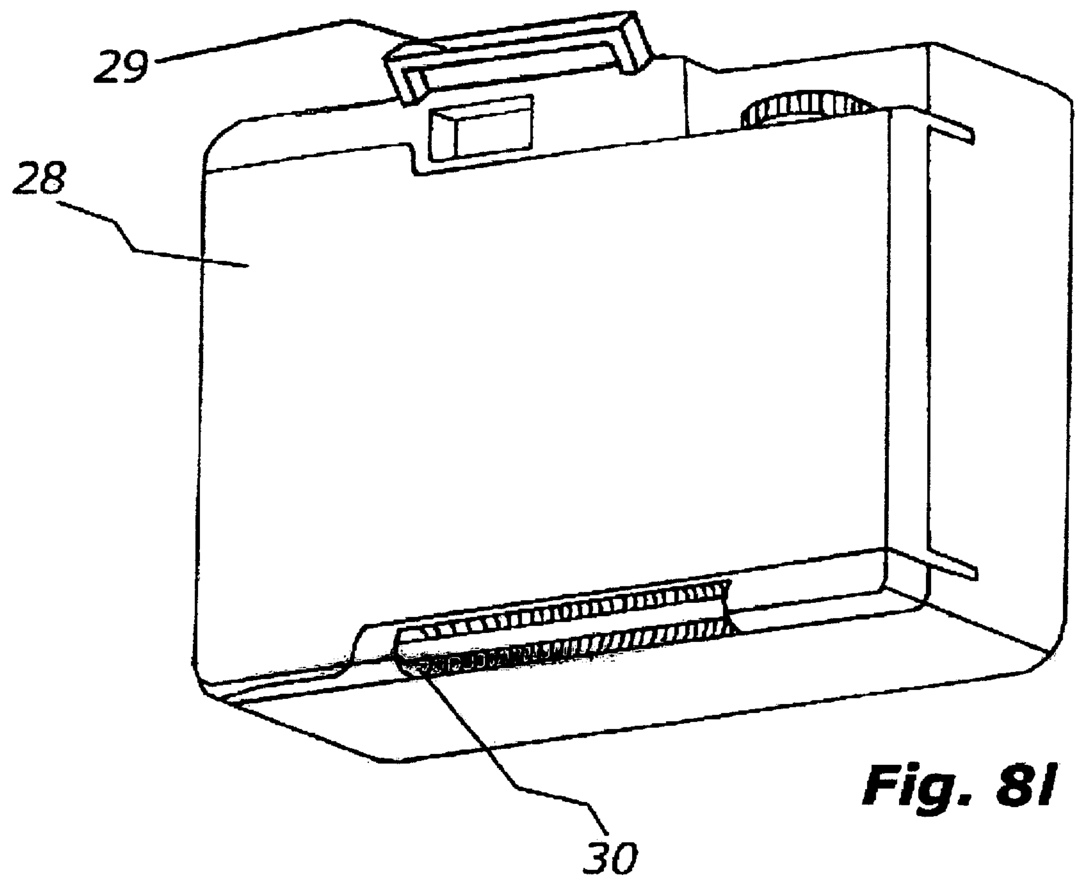

FIG. 8*k* shows a perspective view of-a camera body with an extended bar integrated onto the top back comer of the camera body and second extended bar integrated onto the bottom back comer of the camera body.

FIG. **8*l*** shows a perspective view of a camera body with an extended bar integrated onto the top back comer of the camera body and a recessed groove and bar integrated onto or into the back of the camera body.

FIG. **8*m*** shows a perspective view of a camera body with three extended bars integrated onto the camera body.

FIG. **8*n*** shows a perspective view of a camera body with a hook integrated onto the top of the camera body.

FIG. **9*a*** shows a perspective view of a camera housing with the catch piece integrated on the top of the camera housing.

FIG. **9*b*** shows a perspective view of a camera housing with the catch piece integrated into the top of the camera housing.

FIG. **9*c*** shows a perspective view of a camera housing with an extended bar integrated on the back of the camera housing.

FIG. **9*d*** shows a perspective view of a camera housing with a recessed groove and bar integrated into the back of the camera housing.

FIG. **9*e*** shows a perspective view of a camera housing with a female clip integrated onto the bottom of the camera housing.

FIG. **9*f*** shows a perspective view of a camera housing with an extended bar integrated with the camera housing.

FIG. **9*g*** shows a perspective view of a camera housing with an extended bar integrated onto the back of the camera housing.

FIG. **9*h*** shows a perspective view of a camera housing with a recessed groove and bar integrated into or onto the back of the camera housing.

FIG. **9*i*** shows a perspective view of a camera housing with two extended bars on the back of the camera housing.

FIG. **9*j*** shows a perspective view of two recessed groove and bars integrated into or onto the back of the camera housing.

FIG. **9*k*** shows a perspective view of a camera housing with an extended bar integrated onto the top back corner of the camera housing and second extended bar integrated onto the bottom of the camera housing.

FIG. **9*l*** shows a perspective view of a camera housing with an extended bar integrated onto the top back comer of the camera housing and a recessed groove and bar integrated onto or into the back of the camera housing.

FIG. **9*m*** shows a perspective view of a camera housing with three extended bars integrated onto the camera housing.

FIG. **9*n*** shows a perspective view of a camera housing with a hook integrated onto the top of the camera housing.

DETAILED DESCRIPTION OF THE INVENTION

The present invention includes a camera harness and improved camera body and improved camera housing to secure a camera in a first secure position to a user while the camera is not in use and allowing for pivotably moving the camera into a picture-taking position to take a picture while remaining secured to the camera harness in a second secure position. Further, the present invention allows for quickly returning the camera to the first secure position once the user completes taking the picture. Further still, the present invention includes and allows for alternative camera harnesses or straps to be attached to the improved camera body and or improved camera housing to secure a camera to a user in a fixed first secure position.

General Structural Configuration

Figure 1:
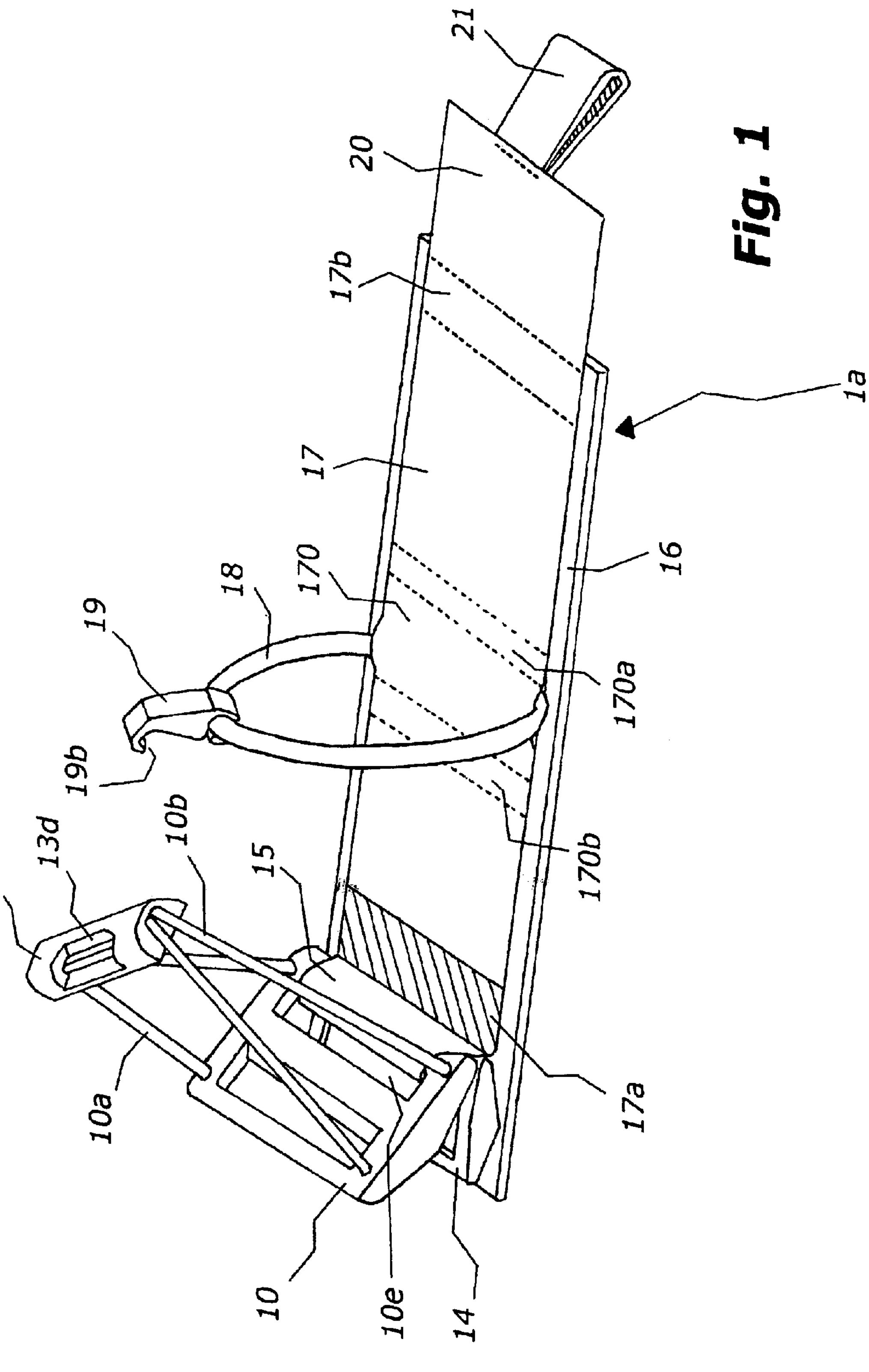

FIG. 1 is a perspective view of the harness **1*a* in an open and extended position, revealing all of its parts in full view. The length and main body of harness 1*a* is made up of two lengths of hook and loop material, loop material 17 and hook material 20, that are joined together to form one unified length of hook and loop material. Loop material 17 and hook material 20 are joined together at union 17*b*. The hook and loop fastening sides of both loop material 17 and hook material 20 are facing up in FIG. 1. In a preferred embodiment, union 17*b* is an ultrasonic weld, however, union 17*b*** can be accomplished by any suitable means of fastening two lengths of fabric together, including but not limited to sewing, gluing, stapling, riveting, sealing, tacking, binding, and so on.

It is noted that in an alternative embodiment the loop material 17 and the hook material 20 may be configured to incorporate the functionality within a unitary structure and may not need the union **17*b*. Additionally, in a preferred embodiment the material for the length and main body of harness 1*a*** is hook and loop material, but any other natural or synthetic material could be used as an alternative, including but not limited to cotton, leather, polypropylene, nylon, rubber, neoprene, plastic and so on.

Figure 2:
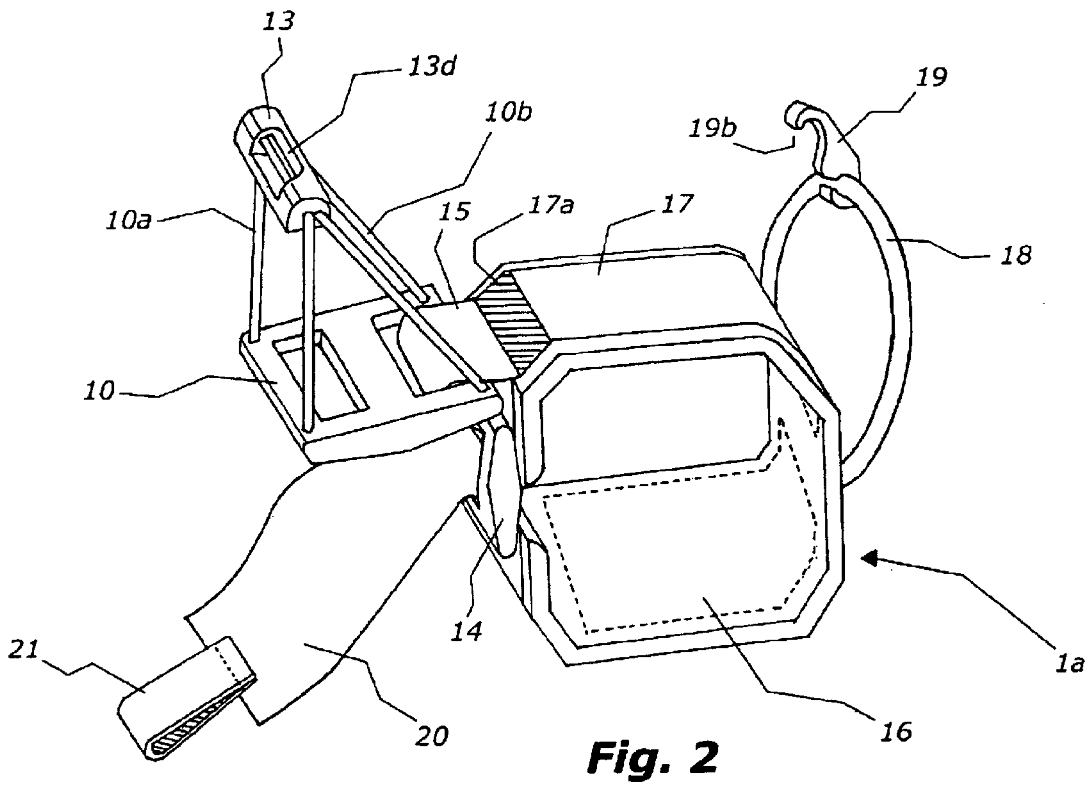
FIG. 2 shows a perspective view of the invention in a semi-closed or semi-cinched position.

FIG. 1 and FIG. 2 illustrate a tag or a pull tab 21 fastened onto the underside and end of hook material 20. In a preferred embodiment pull tab 21 is folded or doubled over onto itself and its ends are then sewn onto hook material 20, however, pull tab 21 need not be folded over onto itself and pull tab 21 need not be sewn on as any suitable means of fastening two pieces of fabric together, such as welding, gluing, stapling, riveting, sealing, tacking, etc. will work to attach pull tab 21 to hook material 20. In a preferred embodiment, pull tab 21 is made out of polypropylene, however pull tab 21 can be made out of any material including but not limited to cotton, rubber, plastic, nylon, neoprene, ribbon, tape, and so on. In one embodiment, pull tab 21 may be optionally eliminated from the present invention.

FIG. 1 illustrates a loop, o-shaped ring, or hook ring 18 positioned on loop material 17. The bottom portion of hook ring 18 is held in place and sandwiched against the top side of loop material 17 by a patch 170 that is attached to the topside of loop material 17 at union **170*a* and union 170*b* on either side of hook ring 18. Hook ring 18 is free to pivot from left to right and vice versa in FIG. 1 due to its unbinding attachment to loop material 17 provided by patch 170. In a preferred embodiment, hook ring 18 is made of rubber, however, hook ring 18 can alternately be made of any other type of material including but not limited to neoprene, plastic, metal, fibrous material, fabric, or elastic cord, and so on. In one embodiment, hook ring 18 need not be free to pivot. Hook ring 18 may be of any diameter, thickness, resiliency or stretchiness and may be composed of a variety of materials or components to retain desired stretch and or attachment characteristics. Additionally, hook ring 18** may be of any shape other than that of a ring.

Additionally, in a preferred embodiment, patch 170 is made of hook and loop material, specifically loop material, however, any material, natural or synthetic, including but not limited to hook material, cotton, polypropylene, nylon, rubber, neoprene, or plastic, etc. could be used as an alternative material for patch 170. Additionally, patch 170 can be omitted and hook ring 18 can be sewn directly onto loop material 17. In a preferred embodiment, hook ring 18 is an o-shaped ring, however any shape can serve as a substitute shape for hook ring 18, including but not limited to a square ring, D-shaped ring, or triangle-shaped ring.

Additionally, a strip or plurality of strips of any material including but not limited to hook and loop material, nylon, rubber, rubber bands, polypropylene, neoprene, plastic and so on can serve as a substitute for hook ring 18. In a preferred embodiment, union 170*a* and union 170*b* are ultrasonic welds, however any suitable means of fastening two pieces of fabric together, such as sewing, gluing, stapling, riveting, sealing, tacking, binding, etc. would work as an alternative. Additionally, in a preferred embodiment, the bottom of hook ring 18 and patch 170 are positioned on the topside of hook material 17 in FIG. 1, but the bottoms of both hook ring 18 and patch 170 can be positioned and fastened to loop material 17 on the bottom side of loop material 17 as an alternative.

FIG. 1 illustrates a cinching loop or square ring 14 and a base plate or coupling plate 10 (FIG. 7) attached to the left end of loop material 17. This is accomplished by folding the end of loop material 17 around and through a pivot channel 10*e* (FIG. 7) located on coupling plate 10 and through square ring 14. The end of loop material 17 is then folded back under and onto itself on the underside of loop material 17 and is fastened to itself at union 17*a*. The fold created by folding loop material 17 back under onto itself forms a hinge point or a pivot sleeve 15 that both attaches square ring 14 and coupling plate 10 to loop material 17 in a manner that allows square ring 14 and coupling plate 10 to move pivotably. In one embodiment, square ring 14 need not be able to move pivotably.

In FIG. 1, square ring 14 is positioned underneath coupling plate 10. In a preferred embodiment, square ring 14 is made of plastic, however, square ring 14 can be alternately made, molded, machined, or otherwise manufactured out of any other natural or synthetic material including but not limited to different types of plastic, rubber, metal, fabric, alloy, composite, etc. In a preferred embodiment, coupling plate 10 is made of rubber, however coupling plate 10 can be alternately made, molded, machined, or otherwise manufactured out of any other natural or synthetic material including but not limited to different types of plastic, rubber, metal, fabric, alloy, etc. In a preferred embodiment, coupling plate 10 is molded as one piece, however coupling plate 10 can alternately be molded, made or otherwise manufactured as a plurality of pieces that are then attached together by any reasonable means to form coupling plate 10. Note that the coupling plate 10 is semi-rigid although alternatively it may also be either rigid or flexible.

In a preferred embodiment, union 17*a* is an ultrasonic weld, however, any suitable means of fastening two pieces of fabric together including but not limited to hook and loop fastening, sewing, gluing, stapling, riveting, sealing, tacking, binding, etc. would work as an alternative. In a preferred embodiment, pivot sleeve 15 is made from a fold in loop material 17, however, pivot sleeve 15 can be made, machined, molded, or otherwise manufactured from any type of material including but not limited to different types of plastic, rubber, metal, fabric, and so on, whereby the alternate material is then attached to the end of loop material 17 by any means suitable for attaching two pieces of material together, including but not limited to welding, sewing, gluing, stapling, riveting, sealing, tacking, etc.

FIGS. 1, 2, 3, and 4 illustrate rings, bands, or coupling band 10*a* and coupling band 10*b* protruding from coupling plate 10. FIGS. 3 and 4 show coupling band 10*a* and coupling band 10*b* stretching around the body of a camera. In a preferred embodiment, coupling band 10*a* and coupling band 10*b* are molded as a part of coupling plate 10 and are made of rubber, however, coupling plate 10, coupling band 10*a*, and coupling band 10*b* can be alternately made, molded, machined, or otherwise fabricated as a single part or separate parts made of any material including but not limited to cord, neoprene, hook and loop material, any type of rubber, nylon, LYCRA, and so on. Additionally, coupling plate 10, coupling band 10*a*, and coupling band 10*b* may be of any color, thickness, size, durometer, flexibility or rigidity to accommodate cameras of varying type, size and shape.

In one embodiment, coupling band 10*a* and coupling band 10*b* are described as rings with closed loop shapes, whereas as both coupling band 10*a* and coupling band 10*b* can have alternative shapes including but not limited to square shapes, oval shapes, elliptical shapes, or can be open lengths of any material including but not limited to hook and loop material, rubber, neoprene, nylon adhesive tape, adhesive material, and so on. Further, coupling band 10*a* and coupling band 10*b* may be fabricated as a single part with coupling plate 10, but alternatively coupling bands 10*a* and 10*b* can be fabricated as a single separate part or as a plurality of separate parts from coupling plate 10 in which case they can snap to or in any other way attach to coupling plate 10.

In a preferred embodiment, coupling band 10*a* and coupling band 10*b* are both present, however, an alternative embodiment can include only a single coupling band 10*a* or a single coupling band 10*b*. Additionally, coupling plate 10 can be made in a plurality of pieces that sandwich around coupling band 10*a* and coupling band 10*b* during the assembly of coupling plate 10. In a preferred embodiment coupling plate 10 is made of rubber, but alternatively coupling plate 10 can be made of any material including but not limited to plastic, fabric, neoprene, a composite, or metal.

FIGS. 1, 2, and 3 illustrate a clasp or catch piece 13 attached to the top area of coupling band 10*a* and coupling band 10*b*. FIG. 6 shows a perspective view of catch piece 13. Catch piece 13 has a recessed cavity or catch cradle 13*d* in the front center of its body to receive a hook end 19*b* (FIG. 5) of a mating clasp or hook piece 19 (FIG. 5). The mating of catch piece 13 and hook piece 19 keep the camera in a first secured position. As an alternative embodiment, catch cradle 13*d* can be omitted from catch piece 13 and a hollow pass-through or channel can serve as a substitute resulting in catch piece 13 having a hollow pass-through center.

Catch piece 13 is attached to coupling band 10*a* and coupling band 10*b* by stretching coupling band 10*a* and coupling band 10*b* to first reduce the cross section diameters of coupling band 10*a* and coupling band 10*b* so as to allow coupling band 10*a* and coupling band 10*b* to then be pulled into anchor groove 13*a* (FIG. 6) and anchor groove 13*b* (FIG. 6) via a groove channel 13*c* (FIG. 6) that runs laterally across the underside of catch piece 13, as does anchor groove 13*a* and anchor groove 13*b*. Once coupling band 10*a* and coupling band 10*b* are positioned within anchor grooves 13*a* and 13*b* and are no longer being stretched, the cross section diameters of coupling band 10*a* and coupling band 10*b* will expand within anchor grooves 13*a* and 13*b* resulting in coupling band 10*a* and coupling band 10*b* being firmly attached to catch piece 13.

In one embodiment, catch piece 13 may be made of a rigid or substantially rigid material, e.g., a plastic. Alternatively, catch piece 13 may be made, molded, machined, or otherwise manufactured out of any other material including, but not limited to, different types of plastic, rubber, metal, alloy, composites and so on. Additionally, in one embodiment groove channel 13*c*, groove anchor 13*a*, and groove anchor 13*b* are positioned on the underside of catch piece 13.

Alternatively, groove channel 13*c*, groove anchor 13*a*, and groove anchor 13*b* can be positioned either on the front, back or top-side of catch piece 13. Additionally, anchor grooves 13*a* and 13*b* can each have their own individual groove channel 13*c*, creating a plurality of groove channel 13*c*, rather than sharing a single groove channel 13*c*, for example, as illustrated. Alternately, catch piece 13 can have only anchor groove 13*a* and not include anchor groove 13*b*. Any combination of these alternatives for anchor groove 13*a* and anchor groove 13*b* and groove channel 13*c* can be positioned in any combination either on the top, bottom, side or sides, and or front or back of catch piece 13.

Furthermore, in one embodiment, coupling band 10*a* and coupling band 10*b* and catch piece 13 are separate elements that are attached together to function as a single unit, whereas alternatively, coupling band 10*a* and coupling band 10*b* and catch piece 13 can be made, molded, machined, or otherwise fabricated as one single part or element, separate or in combination with coupling plate 10, possibly eliminating the need for groove channel 13*c*, groove anchor 13*a*, and groove anchor 13*b*. A further alternative provides that coupling band 10*a* and coupling band 10*b* and catch piece 13 and coupling plate 10 can be made, molded, machined, or otherwise fabricated as one single part or element. Additionally, catch piece 13 can be molded or otherwise fabricated as a plurality of separate parts that sandwich around and hold in place coupling band 10*a* and coupling band 10*b* when joined.

FIGS. 1, 2, and 3 illustrate a hook piece 19 attached to the top end of hook ring 18. FIG. 3 shows hook piece 19 hooked into, mated, or clasping catch piece 13. FIG. 5 shows a perspective view of hook piece 19. Hook piece 19 is attached to hook ring 18 by stretching hook ring 18 to reduce the cross section diameter of hook ring 18 and then pulling hook ring 18 into a cut out channel or anchor groove 19*a* located on hook piece 19. Once hook ring 18 is positioned within anchor groove 19*a* (FIG. 5) and hook ring 18 is no longer being stretched, the cross section diameter of hook ring 18 expands within anchor groove 19*a* to firmly attach hook ring 18 to hook piece 19. In a preferred embodiment, hook piece 19 is made of molded plastic, however, hook piece 19 can alternately be made, molded, machined, or otherwise manufactured out of any other material including but not limited to different types of plastic, rubber, fabric, metal, alloy, hook and loop material, and so on.

In a preferred embodiment, hook ring 18 is attached to hook piece 19 by being sandwiched inside of anchor groove 19*a*, but an alternative to this is to clamp, glue, melt, weld, stitch, sew, bend, tie, rivet or in any other appropriate way attach hook piece 19 to hook ring 18. Furthermore, anchor groove 19*a* is situated on the underside of hook 19 whereas an alternate location is to position anchor groove 19*a* on the top side or back end of hook piece 19. Additionally, hook piece 19 and hook ring 18 are fabricated as separate elements, however hook piece 19 and hook ring 18 can be fabricated, molded, machined, fabricated or otherwise made as one single part or element. One embodiment might have hook 19, or a part with a similar purpose, attached directly to loop material 17 without hook ring 18.

As another alternative embodiment, hook ring 18 and hook piece 19 can be replaced with a single strip or plurality of strips of material including but not limited to hook and loop material, neoprene, rubber, plastic, fabric, or a combination thereof that attaches, connects or otherwise mates with catch piece 13, coupling band 10*a* and or coupling band 10*b*, a camera body or camera housing, or hook and loop material that is attached to or otherwise integrated onto or into the body of a camera or a camera housing.

FIGS. 1 and 2 illustrate a strip of material, padding, or a comfort strip 16 attached to the underside of loop material 17. In a preferred embodiment, comfort strip 16 is sewn to the underside of loop material 17, but as an alternative, comfort strip 16 can be attached to loop material 17 by any suitable means of fastening two pieces of material together, such as but not limited to gluing, stapling, riveting, sealing, tacking, laminating, binding, etc.

In one embodiment, the material for comfort strip 16 is neoprene, but any other material, fabric, textile or rubber could be used as an alternative for neoprene including but not limited to cotton, polypropylene, nylon, rubber, foam, etc. Additionally, comfort strip 16 is an included element of harness 1*a,* however, as an alternative embodiment of harness 1*a* comfort strip 16 can be excluded from harness 1*a*. As an additional alternative embodiment, comfort strip 16 and loop material 17 can be combined in the form of a piece of VELCRO® laminated neoprene or other VELCRO® laminated material or may be a unitary structure that is configured to provide the functionality of loop material 17 and comfort strip 16. An additional embodiment is to reverse the positioning of ioop material 17 and hook material 20 so that loop material 17 replaces hook material 20 and vice versa.

FIG. 4 illustrates an optional safety cord or safety band 22 that can be attached to a camera's standard wrist strap attachment point, a feature found on most cameras of all types. Once attached to the camera, safety band 22 is then attached to harness 1*a* by leading hook material 20 through safety band 22 and sandwiching safety band 22 between hook material 20 and loop material 17 when harness 1*a* is cinched and fastened around the wrist or arm of the operator. In a preferred embodiment, safety band 22 is an optional element that can be included or excluded at the operator's discretion. As an alternative to the preferred embodiment, safety band 22 can be an integrated element of harness 1*a*. Also in one embodiment, safety band 22 is a rubber band, although any band or strip of any other material could be used as an alternative.

Operation and Functionality

One embodiment for using harness 1*a* in accordance with the present invention is now described, for example, from a perspective of a user (or operator) attaching a camera to his or her left arm or wrist. It is noted that the process and principle described herein may apply to any other appendage or item to which the camera harness 1*a* attaches.

The operator of harness 1*a* first stretches coupling band 10*a* and coupling band 10*b* around a camera's body so that catch piece 13 is positioned on top of the camera, for example, in a position like that shown in FIGS. 3, 3*a*, and 3*b*. Catch cradle 13*d* should be facing the same direction as the camera lens. The operator positions the camera lens in the middle of coupling band 10*a* and coupling band 10*b* by adjusting, stretching, or moving coupling band 1*a* and coupling band 10*b* to either side of the camera lens, as illustrated in FIGS. 3 and 3*a*.

The user can make the same adjustments to the areas of coupling band 10*a* and coupling band 10*b* positioned on the back of the camera to position the camera's viewfinder in between or to the side of coupling band 10*a* and coupling band 10*b*. The exact positioning of the camera inside coupling band 1*a* and coupling band 10*b*, or rather the positioning of coupling band 1*a* and coupling band 10*b* around the camera body, is variable to allow cameras of various shapes, sizes, and dimensions to fit into a single version of harness 1*a*.

Once the operator has secured the camera within coupling band 10*a* and coupling band 10*b* he or she then drapes harness 1*a* across his or her left arm, at or above the wrist, so that the hook and loop fastening side of harness 1*a* is facing up and pull tab 21 end of harness 1*a* is closest to the operator's body. The operator then feeds pull tab 21 end of harness 1*a* through square ring 14 and cinches pull tab 21 end of harness 1*a* until harness 1*a* has a desired tension around the operator's wrist or arm. The operator then fastens hook material 20 to loop material 17 to maintain the desired tension of harness 1*a* around the operator's wrist or arm. At this point harness 1*a* and the attached camera are fastened to the operator's left wrist or arm.

From this point, the operator may grasp the camera with his or her right hand and raises the camera. The operator may, but is not required, to move his or her left wrist or arm up close to his or her face for the purpose of looking through the camera's viewfinder to take a photograph, as illustrated in FIG. 3*a*. The operator can easily pivot the camera into an upright position to facilitate looking through the viewfinder, as illustrated in FIG. 3*a*. The right hand is in position to hold the camera and push the camera's shutter button to take a photograph while the left arm serves as a support to help hold the camera steady for a clear photographic exposure.

One advantage of the present invention is that in the event the user slips, falls, or otherwise needs both hands immediately free, he or she can let go of the camera to do what is necessary to ensure their safety. The camera remains attached to harness 1*a* and the operator (FIG. 3*b*) by way of the camera-to-harness 1*a* coupling system comprised of coupling band 10*a*, coupling band 10*b*, coupling plate 10, catch piece 13, and pivot sleeve 15.

Once the operator is done taking a photograph and wishes to position the camera in a secure carry position, he or she can quickly secure the camera into a flat and stable position on his or her arm or wrist. To do this, the operator may use his or her right hand to pivot the camera into a flat position on his or her wrist (FIG. 3) and then may use his or her right thumb or thumb and index finger, whichever method is desired, to push or pull hook piece 19 up and into catch piece 13 until hook end 19*b* is mated into catch cradle 13*d*. At this point, hook piece 19 will be securely mated with catch piece 13. This will secure the camera in a flat carry position on the operator's arm or wrist.

At this point the operator can freely use their left arm and hand without upsetting, loosening, or otherwise releasing the camera from its secure, flat positioning on his or her arm or wrist. If a tighter, more secure fit is desired, the operator can increase the tension of harness 1*a* around his or her arm or wrist which will also increase the tension of hook ring 18 and hook 19 holding the camera down flat against the arm or wrist of the operator.

To install safety band 22 (FIG. 4) the operator attaches safety band 22 to the camera in the same cinching fashion that he or she would attach a standard rubber band to the attachment bar or loop that is a featured element on most cameras. Once safety band 22 is securely cinched to the camera, the operator unfastens hook material 20 from loop material 17 and guides hook material 20 through the open end of safety band 22, pulling safety band 22 close to square ring 14 in the process. The operator then refastens hook material 20 to loop material 17, sandwiching safety band 22 between hook material 20 and loop material 17, thus securing safety band 22 to harness 1*a*, as illustrated in FIG. 4.

It is noted that to remove harness 1*a* from his or her wrist, the operator simply unfastens hook material 20 from loop material 17 and slides harness 1*a* off of his or her wrist. In addition, to remove the camera from harness 1*a*, the operator simply pulls or stretches coupling band 10*a* and coupling band 10*b* off of the camera. It is also noted that although the example above is discussed with respect to particular right and left hand usage, a vice versa operational usage or a combination of appendages (e.g., attach camera harness to leg) and use right or left hand to take picture) is also within the principles of the present invention.

Additional Alternative Embodiments

Figure 1B:
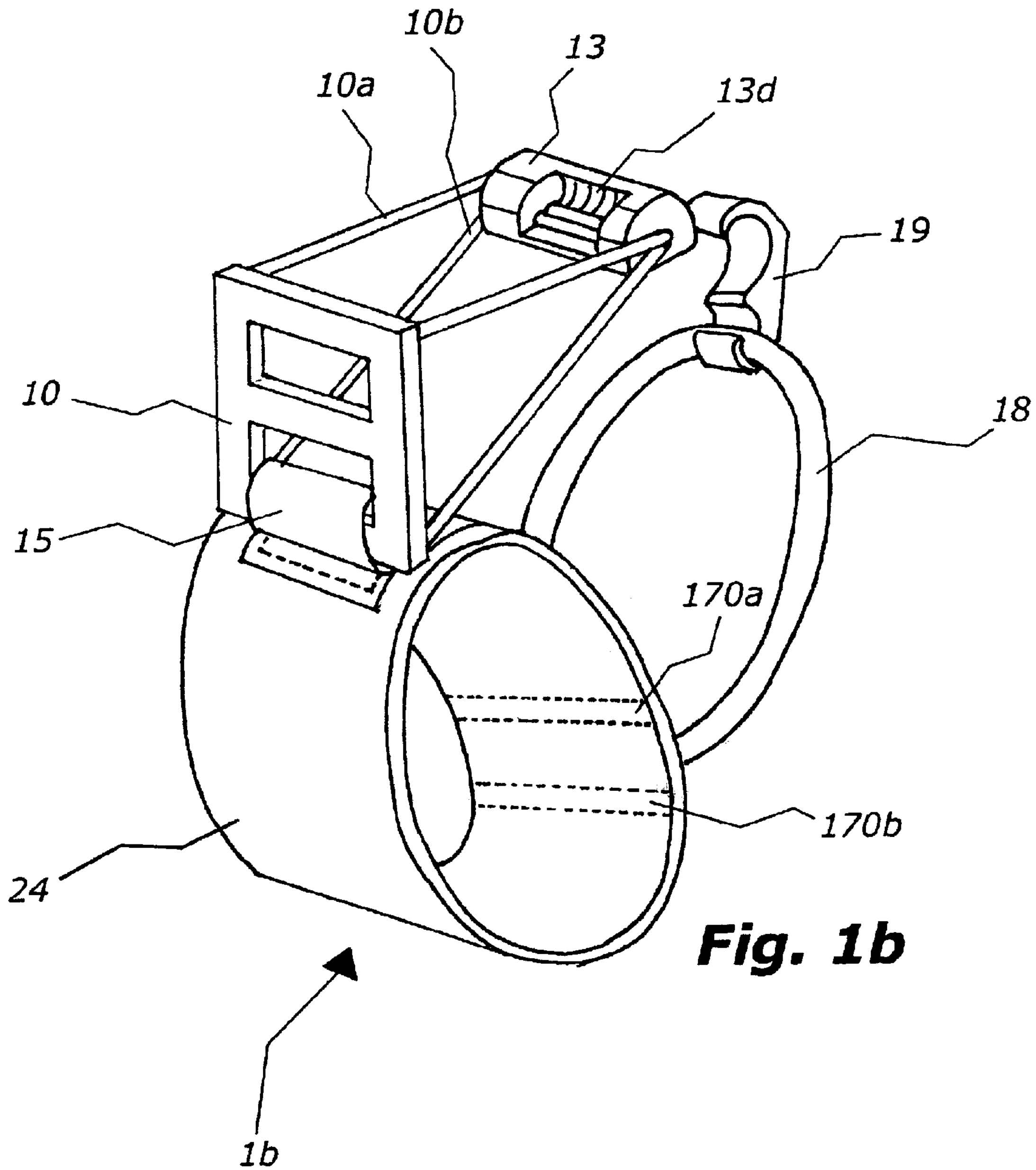

The present invention may be designed and operated in a variety of configurations without departing from the spirit and the scope of the invention. For example, the present invention may be configured in a number of ways in regards to the size, shape, positioning, orientation and materials of the various elements of the invention. More particularly, for example, as illustrated in FIG. 1*b*, loop material 17, hook material 20, comfort strip 16, square ring 14, and pull tab 21 can be replaced with a single sleeve 24 of any material including but not limited to neoprene, nylon, cotton, rubber, or polypropylene, whereby single sleeve 24 is used to attach harness 1*b* to the arm or wrist of a user whereby the user slides his or her hand through single sleeve 24 and pulls single sleeve 24 and harness 1*b* onto his or her wrist or arm. Additionally, single sleeve 24 can have in any way attached to it hook and loop material that serves as a compression strap to increase the tension of single sleeve 24 around the wrist or arm of the user. This hook and loop compression strap can include a square ring allowing the user to cinch the hook and loop material and single sleeve 24 tighter around his or her arm or wrist.

Figure 1C:
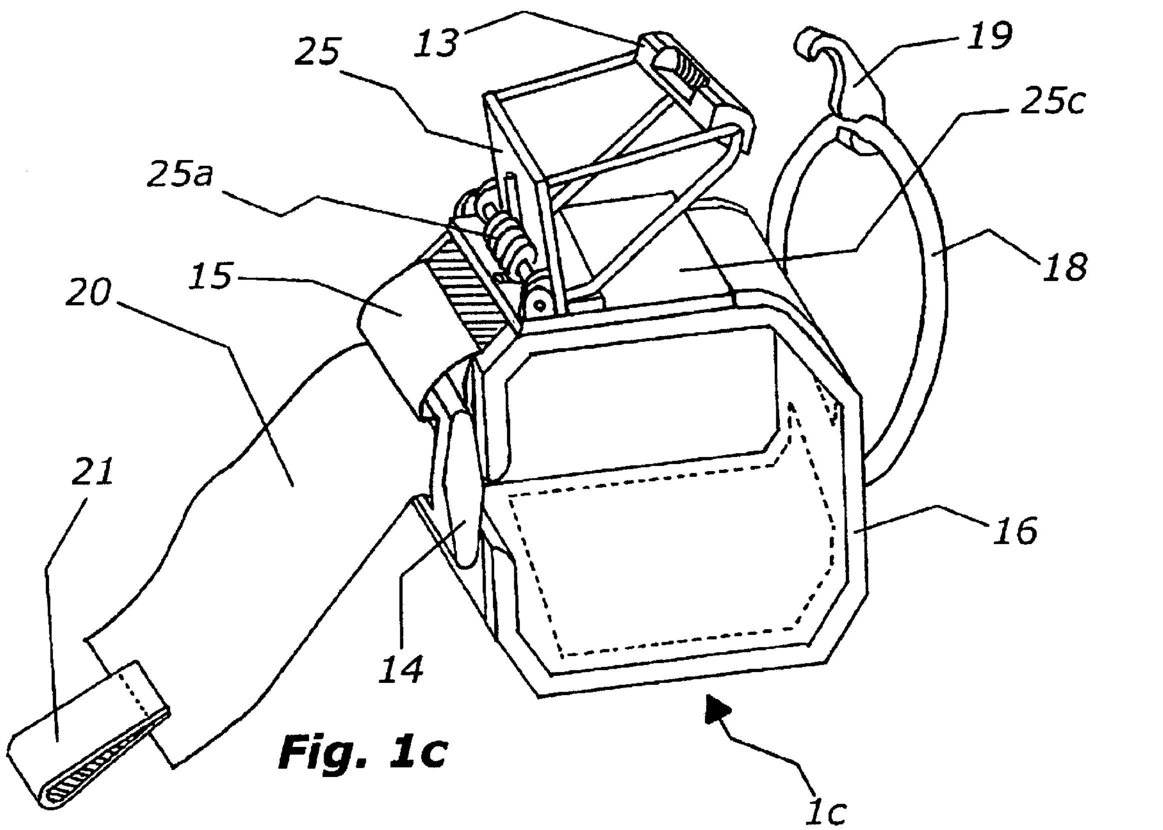

In addition, as illustrated in FIG. 1*c*, coupling plate 10 can be replaced with a spring loaded coupling plate 25, whereby spring loaded coupling plate 25 has a spring 25*a* that applies pressure to spring loaded coupling plate 25 in such a manner that spring loaded coupling plate 25 holds whichever camera is being used with harness 1*c* in a flat position against the operator's wrist or arm. The operator can then apply rotational pressure against the camera and spring loaded coupling plate 25 to compress spring 25, thus pivoting the camera into an upright position for taking a photograph.

Upon release of such pressure by the operator, spring 25 would then force the camera back into a flat position on the arm or wrist of the operator, against back plate 25*c*, which is attached to both coupling plate 25 and loop material 17. Additionally, the bottom portion of spring loaded coupling plate 25 can extend to a length similar to that of back plate 25*c* whereby coupling band 10*a* and coupling band 10*b* attach to the bottom portion of spring loaded coupling plate 25 in a manner similar to how coupling band 10*a* and coupling band 10*b* attach to coupling plate 25*b* in FIG. 1*f*.

Figure 1D:
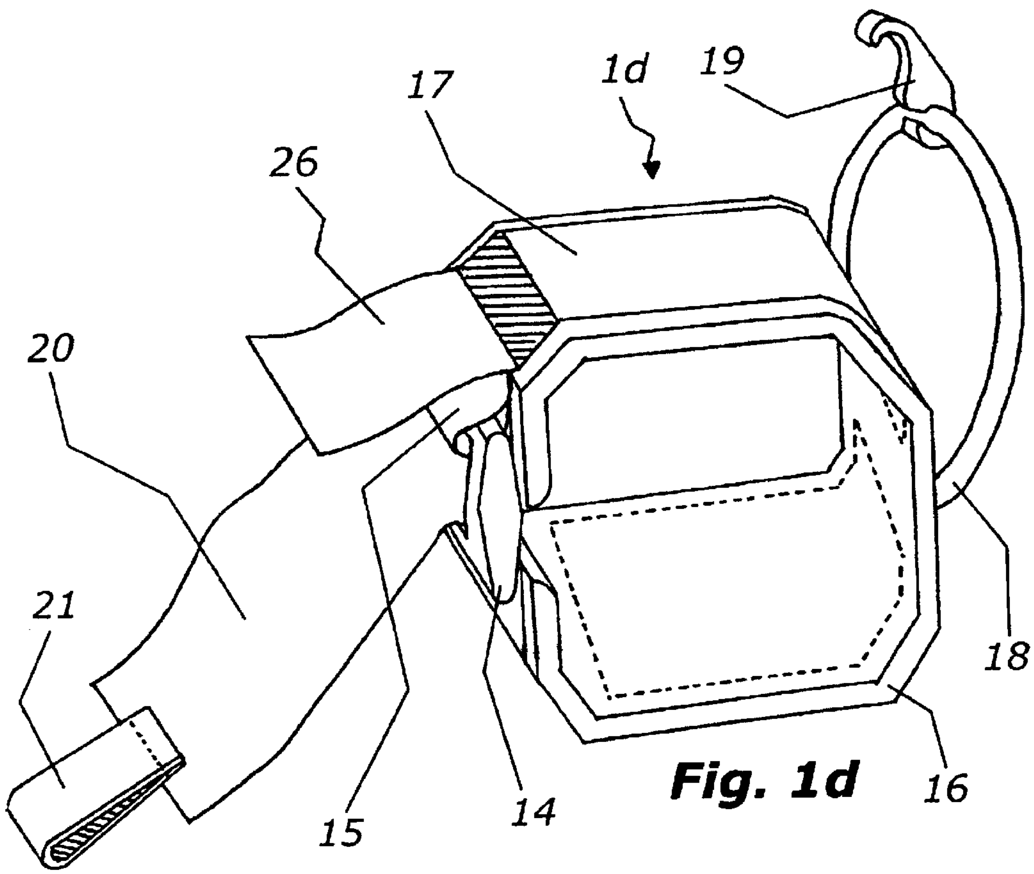

In yet another embodiment, as illustrated in FIG. 1*d*, coupling plate 10 can be replaced with a strip or tongue of hook material 26 that is attached to loop material 17 and can be looped through an extended bar 29 or recessed groove and bar 30 on a camera body 28 or camera housing 32. Tongue of hook material 26 would then be folded back and mated with loop material 17, thus attaching camera body 28 or camera housing 32 to harness 1*d* in a manner that would allow camera body 28 or camera housing 32 to be moved pivotably while attached to harness 1*d*. Additionally, one end of tongue of hook material can be sewn, welded or otherwise attached to pivot sleeve 15.

Figure 1E:
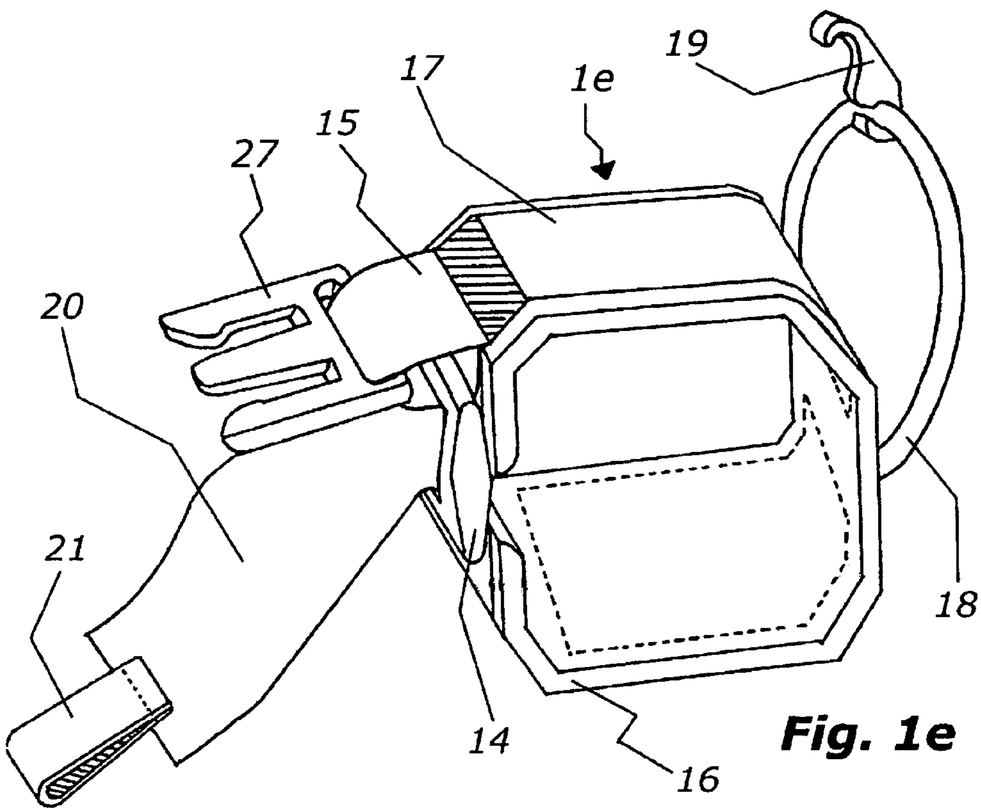

As illustrated in FIG. 1*e*, coupling plate 10 can be replaced with a male buckle or male clip 27 that could be clipped into a mating female clip 31 integrated into camera body 28 or camera housing 32, thereby attaching camera body 28 or camera housing 32 to harness 1*e* in a manner that allows camera body 28 or camera housing 32 to be moved pivotably while attached to harness 1*e*. Alternately, male clip 27 as illustrated in FIG. 1*e* can be substituted with female clip 31 and female clip 31 on camera body 28 can be substituted with male clip 27. Any type of male or female clip, connector or union can be used as a substitute and the illustration in FIG. 1*e* is only for example reference. Alternatively, male clip 27 and female clip 31 can be substituted with joining parts similar to those used to attach a wristwatch band to a watch piece, for example, a magnetic resistance.

Figure 1F:
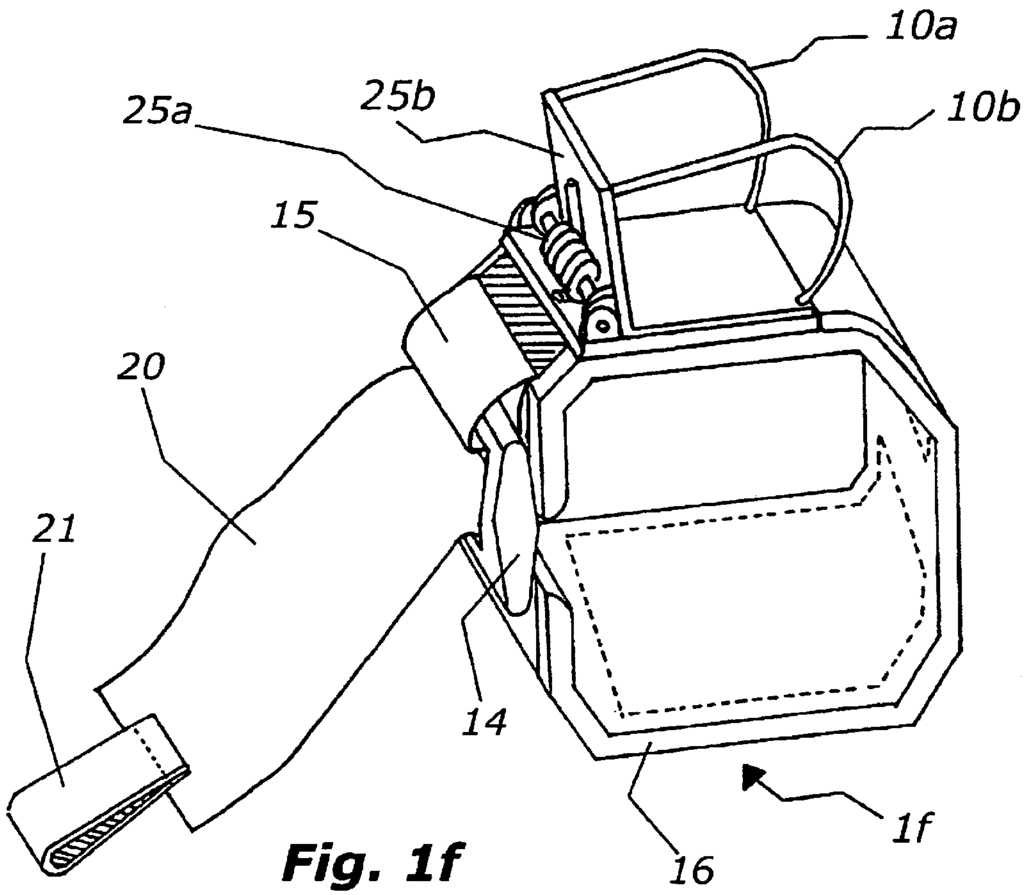
Figure 1G:
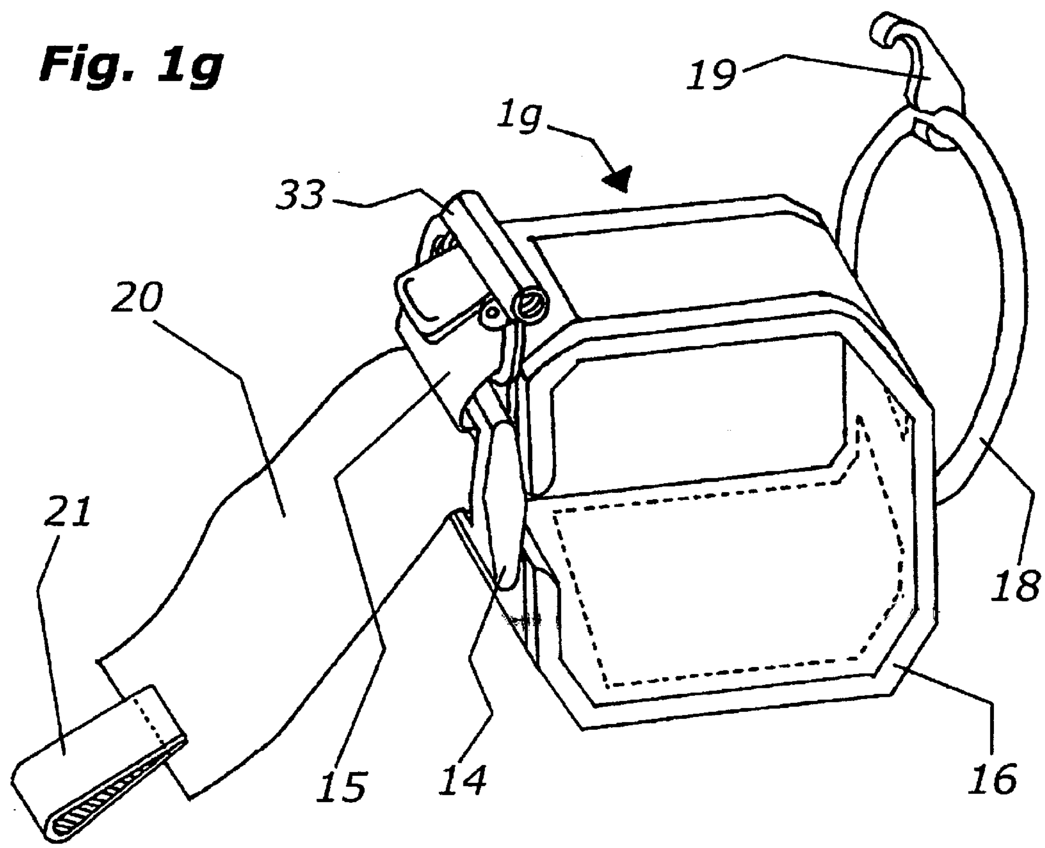

As illustrated in FIG. 1*f*, coupling plate 10 can be replaced with a spring loaded coupling plate 25*b* whereby coupling band 10*a* and coupling band 10*b* attach to spring loaded coupling plate 25*b*, as illustrated. Further, as illustrated in FIG. 1*g*, coupling plate 10 can be replaced with a spring loaded clip 33 that can be attached or clipped to a camera body or housing. Additionally, the spring loaded clip can be attached to a recessed groove and bar 30 (FIG. 8*d*) or an extended bar 29 (FIG. 8*c*) on a camera body or camera housing. As an alternative, spring loaded clip 33 can be held closed with something other than a spring, for example, a magnetic resistance.

Figure 1H:
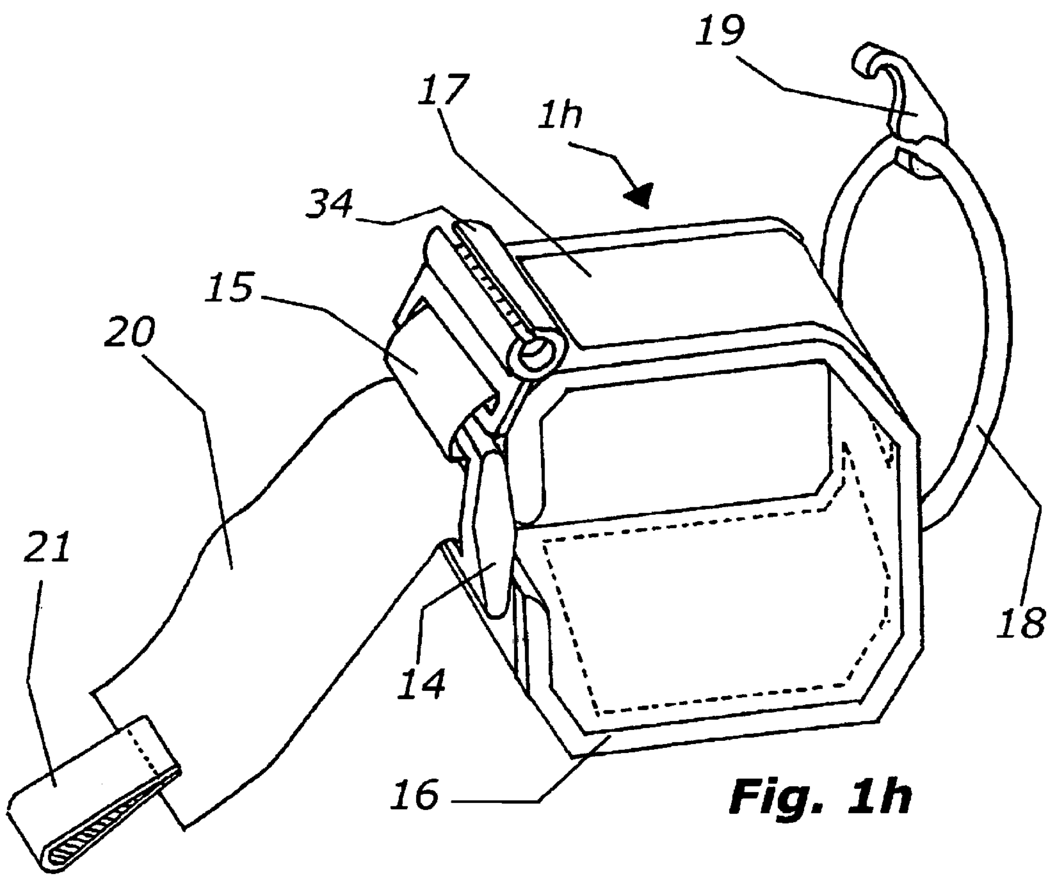
Figure 1I:
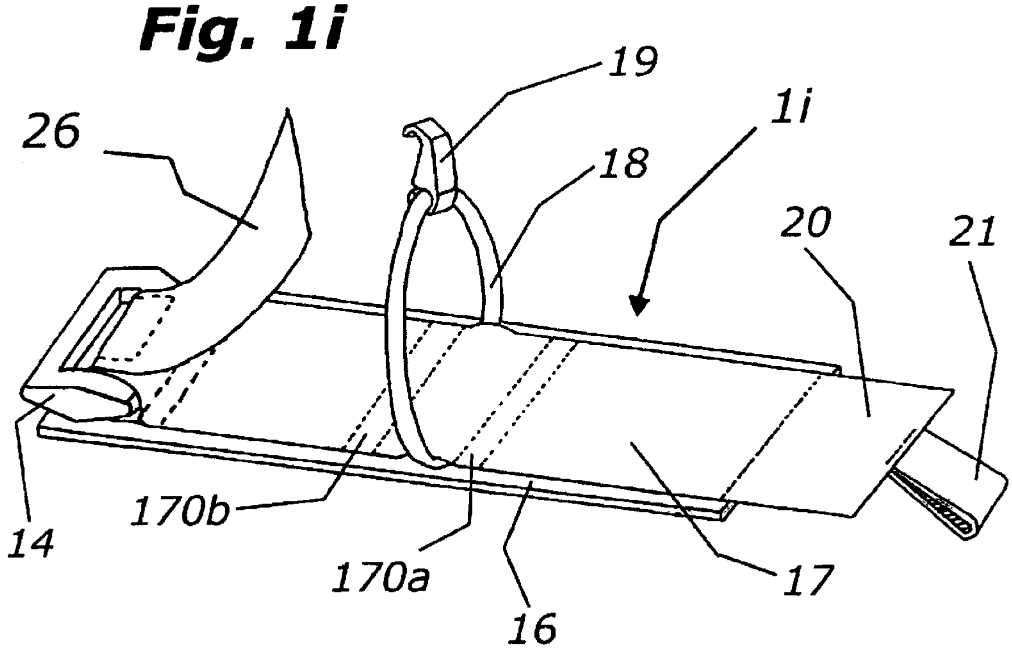

As illustrated in FIG. 1*h*, coupling plate 10 can be replaced with a static clip 34 that can be attached or clipped to a camera body or housing. Additionally, the spring loaded clip can be attached to a recessed groove and bar 30 (FIG. 8*d*) or an extended bar 29 (FIG. 8*c*) on a camera body or camera housing. Further, as illustrated in FIG. 1*i*, coupling plate 10 can be replaced with a tongue of hook material 26 that is sewn, welded, or otherwise attached to loop material 17 at or near pivot sleeve 15. The hook side of tongue of hook material 26 is facing down in FIG. 1*i* and can be pushed through an extended bar 29 or recessed groove and bar 30 on a camera body or camera housing and then mated with loop material 17 to secure a camera or a camera housing to harness 1*i* in a manner that allows the camera body or camera housing to be moved pivotably while attached to harness 1*i*. It is noted that the camera body is rigid or substantially rigid. The camera housing may be rigid, substantially rigid, flexible (e.g., leather, vinyl, neoprene, SPANDEX or the like) or substantially flexible.

In an alternative embodiment, tongue of hook material 26 can be replaced with a tongue of loop material. Alternatively, tongue of hook material 26 can have a button attached to it that mates with a mating button that is attached to either a camera body, a camera housing, or loop material 17. Alternatively, tongue of hook material 26 can have one side coated with an adhesive that attaches to a camera body or camera housing.

Additionally, harness le can have an additional tongue of loop material sewn or otherwise attached to loop material 17 in such a manner that allows it to be folded over tongue of hook material 26 after tongue of hook material 26 is mated with loop material 17, assuming that tongue of hook material 26 has hook material or VELCRO® lining both sides of tongue of hook material 26. This additional tongue of loop material, once folded over tongue of hook material 26, will further secure tongue of hook material 26 against loop material 17 and further secure the attached camera body or camera housing to harness 1*i*.

Additionally, tongue of hook material 26 can have loop material on the side or face that does not mate with loop material 17 so that hook material 20 can mate with tongue of hook material 26 when harness 1*i* is cinched around a user's arm or wrist. Additionally, harness 1*i* can have sewn or otherwise attached to it a length of hook and loop material that folds or doubles over tongue of hook material 26, further securing tongue of hook material 26 to loop material 17 when mated.

Figure 1J:
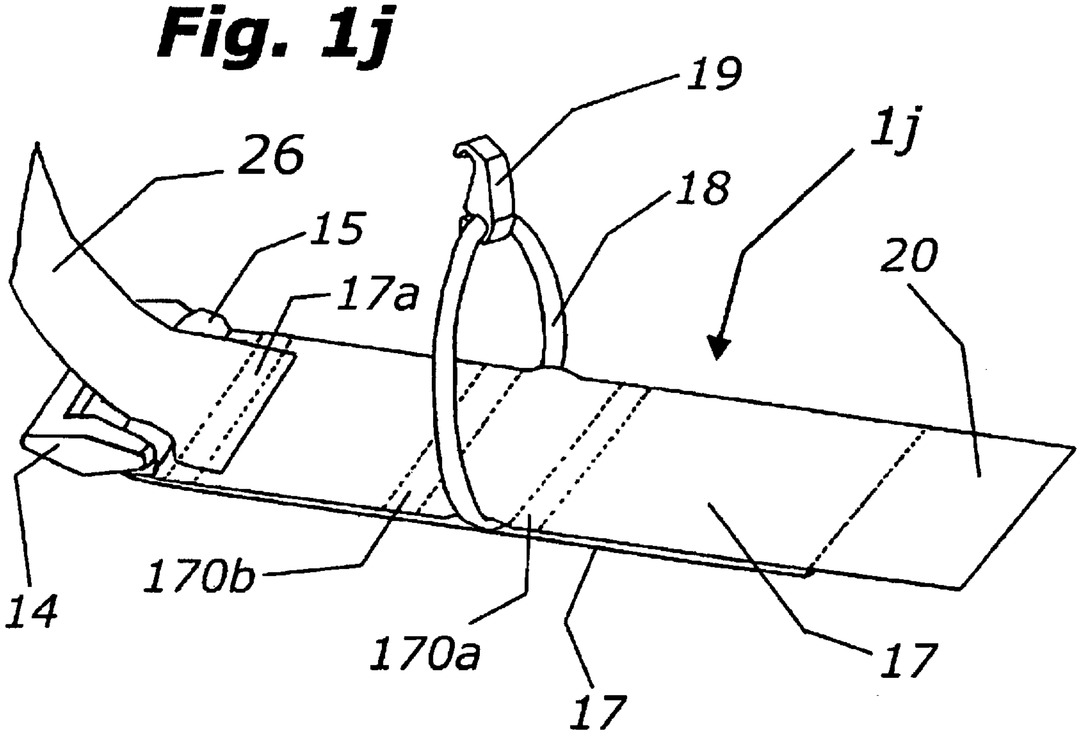

As illustrated in FIG. 1*j*, coupling plate 10 can be replaced with a tongue of hook material 26 that is sewn, welded, mated, or otherwise attached to loop material 17. The hook side of tongue of hook material 26 is facing down in FIG. 1*j* and can be pushed through an extended bar 29 or recessed groove and bar 30 on a camera body or camera housing and then pushed through square ring 14 and mated with loop material 17 on the underside of harness 1*j* to secure a camera or a camera housing to harness 1*j* in a manner that allows the camera body or camera housing to be moved pivotably while attached to harness 1*j*. Additionally, loop material 17 can be extended to attach, by any means suitable for attaching two lengths of fabric together, to the underside of harness 1*j* to serve as a mating surface for tongue of hook material 26 and likewise provide a comfortable surface for contacting the skin of a user. Patch 170 can be optionally omitted and hook ring 18 can be sandwiched between the two layers of loop material 17 and held in place by union 170*a* and union 170*b*. Additionally, comfort strip 16 and pull tab 21 can be optionally omitted in harness 1*j*. Additionally, loop material 17 can be double sided or double faced loop material.

Figure 1K:
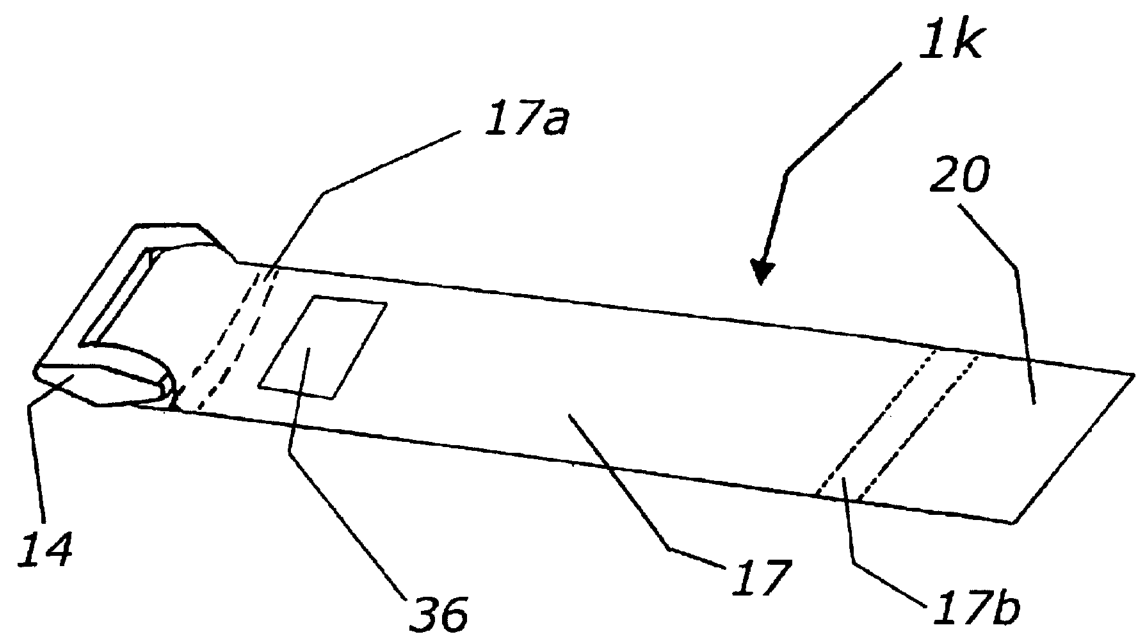
Figure 1L:
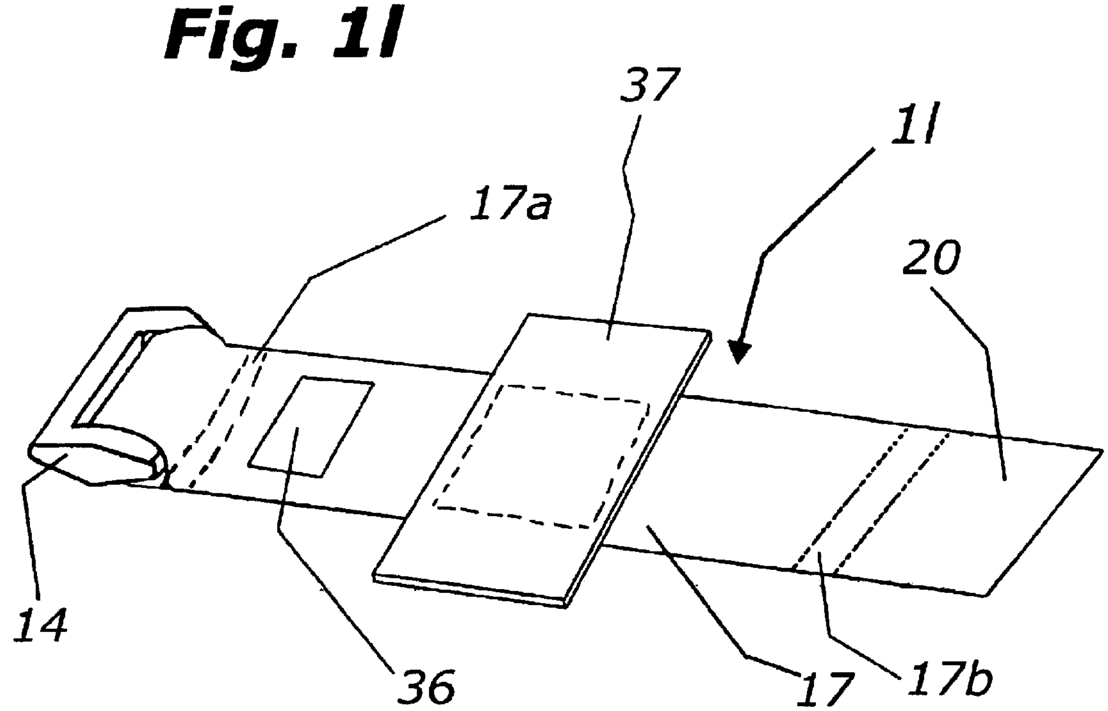
Figure 1M:
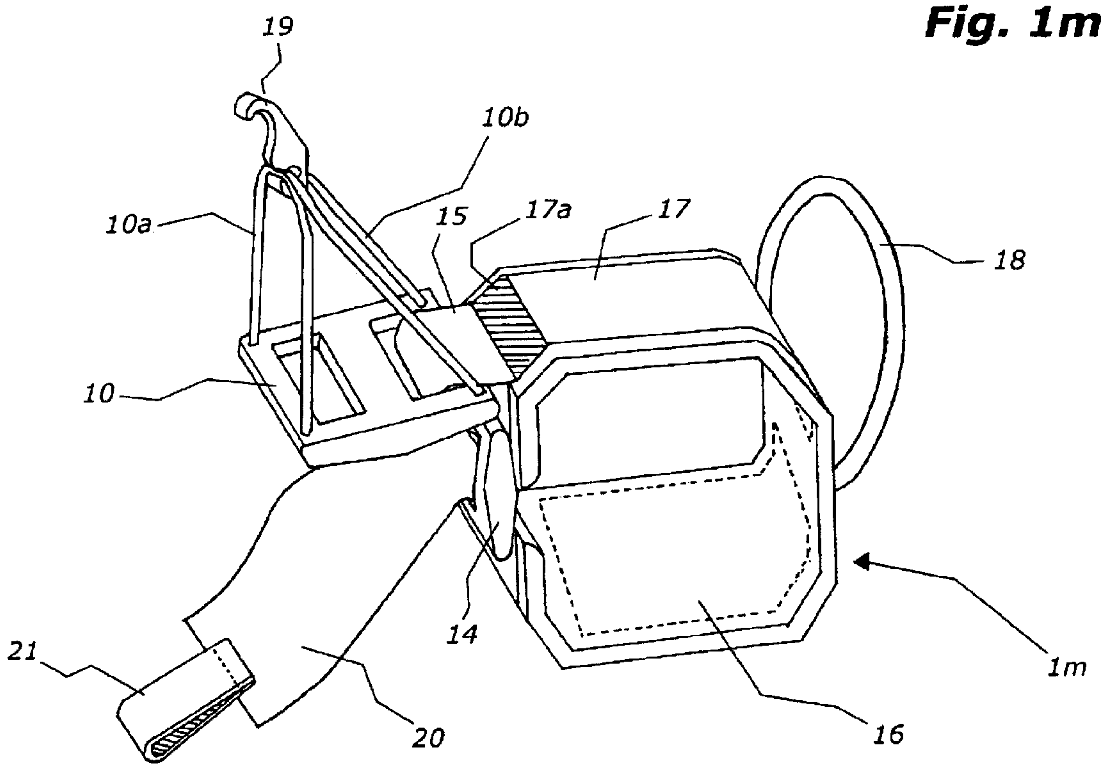

FIG. 1*k* illustrates an alternative strap or harness 1*k* that can be used with an improved camera body 28 or an improved camera housing 32 to attach a camera to a user in a fixed flat or fixed upright position. For example, harness 1*k* can be laced or pushed under extended bar 29 featured on the improved camera housing 32 illustrated in FIG. 9*g* and then cinched around the arm or wrist of a user, thus securing the improved camera housing 32 to the user in a fixed flat position. A view hole 36 can be variably positioned or cut out of harness 1*k* during manufacture or through user positioning so as to allow the user to look through harness 1*k* to see through the camera's viewfinder in the event that harness 1*k* would otherwise block the user's view of the viewfinder, as could be the case if harness 1*k* were attached to the improved camera housing 32 as illustrated in FIG. 9*i*. The view finder may also comprise a transparent material.

Note that in some embodiments, the housing may also include a view area through which a display, e.g., a 2" LCD screen can be viewed. This view area may be exposed or covered with a transparent material. In addition, this area may also include an exposed or covered (e.g., pliable transparent material) to manipulate the buttons associated with camera functionality, e.g., cycle through captured images viewable on the display. It is also noted that the camera housing can be rigid (or substantially rigid) (e.g., plastic, metal, fiberglass, etc.) or pliable (or substantially, pliable) (e.g., leather, vinyl, neoprene, etc.). Also, the camera housing can be integrated with or separate from the camera (or other device) itself. Moreover, the camera housing may be appropriately configured for use in various elements (e.g., waterproof or atmospheric).

Figure 9A:
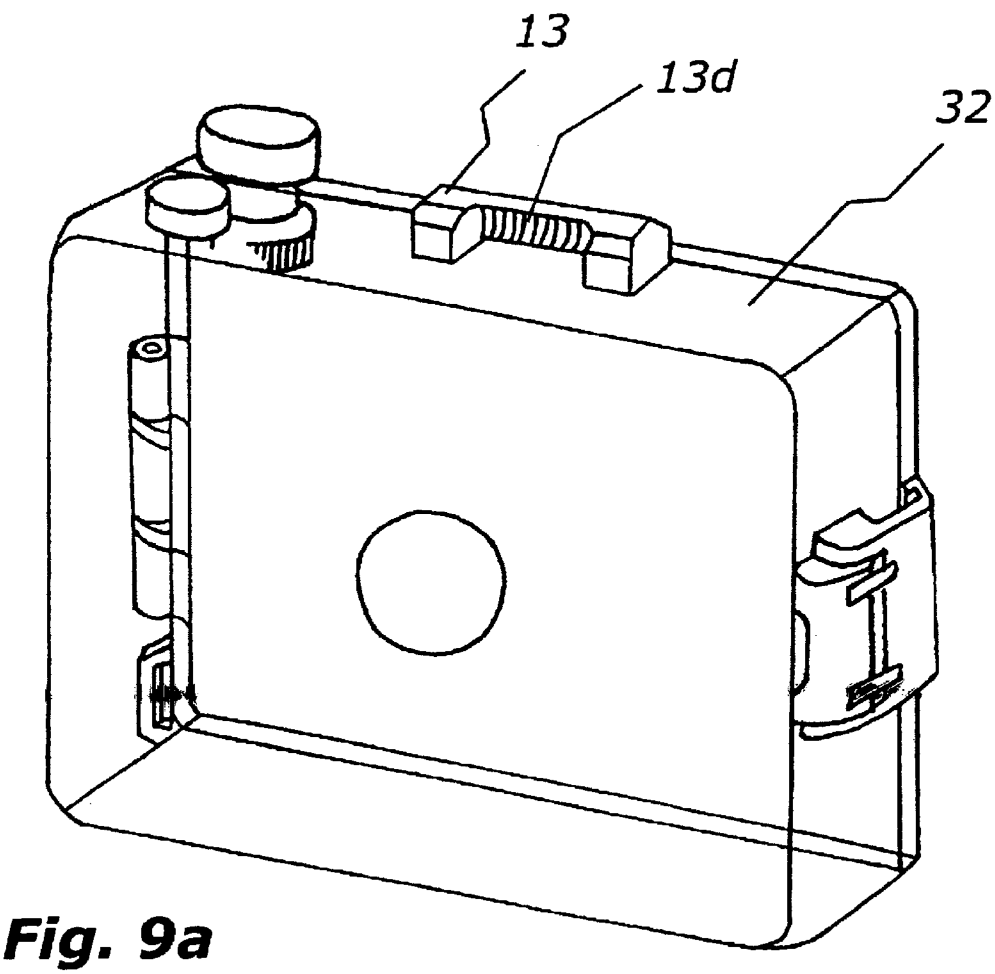
Figure 9B:
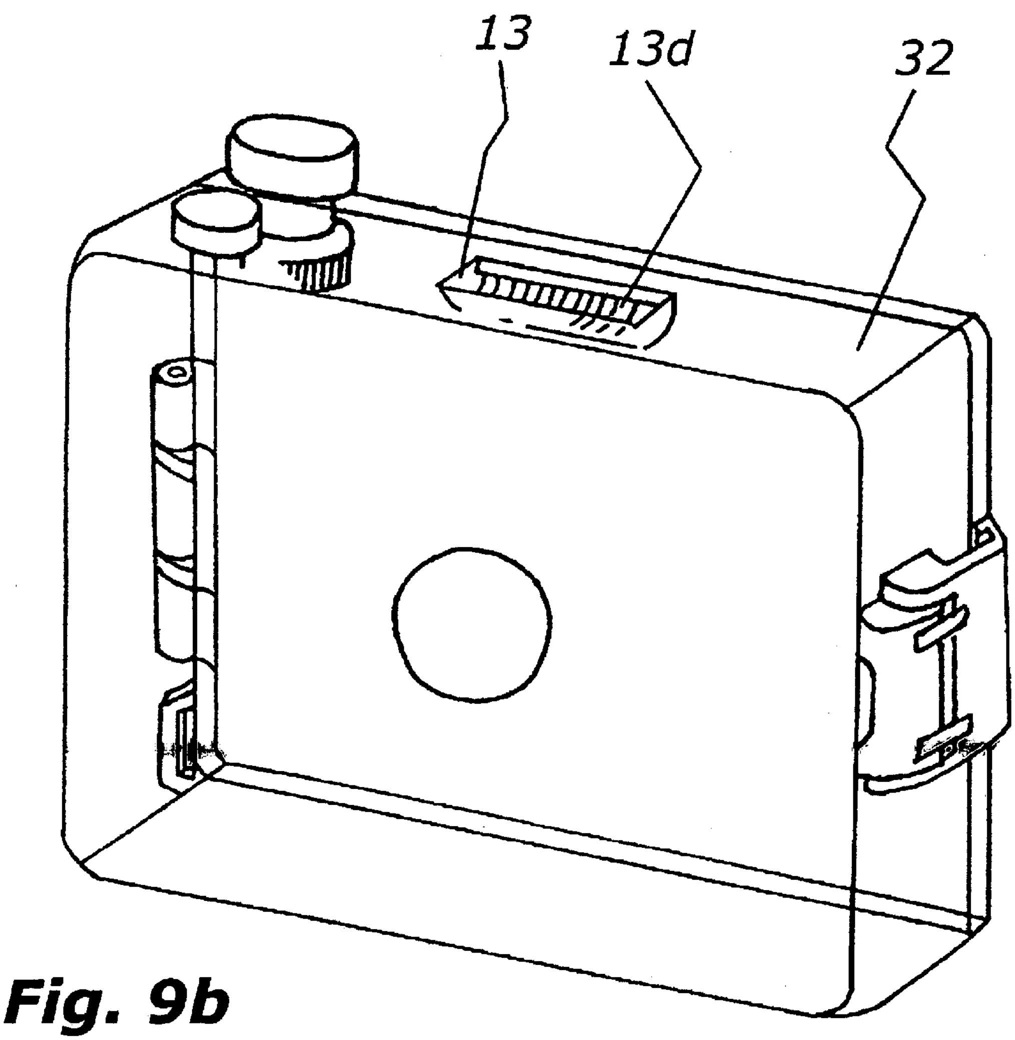
Figure 9C:
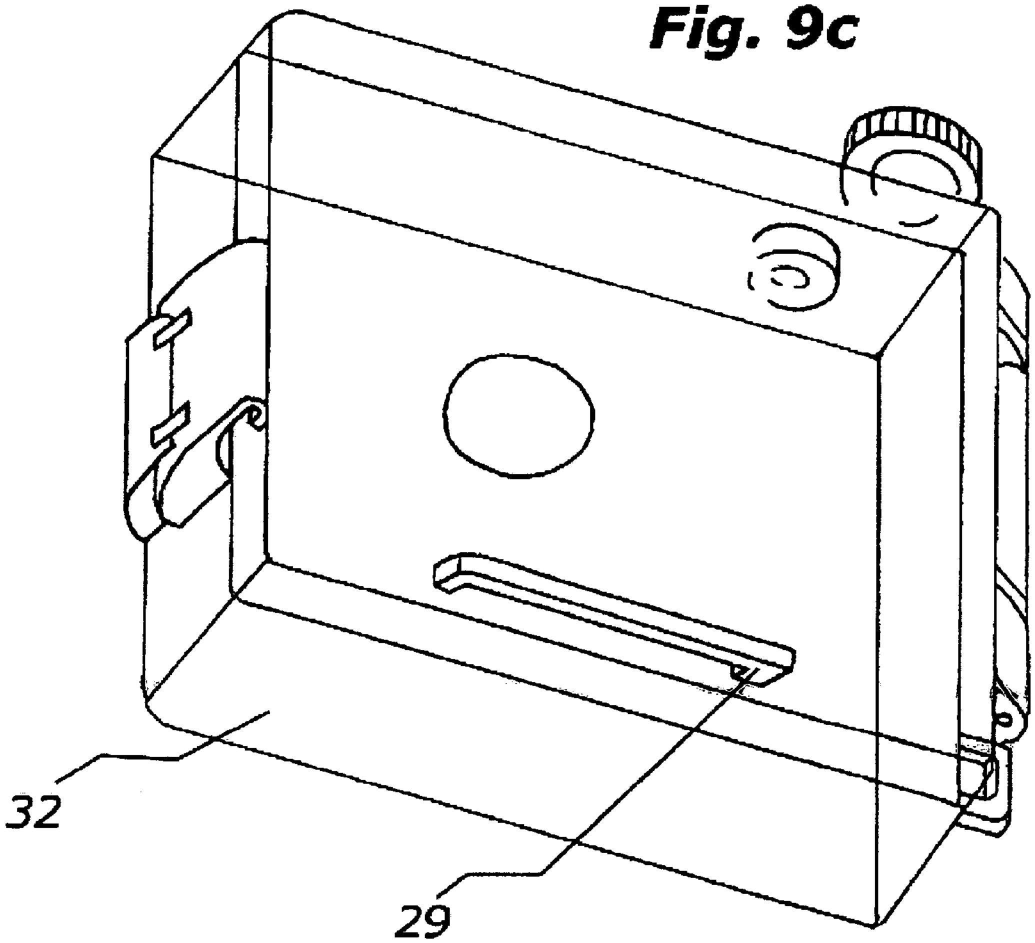
Figure 9D:
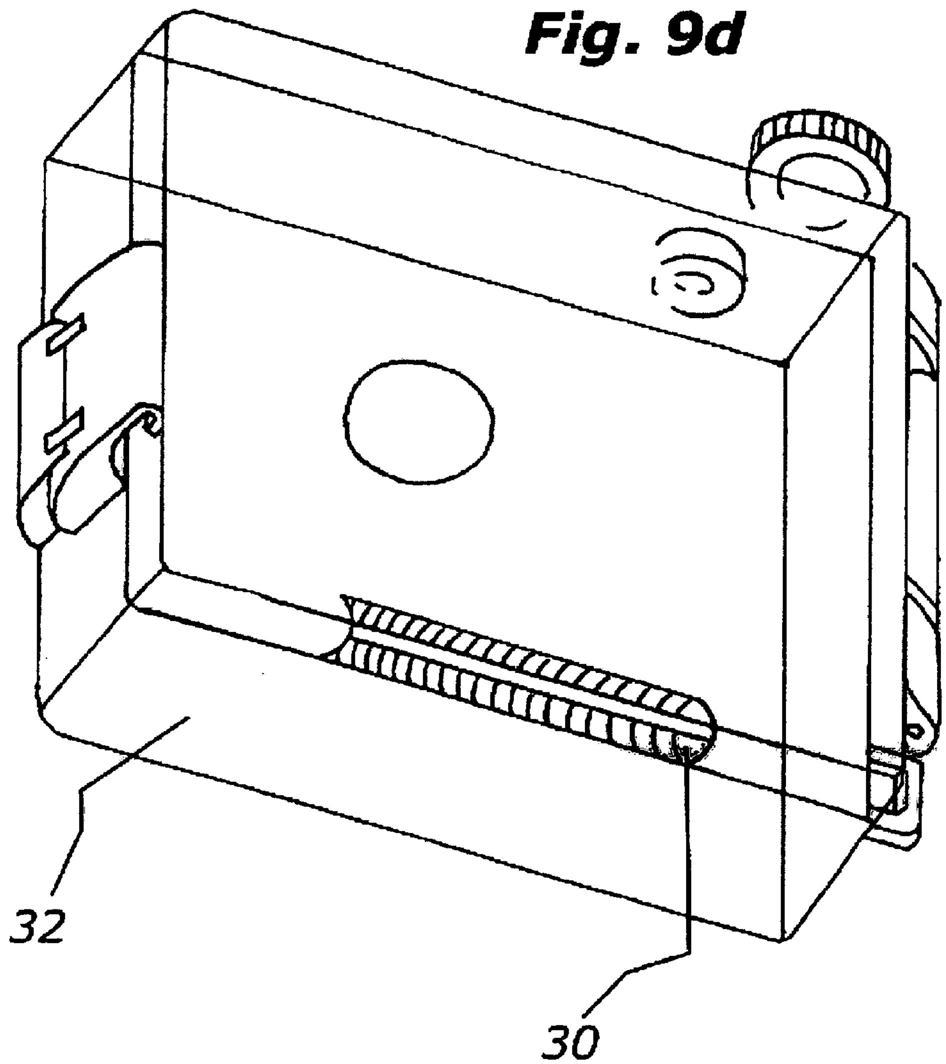
Figure 9E:
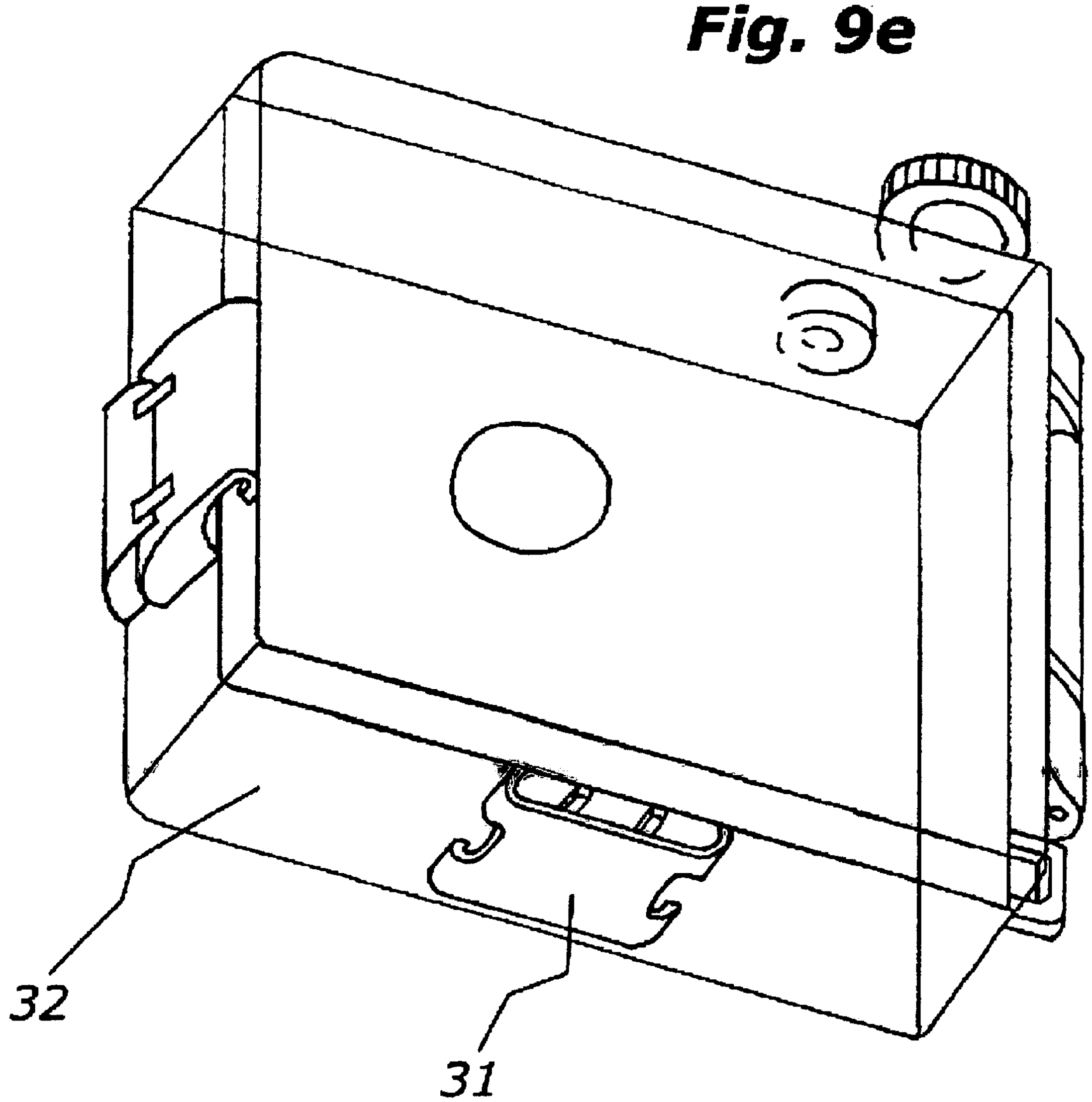
Figure 9F:
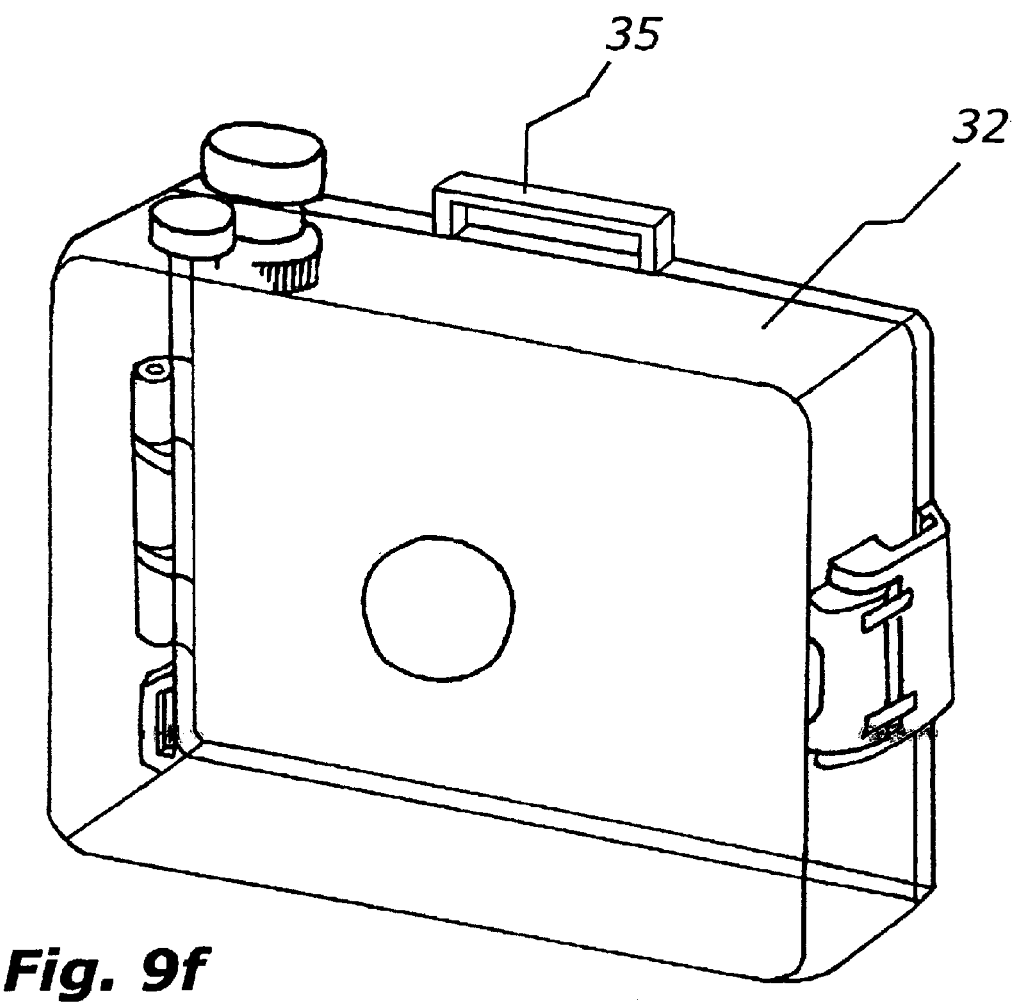
Figure 9G:
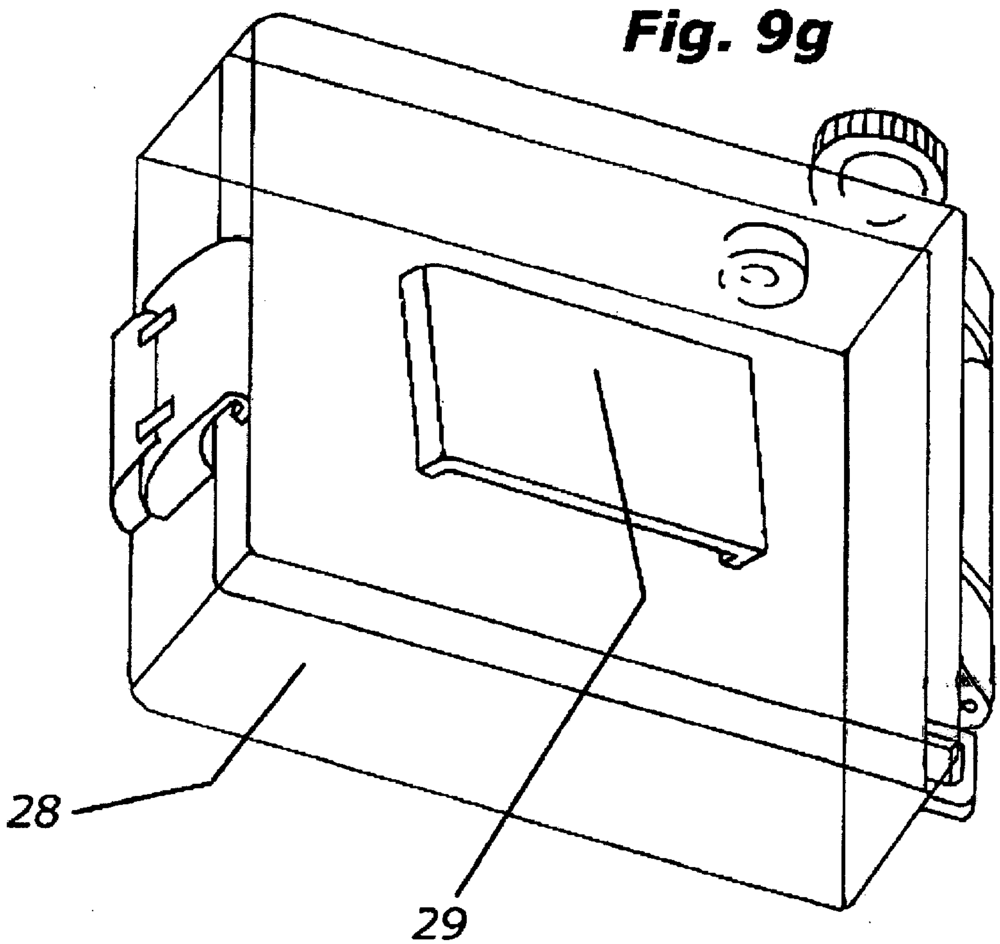
Figure 9H:
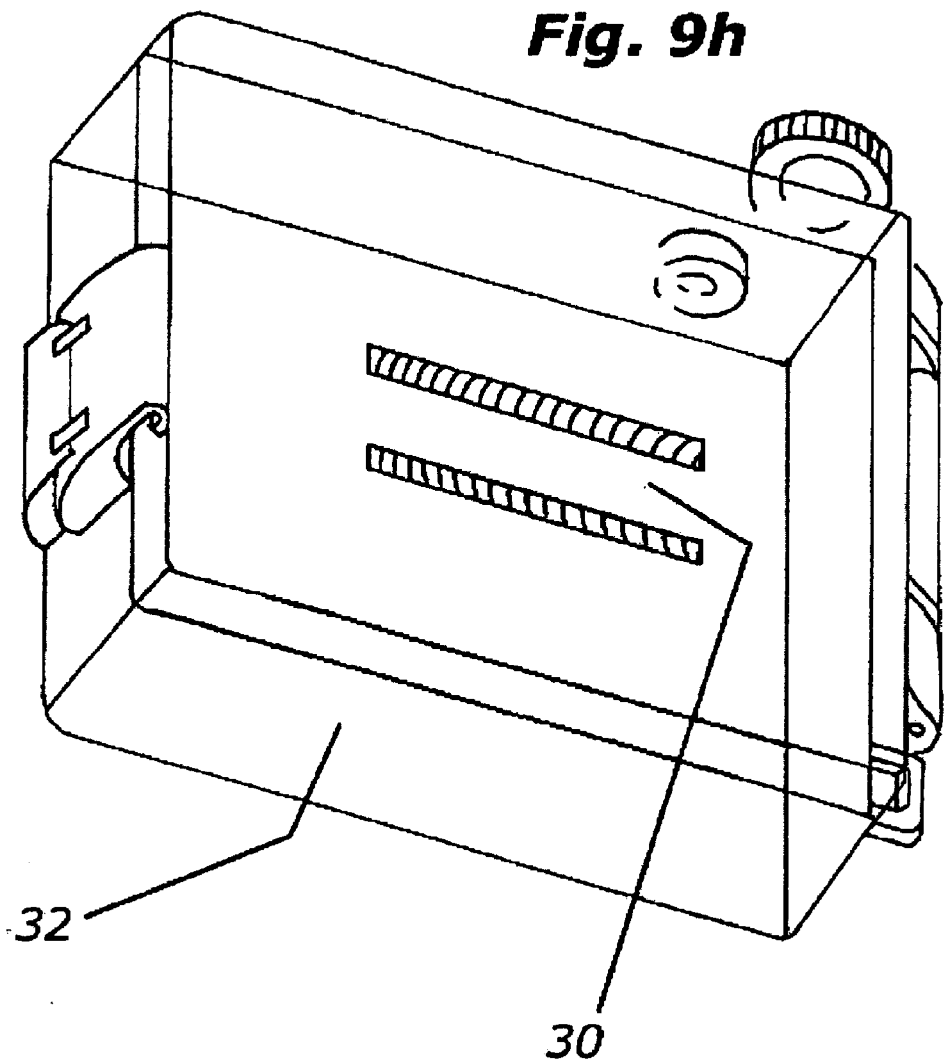
Figure 9I:
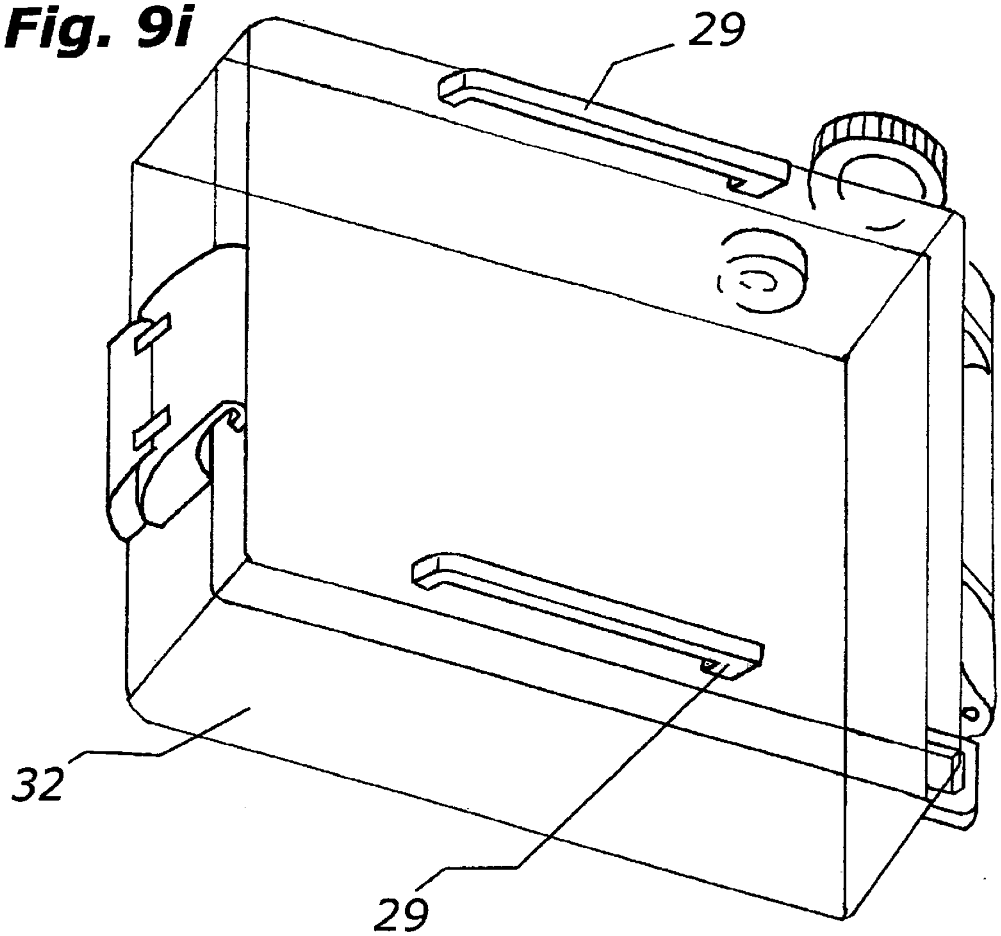
Figure 9J:
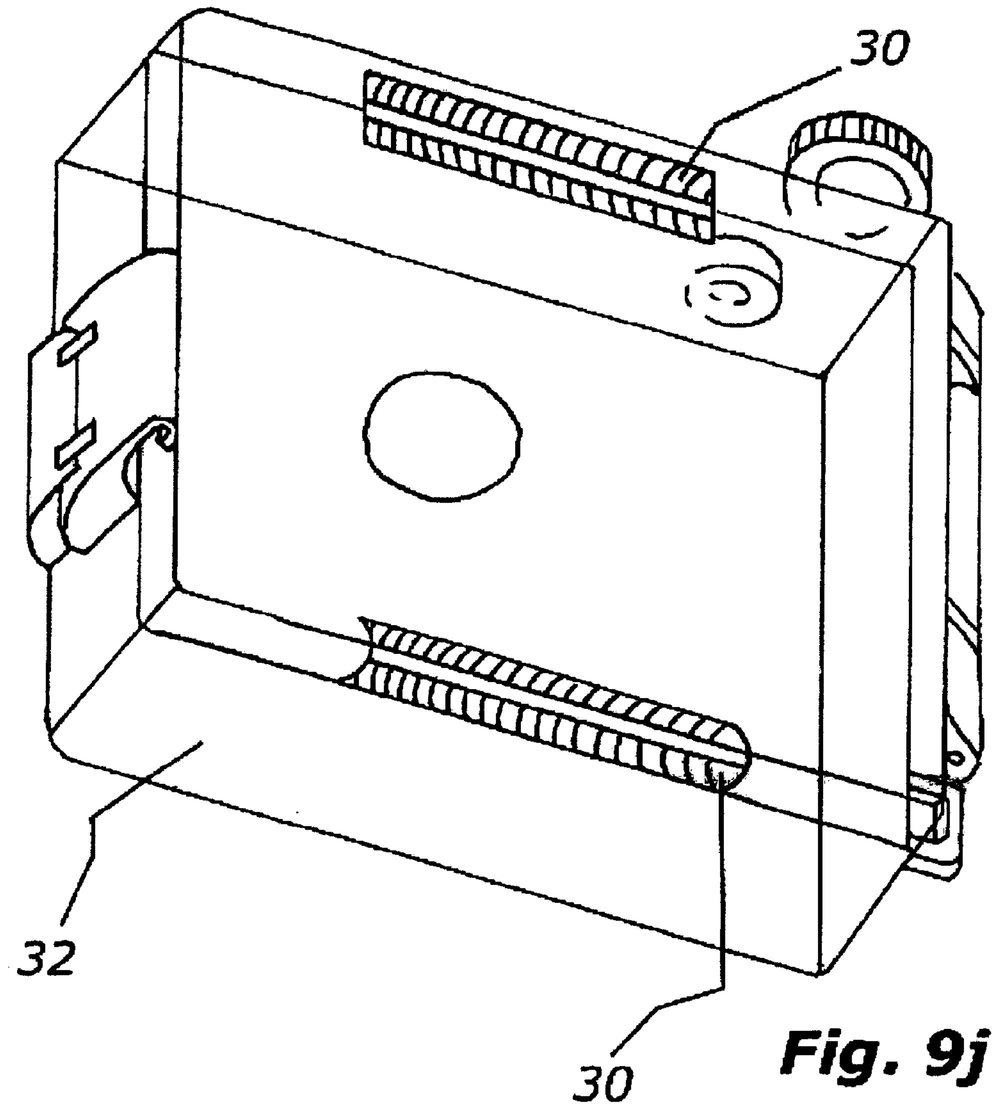
Figure 9K:
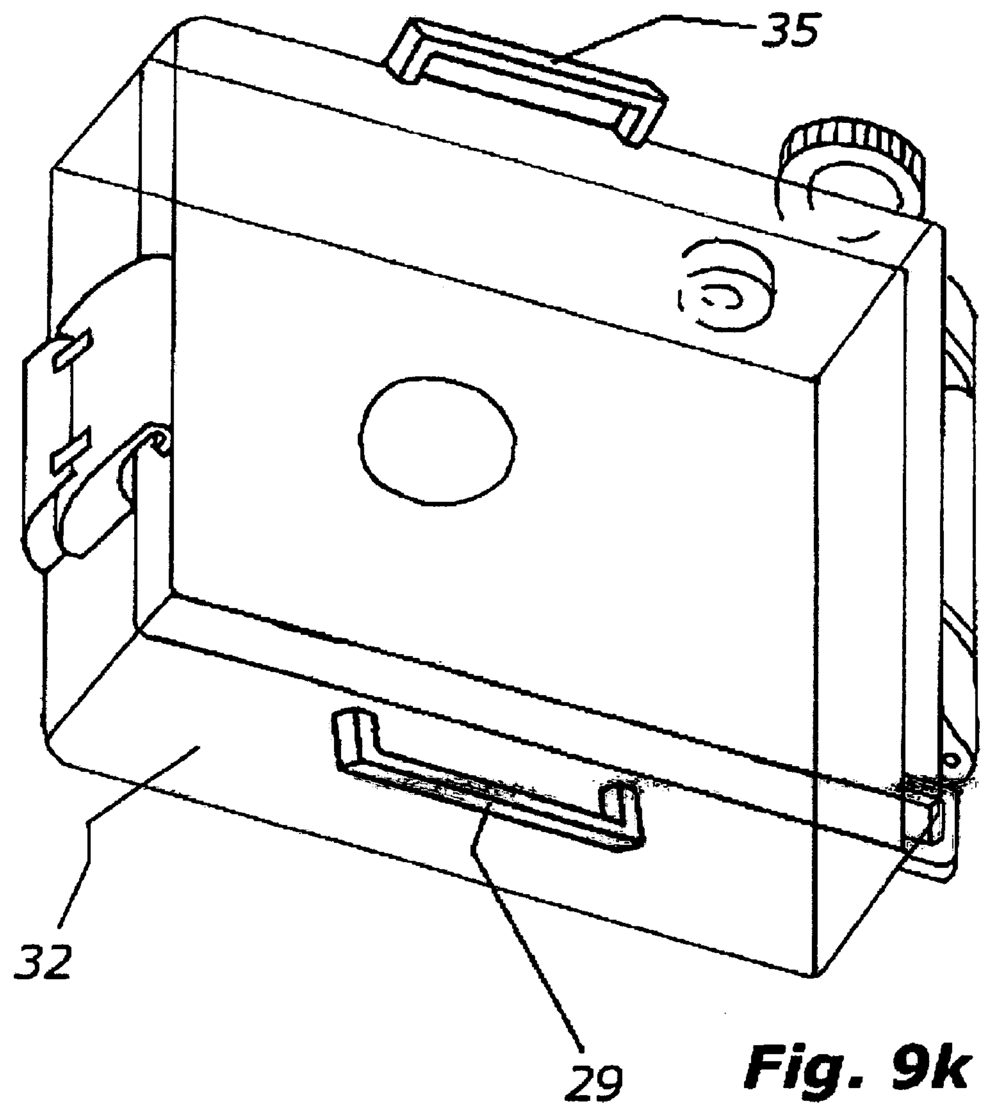
Figure 9I:
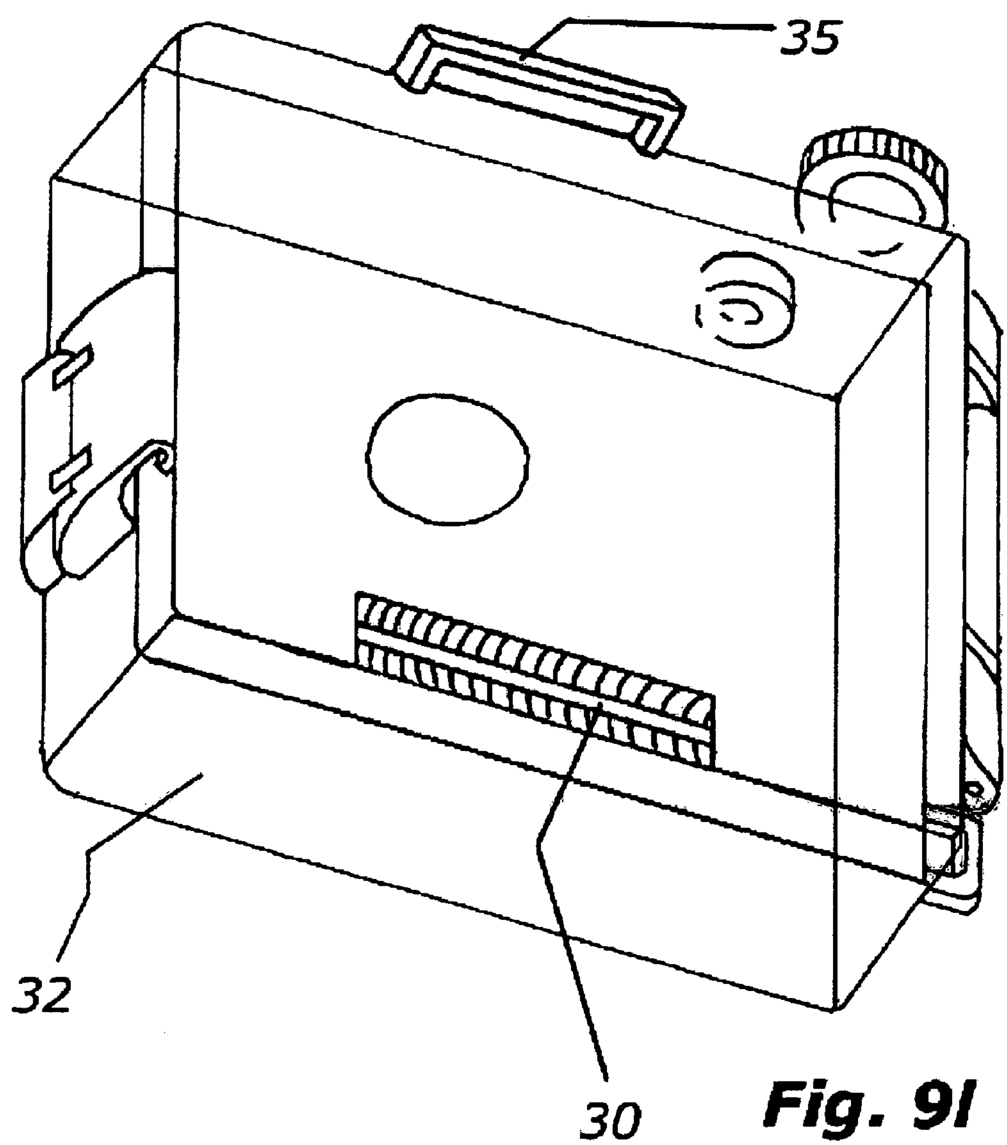

Alternatively, harness 1*k* can be laced or pushed through an extended bar 29 located on the bottom of improved camera body 28 or improved camera housing 32, as illustrated in FIG. 9*k* and then cinched around the arm or wrist of a user thereby attaching the camera to the user in a fixed upright position. Alternatively, harness 1*k* can be laced or pushed through any combination of extended bar 29, extended bar 35, and or recessed groove and bar 30 on improved camera body 28 or improved camera housing 32 to secure improved camera body 28 or improved camera housing 32 to a user in either a fixed flat or fixed upright position on the arm or wrist of a user. Harness 1*k* can alternatively be configured from various materials including but not limited to e.g., nylon, plastic, metal, foam, polypropylene, webbing, rubber, neoprene, single or double sided tape, laminated adhesive, and/or VELCRO®. Additionally, view hole 36 can be alternatively omitted from harness **1*k***.

FIG. 11 illustrates an alternative harness **1*l* that incorporates an attachment pad 37 that can be sewn, glued, taped, stapled, stamped, or otherwise attached or made part of harness 1*l*. Attachment pad 37 can be made of a variety of different materials, including but not limited to neoprene, plastic, metal, rubber, webbing, nylon, double sided tape, foam, VELCRO®, etc. One side of attachment pad 37 can have an adhesive layer or laminate applied to it allowing a user or manufacturer to adhere attachment pad 37 and thus harness 1*l* to a side of a camera or camera housing in order to then attach harness 1*l* and a camera or camera housing to themselves in a fixed flat or fixed upright position. Harness 1*l* can include view window 37 that can be variably positioned by user or at time of manufacture or view window 37 can be omitted from harness 1*l***.

FIG. **1*m* illustrates an alternative embodiment harness 1*m* of the invention whereby hook piece 19 replaces catch piece 13 and is attached to coupling band 10*a* and coupling band 10*b* by stretching and pulling coupling band 10*a* and coupling band 10*b* firmly into anchor groove 19*a*. This allows hook ring 18 to be pulled onto hook piece 19 and rest in hook end 19*b*, securing a camera in a first secure flat carry position when a camera is attached to harness 1*m* and harness 1*m* is attached to a user. This embodiment advantageously allows the user to pull or push the camera into a second secured upright position for the purpose of taking a photograph, stretching hook ring 18** in the process.

To return the camera to the first secure flat carry position the user releases pressure on the camera and the tension of hook ring 18 will pull the camera back down into the first secure flat position. Hook piece 19 can be removed from hook ring 18 in any of the embodiments of the invention to allow for hook ring 18 to attach to hook piece 18 or hook piece 38 (FIG. **8*n*) in this alternative fashion to accomplish this embodiment of the invention. Additionally, hook piece 19 can be fabricated, molded, or otherwise created as one piece combined with coupling band 10*a* and coupling band 10*b* and or with any of their embodiments. Additionally, hook piece 19 can be fabricated, molded, or otherwise created in separate pieces or halves that are sandwiched around coupling band 10*a* and coupling 10*b*** or their embodiments when assembled.

FIG. **8*n* illustrates an embodiment of camera body 28 that has a hook piece 38, serving the same purpose as hook piece 19 on harness 1*m*, integrated onto the top of camera body 28. Alternatively, hook piece 38 can be molded, made, fastened, glued, taped, or otherwise attached to the top, back, front, bottom, or side, including corner edges, of camera body 28. Hook piece 38** can be made of plastic, metal, rubber, or any other material suitable for attaching to a camera or camera housing.

FIG. **9*n* illustrates an embodiment of camera body that has a hook piece 38, serving the same purpose as hook piece 19 on harness 1*m*, integrated onto the top of camera housing 32. Alternatively, hook piece 38 can be molded, made, fastened, glued, taped, or otherwise attached to the top, back, front, bottom, or side, including corner edges, of camera housing 32. As an alternative, hook ring 18 can attach to camera body 28 or camera housing 32 in any manner suitable for firmly attaching hook ring 18 or any of its alternative embodiments to camera body 28 or camera housing 32 in order to hold a camera in a first secured flat position and then allowing for hook ring 18** or any of its embodiments to be stretched as the user raises a camera into a second secure upright position when being worn by a user using a harness of the invention.

As illustrated in FIG. **8*a*, the invention can include camera body 28 that has catch piece 13 integrated on top of camera body 28. Alternatively, catch piece 13 can be integrated onto the back of camera body 28. Additionally, catch piece 13 can be integrated onto a corner edge of camera body 28. Additionally, catch piece 13 can have an adhesive coated side that attaches it to camera body 28. Additionally, camera body 28 can have an adhesive area that allows catch piece 13 to be attached to it. Additionally, camera body 28 can have hook or loop material, or VELCRO® attached to or embedded into camera body 28 on any side of camera body 28. Additionally, camera body 28 can have hook or loop material, or VELCRO® attached to or embedded into camera body 28 on any side of camera body 28, replacing catch piece 13 or included with catch piece 13**.

As illustrated in FIG. **8*b*, the invention can include camera body 28 that has catch piece 13 integrated into or within the top of camera body 28. Alternatively, catch piece 13 can be integrated into or within the back of camera body 28. Alternatively, catch piece 13 can be integrated into or within a corner edge of camera body 28**.

As illustrated in FIG. **8*c*, the invention can include camera body 28 that has an extended bar 29 integrated onto the back of camera body 28. Alternatively, extended bar 29 can be integrated onto the bottom, top or corner edge of camera body 28. As illustrated in FIG. 8*g*, extended bar 29 can be of any width or height and can be integrated into or onto camera body 28 in any location on the back, front, top, or bottom of camera body 28, again including corner edges. Alternatively to extended bar 29 being manufactured as an integrated element of camera body 28, extended bar 29 can be manufactured as a separate piece and can be glued, taped, welded, fastened, clipped, screwed, riveted, attached with hook and loop material, or otherwise attached to camera body 28. As illustrated in FIG. 8*i*, a plurality of extended bar 29 can be integrated onto or into camera body 28 and again can be integrated in any location on the back, front, top, or bottom of camera body 28**, including corner edges.

Extended bar 29 can serve alternate functions in the invention, for example, functioning as a mating piece for hook 19, thus acting as substitute for catch piece 13 or extended bar 35, when positioned on or near the top or top back area of camera body 28, or alternately serving as an attachment point for a harness strap of the invention when positioned in the same location or anywhere else on the top, back, bottom or corner edge of camera body 28. In this way extended bar 29 can serve multiple functions in the same embodiment, allowing a single embodiment of the invention to be used in a variety of configurations depending on user or manufacturer preference. For example, by serving as weave-through attachment points for harness **1*k* to be woven through, both extended bars 29 in FIG. 8*i* function in a manner that attaches camera body 28** to a user in a fixed flat position.

Alternatively, by substituting harness **1*j* as the harness strap of choice and attaching it via tongue of hook material 26 to the lower extended bar 29 in FIG. 8*i*, the upper extended bar 29 can now function as a mating point for hook 19 of harness 1*j*, allowing the camera to be moved pivotably from either a secured flat position whereby hook 19 is mated with upper extended bar 29**, or released and pivoted into a second secure upright position for taking a photo. In sum, it should be noted that that the present invention beneficially allows for a camera body or housing to accept any variety of strap that allows the camera to attach to a user, e.g., an appendage of the user, in either a fixed or pivoting manner as disclosed herein.

Figure 8M:
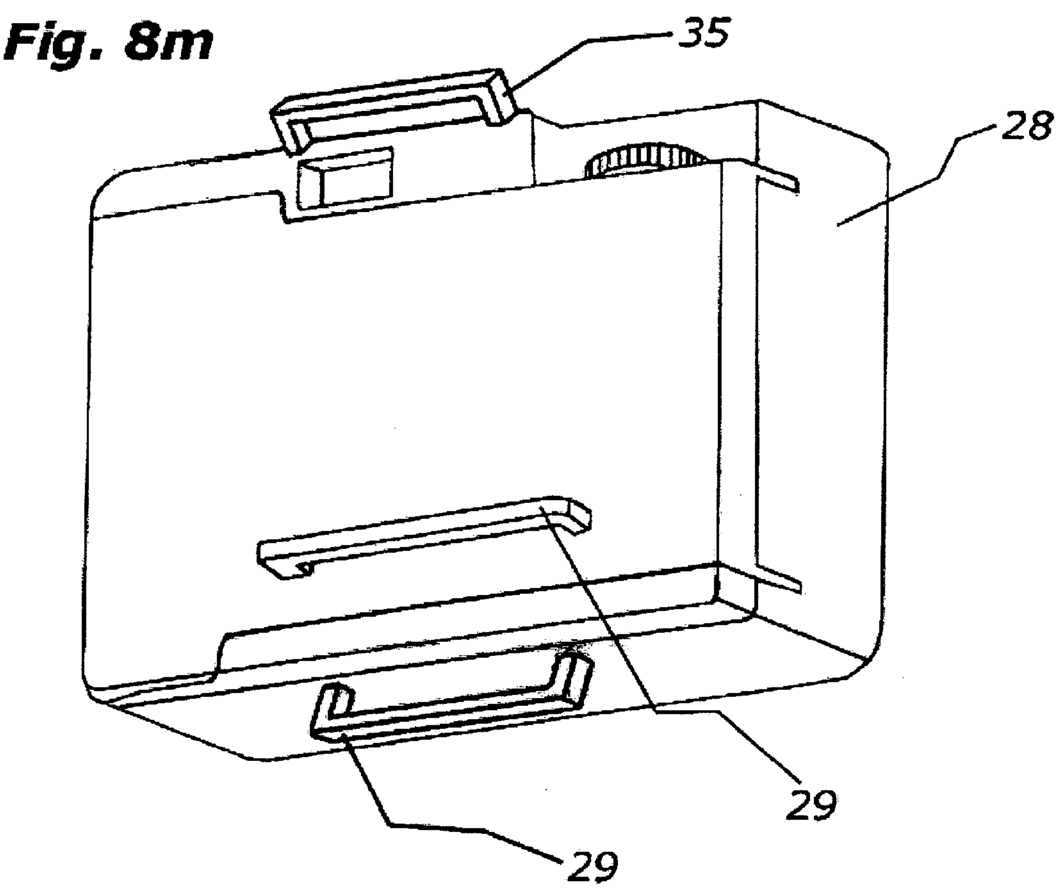
Figure 8N:
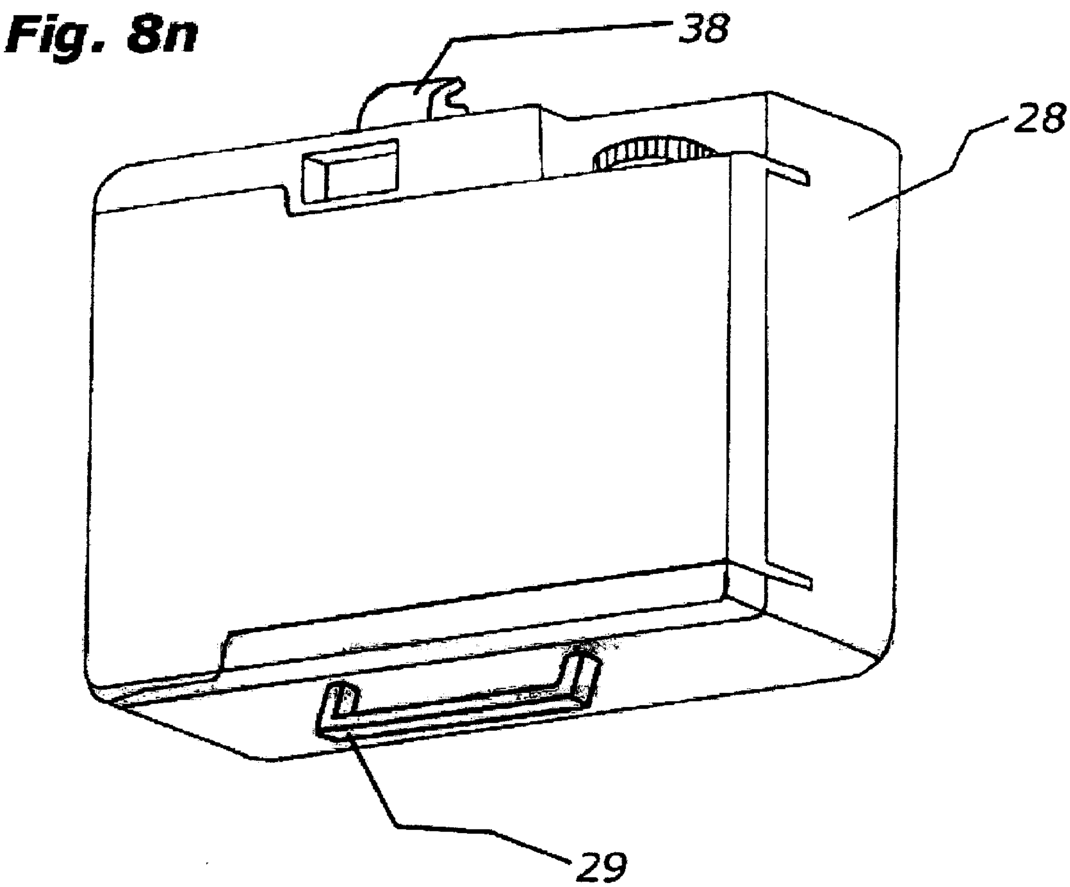

Additionally, variable placement of extended bar 29 in conjunction with straps such as harness 1*k* allow for camera body 28 to be attached to a user in a fixed-angle or semi-upright position. For example, FIG. 8*m* illustrates camera body 28 with extended bars 29 positioned on the back and bottom sides of camera body 28. By weaving harness 1*k* through both the back and bottom extended bars 29 and cinching harness 1*k* around the wrist or arm of a user, camera body 28 can be attached to the user in a fixed-angle or semi-upright position. Alternatively, harness 1*k* can be woven through both the back and bottom extended bars 29 and also extended bar 35 positioned on the top back corner of camera body 28 (FIG. 8*m*) in order to attach camera body 28 to a user in a fixed flat manner. Alternatively, harness 1*j* can be attached via tongue of hook material 26 to the bottom extended bar 29 and hook 19 of harness 1*j* can mate with extended bar 35, thereby allowing camera body 28 (FIG. 8*m*) be attached to a user in a manner that allows camera body 28 to be secured flat in a first secure position and then released and pivoted upright into a second secured position.

The aforementioned and following examples of variable configurations of the invention are but examples of the potential variations and in no way should the invention be limited to the aforementioned or following examples of variable configurations of the invention.

As illustrated in FIG. 8*d*, the invention can include camera body 28 that has a recessed groove and bar 30 on the back of camera body 28. Alternatively, recessed groove and bar 30 can be positioned on the bottom and or top of camera body 28 or into or within a corner edge of camera body 28. FIG. 8*h* illustrates that recessed groove and bar 30 can be of any width or depth, and the bar portion of recessed groove and bar 30 can be either flush with or recessed below the outer surface of camera body 28. Additionally, FIG. 8*h* illustrates that recessed groove and bar 30 can be located anywhere on the top, back, or bottom of camera body 28, including corner edges of camera body 28. FIG. 8*j* illustrates a plurality of recessed groove and bar 30 integrated into camera body 28.

Recessed groove and bar 30, extended bar 29, and extended bar 35 can be used in any combination with or in any substitution of one another. FIG. 8*k* and FIG. 8*l* illustrate examples of this. Additionally, recessed groove and bar 30, extended bar 29, and extended bar 35 can be used interchangeably to achieve similar functionality. For example, FIG. 8*l* shows extended bar 29 positioned on the top back corner of camera body 28 whereby it can substitute for extended bar 35 as a mating bar for hook 19 of harness 1*j*, or it can serve as an weave-through attachment point for a substitute harness 1*k* to be woven through in order to attach camera body 28 to a user in a fixed flat position when harness 1*k* is also woven through recessed groove and bar 30 in this example. Additionally, recessed groove and bar 30 can alternately be used as a mating bar for hook 19 and extended bar 35 can be alternately used as an attachment point for alternative strap embodiments of the invention.

As illustrated in FIG. 8*e*, the invention can include a camera body 28 that has a female clip 31 integrated on the bottom of camera body 28. Alternatively, female clip 31 can be integrated onto the back of camera body 28. Alternatively, female clip 31 can be substituted with male clip 27. Any type of male or female clip, connector or union can be used as a substitute for female clip 31 and male clip 27 and the illustration in FIG. 8*e* is intended only for reference. Alternatively, male clip 27 and female clip 31 can be substituted with joining parts similar to those used to attach a wristwatch band to a watch piece.

As illustrated in FIG. 8*f*, the present invention can include camera body 28 that has an extended bar 35 integrated on top of camera body 28 to mate with hook piece 19. Alternatively, extended bar 35 can be integrated onto the back of camera body 28. Additionally, extended bar 35 can be integrated onto a corner edge of camera body 28. Further, extended bar 35 and extended bar 29 can be partially or entirely of any shape, including but not limited to curved, rounded, indented, semi-circular, circular, semi-oval, oval, semi-elliptical, elliptical, semi-square, square, semi-rectangular, rectangular, semi-triangular, triangular, or angular shape. Also, extended bar 35 and extended bar 29 can be of any width or height and can be variably positioned on the top, back or corner of camera body 28. Alternatively, extended bar 35 can function as an attachment point for a strap portion of the-invention, similar in function to either recessed groove and bar 30 and or extended bar 29. Again, extended bar 35, recessed groove and bar 30, and extended bar 29 can be used interchangeably in the invention.

As illustrated in FIG. 9*a,* the invention can include camera housing 32 that has catch piece 13 integrated on top of camera housing 32. Alternatively, catch piece 13 can be integrated onto the back of camera housing 32. Additionally, catch piece 13 can be integrated onto a corner edge of camera housing 32. Additionally, catch piece 13 can have an adhesive coated side that attaches it to camera housing 32. Additionally, camera housing 32 can have an adhesive area that allows catch piece 13 to be attached to it. Additionally, camera housing 32 can have hook or loop material, or VELCRO® attached to or embedded into camera housing 32 on any side of camera housing 32. Additionally, camera housing 32 can have hook or ioop material, or VELCRO® attached to or embedded into camera housing 32 on any side of camera housing 32, replacing catch piece 13 or included with catch piece 13.

As illustrated in FIG. 9*b*, the invention can include camera housing 32 that has catch piece 13 integrated into or within the top of camera housing 32. Alternatively, catch piece 13 can be integrated into or with the back of camera housing 32. Alternatively, catch piece 13 can be integrated into or within a corner edge of camera housing 32.

As illustrated in FIG. 9*c*, the invention can include camera housing 32 that has an extended bar 29 integrated onto the back of camera housing 32. Alternatively, extended bar 29 can be integrated onto the bottom, top or comer edge of camera housing 32. As illustrated in FIG. 9*g*, extended bar 29 can be of any width, height or thickness and can be integrated into or onto camera housing 32 in any location on the back, front, top, or bottom of camera housing 32, again including corner edges.

As an alternative to extended bar 29 being manufactured as an integrated element of camera housing 32, extended bar 29 can be manufactured as a separate piece and can be glued, taped, welded, fastened, clipped, screwed, riveted, attached with hook and loop material, or otherwise attached to camera housing 32. As illustrated in FIG. 9*i*, a plurality of extended bar 29 can be integrated onto or into camera housing 32 and again can be integrated in any location on the back, front, top, or bottom of camera housing 32, including corner edges.

Extended bar 29 can serve alternate functions in the invention, for example, functioning as a mating piece for hook 19, thus acting as substitute for catch piece 13 or extended bar 35, when positioned on or near the top or top back area of camera housing 32, or alternately serving as an attachment point for a strap portion of the invention when positioned in the same location or anywhere else on the top, back, bottom or corner edge of camera housing 32. In this way extended bar 29 can serve multiple functions in the same embodiment, allowing a single embodiment of the invention to be used in a variety of configurations depending on user or manufacturer preference. For example, by serving as weave-through attachment points for harness 1*k* to be woven through, both extended bars 29 in FIG. 9*i* function in a manner that attaches camera housing 32 to a user in a fixed flat position.

Alternatively, by substituting harness 1*j* as the harness strap of choice and attaching it to the lower extended bar 29 in FIG. 9*i*, the upper extended bar 29 can now function as a mating point for hook 19 of harness 1*j*, allowing the camera to be moved pivotably from either a secured flat position with hook 19 mated with upper extended bar 29 or released and pivoted into a second secure upright position for taking a photo. Again, it is noted that the present invention is also applicable to other viewing configurations, for example, video or long-distance viewers (monocular or binoculars).

Figure 9M:
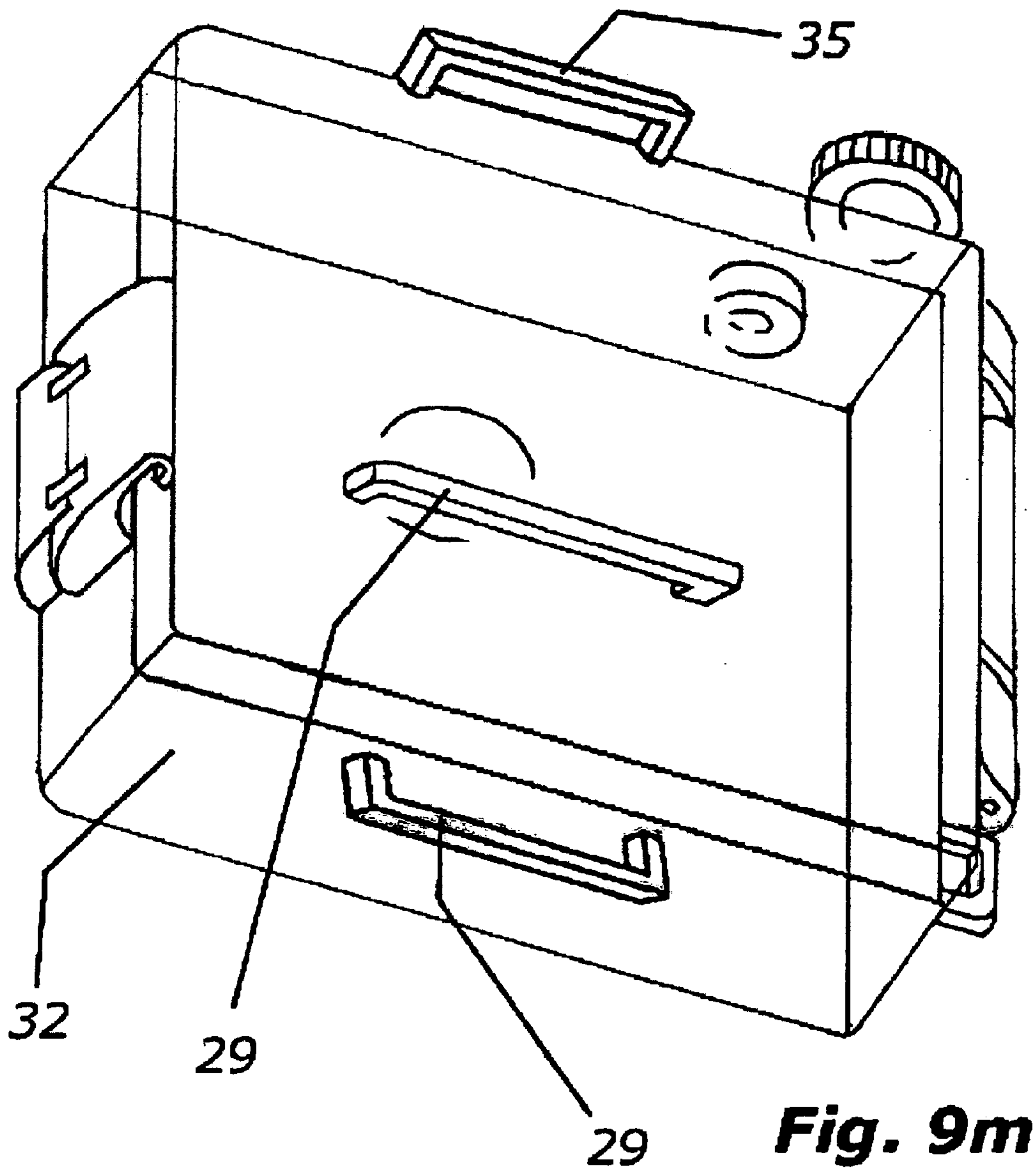
Figure 9N:
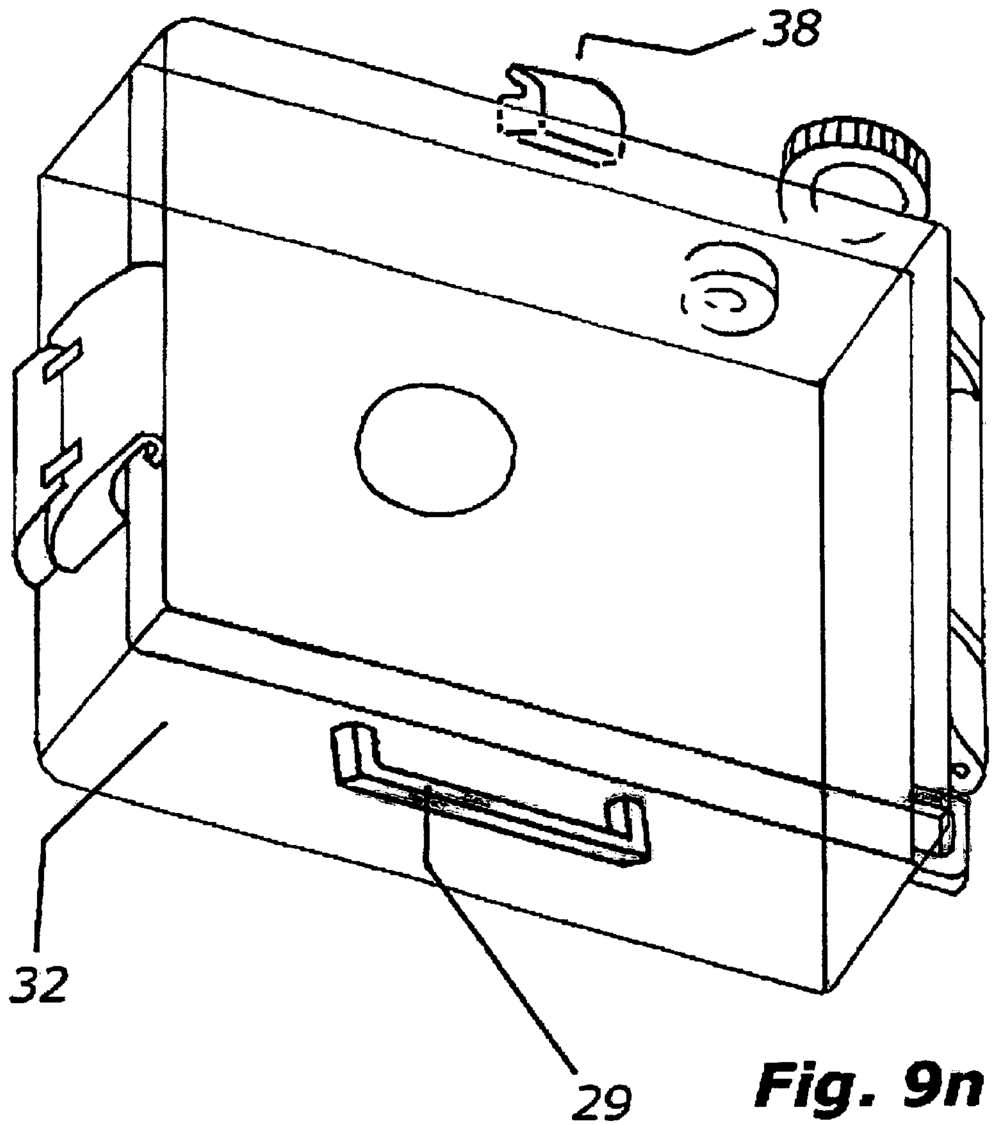

Additionally, variable placement of extended bar 29 in conjunction with straps such as harness 1*k* allow for camera housing 32 to be attached to a user in a fixed-angle or semi-upright position. For example, FIG. 9*m* illustrates camera housing 32 with extended bars 29 positioned on the back and bottom sides of camera housing 32. By weaving harness 1*k* through both the back and bottom extended bars 29 and cinching harness 1*k* around the wrist or arm of a user camera housing 32 can be attached to the user in a fixed-angle or semi-upright position.

Alternatively, harness 1*k* can be woven through both the back and bottom extended bars 29 and also extended bar 35 positioned on the top back corner of camera housing 32 (FIG. 9*m*) in order to attach camera housing 32 to a user in a fixed flat manner. Alternatively, harness 1*j* can be attached via tongue of hook material 26 to the bottom extended bar 29 and hook 19 of harness 1*j* can mate with extended bar 35, thereby allowing camera housing 32 (FIG. 9*m*) be attached to a user in a manner that allows camera housing 32 to be secured flat in a first secure position and then released and pivoted upright into a second secured position.

As illustrated in FIG. 9*d*, the invention can include camera housing 32 that has a recessed groove and bar 30 on the back of camera housing 32. Alternatively, recessed groove and bar 30 can be positioned into the bottom and or top of camera housing 32 or into the bottom corner edge of camera housing 32. FIG. 9*h* illustrates that recessed groove and bar 30 can be of any width or depth, and the bar portion of recessed groove and bar 30 can be either flush with or recessed below the outer surface of camera housing 32. Additionally, FIG. 9*h* illustrates that recessed groove and bar 30 can be located anywhere on the top, back, or bottom of camera housing 32, including corner edges of camera housing 32. FIG. 9*j* illustrates a plurality of recessed groove and bar 30 integrated into camera housing 32.

Recessed groove and bar 30, extended bar 29, and extended bar 35 can be used in any combination with or in any substitution of one another. FIG. 9*k* and FIG. 9*l* illustrate examples of this. Additionally, recessed groove and bar 30, extended bar 29, and extended bar 35 can be used interchangeably to achieve similar functionality. For example, FIG. 9*l* shows extended bar 35 positioned on the top back corner of camera housing 32 whereby it can be substituted with extended bar 29 as a mating bar for hook 19 of harness 1*j*, or it can serve as an weave-through attachment point for a substitute harness 1*k* to be woven through in order to attach camera housing 32 to a user in a fixed flat position when harness 1*k* is also woven through recessed groove and bar 30 in this example. Additionally, recessed groove and bar 30 can alternately be used as a mating bar for hook 19 and extended bar 35 can be alternately used as an attachment point for a strap portion of the invention.

As illustrated in FIG. 9*e*, the invention can include a camera housing 32 that has a female clip 31 integrated on the bottom of camera housing 32. Alternatively, female clip 31 can be integrated onto the back of camera housing 32. Alternatively, female clip 31 can be substituted with male clip 27. Any type of male or female clip, connector or union can be used as a substitute for female clip 31 and male clip 27 and the illustration in FIG. 9*e* is intended only for reference. Alternatively, male clip 27 and female clip 31 can be substituted with joining parts similar to those used to attach a wristwatch band to a watch piece.

As illustrated in FIG. 9*f*, the present invention can include camera housing 32 that has an extended bar 35 integrated on top of camera housing 32 to mate with hook piece 19. Alternatively, extended bar 35 can be integrated onto the back of camera housing 32. Additionally, extended bar 35 can be integrated onto a corner edge of camera housing 32. Additionally, extended bar 35 and extended bar 29 can be partially or entirely of any shape, including but not limited to curved, rounded, indented, semi-circular, circular, semi-oval, oval, semi-elliptical, elliptical, semi-square, square, semi-rectangular, rectangular, semi-triangular, triangular, or angular shape. Additionally, extended bar 35 and extended bar 29 can be of any width or height and can be variably positioned on the top, back or corner of camera housing 32. Alternatively, extended bar 35 can function as an attachment point for a strap portion of the invention, similar in function to either recessed groove and bar 30 and or extended bar 29. Again, extended bar 35, recessed groove and bar 30, and extended bar 29 can be used interchangeably in the invention.

It will be noted that any of the stated embodiments of the invention, or elements thereof, can be combined or otherwise incorporated with one another to achieve a desired embodiment of the invention that is still within the scope of the invention.

In addition to the aforementioned methods for attaching my invention to the wrist or arm of a user, it is understood that any reasonable means for attaching, securing, or otherwise fastening a device to the wrist or arm of a user can be substituted for any of the above mentioned methods of attaching my invention to the wrist or arm of a user. In addition to the aforementioned methods for attaching a camera to my invention, it is understood that any reasonable means for attaching, securing, or otherwise fastening a camera to a harness or strap can be substituted for any of the above mentioned methods of attaching a camera to my invention.

Further Considerations for Additional Embodiments

Those of skill in the art will understand the wide range of structural configurations for one or more elements of the present invention. For example, certain elements may have square or rounded edges to give it a particular look. Further, particular elements of the present invention that are joined or attached to one another in the assembly process can be made, molded, machined, or otherwise fabricated as a single element or part. In addition, certain elements of the present invention that are fabricated as a single element or part can be fabricated as separate elements or in a plurality of parts that are then joined or otherwise attached to one another in the assembly process. Certain elements of the present invention that are made of a particular material can be made of a different material to give the device a different appearance, style, weight, flexibility, rigidity, reliability, longevity, ease of use, cost of manufacture, etc.

Certain elements of the present invention may be configured to be bigger or smaller to work with cameras of different sizes. Further, certain elements of the present invention can me made bigger or smaller to better fit or adjust to people of different sizes or better fit over various articles of clothing. Elements of the present invention can be sewn or otherwise attached to the sleeve of a jacket, shirt, sweater, pullover, wetsuit, glove or other form of apparel, thus integrating the function of my invention into the given article of apparel.

As further examples, the present invention or elements thereof could be built into or otherwise permanently affixed to a camera body or camera housing in a manner that permanently attaches the present invention to the camera body or camera housing. In addition, a base plate, clip, or other part in place of coupling plate 10 could snap, bolt, clip, or otherwise attach the present invention to a camera body or a camera housing, thus attaching that camera body or camera housing to the present invention with or without the use of coupling bands 10*a* and 10*b*. Further, a base plate or other part in place of or in conjunction with coupling plate 10, or coupling plate 10 itself can have one or more sides coated with an adhesive or adhesive tape for securing itself to a camera body or camera housing, thus attaching a camera body or camera housing to the present invention. Additionally, coupling plate 10 can have hook or loop material, VELCRO, or a similar material glued to, laminated to, or otherwise attached to it.

As still additional examples, certain elements of the present invention can be made any color to give the present invention a specific appearance to match clothing, uniforms, camera color schemes, corporate logos, etc. Certain elements of the present invention can be redesigned for a different look, theme or to address a different consumer market.

In another example, certain elements of the present invention can be redesigned to attach or join with other elements of my invention in a different manner than described in the embodiments while providing a similar function to those manners of attachment described in the embodiments. Coupling plate 10 and square ring 14 can be fabricated as a single hinged part or element. Coupling plate 10 itself can be a hinged part or element that is fastened or attached to loop material 17. Coupling plate 10 can be omitted from my invention and coupling bands 10*a* and 10*b* are attached to square ring 14 or are molded or fabricated as one part with square ring 14. Coupling plate 10 can be omitted from my invention and coupling bands 10*a* and 10*b* are attached to loop material 17.

Another example includes, using a different clasping mechanism than hook piece 19 and catch piece 13, including but not limited to an example where hook end 19*b* is shaped like a ball and catch piece 13 and catch cradle 13*d* are shaped like a cupped receptacle for the aforementioned ball shape. Further, instead of being shaped like dual bands surrounding the camera, coupling bands 10*a* and 10*b*, or coupling band 10*a* alone, thus omitting coupling band 10*b*, can be shaped like one single wide or narrow band of material surrounding the camera. Also, instead of being shaped like dual bands surrounding the camera, coupling bands 10*a* and 10*b*, or coupling band 10*a* alone, thus omitting coupling band 10*b*, can be shaped like one single wide or narrow band of material surrounding the camera with a hole or space omitted from a portion of the band of material for the camera lens to protrude from.

In addition, instead of using coupling bands 10*a* and 10*b*, my invention can include a sleeve of material such as neoprene, rubber, nylon, hook and loop material or any other material to grip, house or otherwise contain a camera and secure it to coupling plate 10. This sleeve of material can additionally have a hole or space omitted from it to allow for the lens of a camera to protrude from it. Instead of using coupling bands 10*a* and 10*b* and coupling plate 10, the present invention uses a sleeve of material such as neoprene, rubber, nylon, hook and loop material or any other material to grip, house or otherwise contain a camera which is attached directly to my invention without coupling plate 10. This sleeve of material can additionally have a hole or space omitted from it to allow for the lens of a camera to protrude from it.

As another example, hook ring 18 can be any shape, including but not limited to a D-ring shape, triangle, oval, square, or can also be substituted with a single band or strip of any material including but not limited to hook and loop material. Loop material 17, hook material 20, comfort strip 16, square ring 14, and pull tab 21 can be replaced with single sleeve 24 whereby single sleeve 24 is used to attach harness 1*b* to the arm or wrist of a user whereby the user slides his or her hand through single sleeve 24 and pulls single sleeve 24 and harness 1*b* onto his or her wrist or arm and single sleeve 24 has an integrated drawstring or a plurality of drawstrings that allow user to tighten single sleeve 24 around his or her wrist or arm. Additionally, comfort strip 16 can be of any shape, single or varying width, or length.

In yet another example, as a substitute to comfort strip 16 in the present invention, single sleeve 24 is attached to underside of loop material 17 whereby single sleeve 24 is used to attach the present invention to the arm or wrist of a user whereby the user slides his or her hand through single sleeve 24 and pulls single sleeve 24 and harness 1*b* onto his or her wrist or arm and then cinches hook material 20 through square ring 14 and tightens the present invention onto his or her arm or wrist in the same manner as described in one embodiment of the present invention.

Also, loop material 17, hook material 20, comfort strip 16, square ring 14, and pull tab 21 can be replaced with a strap of any material with standard adjustable backpack type buckles at either end of the strap, allowing the user to buckle and tighten the present invention around their arm or wrist. Loop material 17, hook material 20, comfort strip 16, square ring 14, and pull tab 21 can be replaced with a standard wrist watch type strap and closure system that allows the user to adjust and fasten the present invention around his or her arm or wrist.

In another example, the present invention can be mounted on or otherwise integrated with a glove (or other article of clothing such as a coat sleeve or diver wetsuit sleeve) for the purpose of attaching a camera to the glove in a manner that allows the camera to be moved pivotably whilst being attached to the glove. The present invention can have a button attached to it that mates with a mating button piece located on a camera body. Also, the present invention can have a button attached to it. Also the present invention can have a magnet or a portion thereof attached to it to serve as a coupling mechanism.

In yet another example, a camera (or a housing for a camera) used as a part of the invention could have either hook and or loop material attached, integrated, or otherwise a part of the camera body for the purpose of securing the camera against my invention or to an element thereof. The present invention can incorporate a one way or two way or stage detent mechanism that holds an attached camera either in a closed-flat position against the wrist or arm of a user or in an open-vertical position for the purpose of taking a photograph, or alternately in both positions depending on the user's preference. Any aspect or element of any one or more of the embodiments of my invention can be combined with any one or more aspects or elements of another embodiment of the present invention to achieve a desired combined embodiment of the present invention.

As previously noted, the present invention includes a number of benefits and advantages. For example, the present invention may be configured from a lesser number of parts, and therefore, is more reliable due to fewer potential failure points and may be less expensive to manufacture. Further, the present invention may be configured using lightweight material and may also be configured for attaching to a wide range of user extremities or appendages, for example, an arm, a wrist, a leg or an ankle, or even a non-appendages such as bicycle handlebars, hang glider control bars, a windsurfer boom, and so on. Hence, the present invention is advantageous for a wide range of potential users.

The present invention may also be adapted for a wider range of devices of varying shapes, sizes and dimensions, and therefore, is suitable for use with a wide range of devices that a user may carry, for example, cameras, binoculars, monoculars, video cameras cell phones, and the like. Further, the present invention may be beneficially secured in a first secured position (e.g., secured at two ends to the harness) and a second secured position (e.g., pivotably secured at one end of the harness), and therefore, is also suitable for use in a wide range of activities.

Moreover, the present invention is advantageously secured while providing quick access for the user to the device attached to the harness so that the user can, for example, move a camera from the first secured position to the second secured position, take a photograph, and then re-secure the camera in the first secured position. In addition, the present invention is advantageously configured so that the device, e.g., camera, remains secured to the harness even if the user is unable to return the device from the first secured position to the second secured position.

Accordingly, one of skill in the art can appreciate that the camera harness of this invention can easily be used by a photographer to carry, access, and securely hold and use a camera even while participating in fast-paced activities such as surfing, kayaking, rafting, snorkeling, skiing, and so on. Additionally, the camera harness of this invention will keep a camera attached to the wrist or arm of a user even if the user falls or encounters some circumstance that forces him or her to let go of the camera while taking a photograph. The camera harness of the present invention can be easily used with a wide range of camera types, sizes, and dimensions and can likewise be adjusted to fit a wide range of users. Moreover, the camera harness of the present invention may also be adapted for use with other devices, for example, video cameras, binoculars, monoculars, cell phones, personal digital assistants, music players (e.g., Mp3 players or radio devices), game devices, and the like. Further still, the camera harness of the present invention will allow its user to take photographs while participating in such activities that might otherwise have prohibited or made difficult the act of photography. While the above description contains many specificities, these should not be construed as limitations on the scope of the invention, but rather as an exemplification of one preferred embodiments thereof. Accordingly, the scope of the invention should be determined not by the embodiment(s) illustrated, but by the appended claims and their legal equivalents.

What is claimed is:

1. An apparatus for securing a camera, the apparatus comprising:

a housing structured to receive the camera;

a strap structured to pivotally secure a first location of the housing in a first secured position; and a releasable catch mechanism coupled with one of the strap and the housing, the releasable catch mechanism structured to releasably couple the one of the strap and a second location of the housing in a second secured position, wherein the housing is in the first secured position when the releasable catch mechanism uncouples from the one of the strap and the second location of the housing and is in the second secured position when the releasable catch mechanism couples the one of the strap and the second location of the housing.

2. The apparatus of claim 1, wherein the housing comprises one from a group consisting of a flexible housing and a rigid housing.

3. The apparatus of claim 2, wherein the flexible housing comprises one from a group consisting of leather, cotton, vinyl, nylon, neoprene, canvas, synthetic fabric, natural fabric, plastic, and rubber.

4. The apparatus of claim 2, wherein the rigid housing comprises one from a group consisting of rigid plastic, rigid rubber, metal, fiberglass, resin, and metal composite.

5. The apparatus of claim 1, wherein the releasable catch mechanism comprises a first portion and a second portion, the first portion of the releasable catch mechanism coupled with the housing and the second portion of the releasable catch mechanism coupled with the strap.

6. The apparatus of claim 4, wherein the first portion and the second portion of the catch mechanism comprises reciprocal portions of one from the group consisting of a button assembly, a buckle assembly, a clip assembly, a hook and loop assembly, a hook and catch assembly, a ball and catch assembly, a magnet assembly, and an adhesive assembly.

7. The apparatus of claim 1, wherein the housing and the strap comprise a unibody construction.

8. The apparatus of claim 1, wherein the strap is configured to secure an object.

9. The apparatus of claim 8, wherein the object comprises a user appendage.

10. The apparatus of claim 1, wherein the strap comprises a first portion of a hook and loop fastener and a second portion of a hook and loop fastener, wherein the first portion of the hook and loop fastener releasably couples the second portion of the hook and loop fastener.

11. The apparatus of claim 1, wherein the strap comprises a closed loop.

12. The apparatus of claim 1, wherein the housing includes an access area for at least one of manipulating camera controls and viewing a display screen.

13. The apparatus of claim 12, wherein the access area comprises a see-through flexible panel.

14. The apparatus of claim 12, wherein the access area comprises a window opening.

15. The apparatus of claim 1, wherein a back portion of the housing includes an opening for a display screen.

16. The apparatus of claim 1, wherein the housing comprises a fit point for coupling at least one of the strap and the releasable catch mechanism.

17. The apparatus of claim 1, wherein the housing is configured for integration with an article of clothing.

* * * * *

UNITED STATES PATENT AND TRADEMARK OFFICE

CERTIFICATE OF CORRECTION

PATENT NO. : 6,955,484 B2

DATED : October 18, 2005

INVENTOR(S) : Nicholas D. Woodman

It is certified that error appears in the above-identified patent and that said Letters Patent is hereby corrected as shown below:

Column 1,

Line 3, delete “3,” and insert -- 5, --.

Signed and Sealed this

Twenty-first Day of March, 2006

JON W. DUDAS

*Director of the United States Patent and Trademark Office*